US012734613B2

(12) United States Patent
García Ramírez et al.

(10) Patent No.: US 12,734,613 B2
(45) Date of Patent: Sep. 15, 2026

(54) DENTAL APPLIANCE PRODUCTION SYSTEM

(71) Applicant: Align Technology, Inc., San Jose, CA (US)

(72) Inventors: Javier Antonio García Ramírez, Ciudad Juárez (MX); Alan Gerardo Martinez Reyes, Ciudad Juárez (MX); Miriam Sarahi Esquivel Salas, Ciudad Juárez (MX); Ismael Núñez Garcia, Ciudad Juárez (MX); Rene David Alfaro, El Paso, TX (US); Shiva P. Sambu, Milpitas, CA (US); Luiyi Morales Vargas, Ciudad Juárez (MX); Fidel Castro Hernandez, Ciudad Juárez (MX); Mario Alfonso Rito Martinez, Ciudad Juárez (MX)

(73) Assignee: Align Technology, Inc., San Jose, CA (US)

( * ) Notice: Subject to any disclaimer, the term of this patent is extended or adjusted under 35 U.S.C. 154(b) by 106 days.

(21) Appl. No.: 18/409,763

(22) Filed: Jan. 10, 2024

(65) Prior Publication Data

US 2024/0238904 A1 Jul. 18, 2024

Related U.S. Application Data

(60) Provisional application No. 63/442,375, filed on Jan. 31, 2023, provisional application No. 63/438,744, filed on Jan. 12, 2023.

(51) Int. Cl.

| | |
|---|---|
| ***B23K 26/36*** | (2014.01) |
| ***A61C 7/08*** | (2006.01) |
| ***B23K 26/362*** | (2014.01) |

(52) U.S. Cl.

CPC .............. *B23K 26/362* (2013.01); *A61C 7/08* (2013.01); *A61C 2204/00* (2013.01)

(58) Field of Classification Search

CPC ..... B23K 26/362; A61C 7/08; A61C 2204/00; A61C 7/002

See application file for complete search history.

(56) References Cited

U.S. PATENT DOCUMENTS

| | | | |
|---|---|---|---|
| 6,210,162 | B1 | 4/2001 | Chishti et al. |
| 6,309,215 | B1 | 10/2001 | Phan et al. |

(Continued)

FOREIGN PATENT DOCUMENTS

| | | | |
|---|---|---|---|
| WO | 2019213585 | A1 | 11/2019 |
| WO | 2019213588 | A1 | 11/2019 |

OTHER PUBLICATIONS

Shutian Su, Laser marking method and marking system for invisible appliance production (ip.com machine translation of CN112008234B), Nov. 8, 2022, ip.com machine translation (Year: 2022).*

*Primary Examiner* — Christopher W Carter

(74) *Attorney, Agent, or Firm* — Lowenstein Sandler LLP

(57) ABSTRACT

A method includes: identifying marking parameters associated with performance of dental appliance etching; includes identifying a first segment of marking data to be etched onto a dental appliance; causing, via dental appliance marking equipment based on the marking parameters, etching of the first segment on the dental appliance; capturing image data associated with the etching of the first segment; and causing the marking parameters to be updated based on the image data. A method includes: subsequent to dental appliances being simultaneously thermoformed via a thermoforming system in a single batch, determining dental appliance data and laser tool data; determining, based on the dental appliance data and the laser tool data, global plan data for performing laser operations of the dental appliances via laser (Continued)

tools; and causing, based on the global plan data via the laser tools, the laser operations of the dental appliances.

13 Claims, 26 Drawing Sheets

(56) References Cited

U.S. PATENT DOCUMENTS

| | | | |
|---|---|---|---|
| 6,497,574 | B1 | 12/2002 | Miller |
| 6,749,414 | B1 | 6/2004 | Hanson et al. |
| 6,830,450 | B2 | 12/2004 | Knopp et al. |
| 6,957,118 | B2 | 10/2005 | Kopelman et al. |
| 6,964,564 | B2 | 11/2005 | Phan et al. |
| 6,976,627 | B1 | 12/2005 | Culp et al. |
| 7,092,784 | B1 | 8/2006 | Simkins |
| 7,192,273 | B2 | 3/2007 | McSurdy, Jr. |
| 7,220,124 | B2 | 5/2007 | Taub et al. |
| 7,236,842 | B2 | 6/2007 | Kopelman et al. |
| 7,245,977 | B1 | 7/2007 | Simkins |
| 7,261,533 | B2 | 8/2007 | Wrosz et al. |
| 7,335,024 | B2 | 2/2008 | Wen |
| 7,384,266 | B2 | 6/2008 | Wen |
| 7,435,084 | B2 | 10/2008 | Liu et al. |
| 7,472,789 | B2 | 1/2009 | Wu et al. |
| 7,476,100 | B2 | 1/2009 | Kuo |
| 7,481,647 | B2 | 1/2009 | Sambu et al. |
| 7,604,181 | B2 | 10/2009 | Culp et al. |
| 7,641,828 | B2 | 1/2010 | DeSimone et al. |
| 7,648,360 | B2 | 1/2010 | Kuo |
| 7,674,422 | B2 | 3/2010 | Kuo |
| 7,711,447 | B2 | 5/2010 | Lu et al. |
| 7,748,199 | B2 | 7/2010 | Sankaran et al. |
| 7,802,987 | B1 | 9/2010 | Phan |
| 7,819,659 | B2 | 10/2010 | Wen |
| 7,831,322 | B2 | 11/2010 | Liu et al. |
| 7,840,373 | B2 | 11/2010 | Culp et al. |
| 7,892,474 | B2 | 2/2011 | Shkolnik et al. |
| 7,922,490 | B2 | 4/2011 | Wen |
| 7,957,824 | B2 | 6/2011 | Boronvinskih et al. |
| 8,019,465 | B2 | 9/2011 | Spiridonov et al. |
| 8,030,588 | B2 | 10/2011 | Culp et al. |
| 8,087,932 | B2 | 1/2012 | Liu |
| 8,636,513 | B2 | 1/2014 | Wen |
| 8,740,614 | B2 | 6/2014 | Wen et al. |
| 8,765,031 | B2 | 7/2014 | Li et al. |
| 8,776,391 | B1 | 7/2014 | Kaza et al. |
| 9,108,338 | B2 | 8/2015 | Sirovskiy et al. |
| 9,403,238 | B2 | 8/2016 | Culp |
| 9,610,141 | B2 | 4/2017 | Kopelman et al. |
| 9,655,691 | B2 | 5/2017 | Li et al. |
| 9,844,424 | B2 | 12/2017 | Wu et al. |
| 9,943,386 | B2 | 4/2018 | Webber et al. |
| 9,943,991 | B2 | 4/2018 | Tanugula et al. |
| 10,213,277 | B2 | 2/2019 | Webber et al. |
| 10,336,102 | B2 | 7/2019 | Cole |
| 10,363,116 | B2 | 7/2019 | Boronkay |
| 10,495,973 | B2 | 12/2019 | Cole |
| 10,783,629 | B2 | 9/2020 | Parpara et al. |
| 10,888,395 | B2 | 1/2021 | Kopelman |
| 11,189,021 | B2 | 11/2021 | Shah et al. |
| 11,295,444 | B2 | 4/2022 | Cherkas et al. |
| 11,420,362 | B2 | 8/2022 | Mojdeh et al. |
| 11,511,485 | B2 | 11/2022 | Mojdeh et al. |
| 11,534,277 | B2 | 12/2022 | Chavez et al. |
| 11,602,413 | B2 | 3/2023 | Chen et al. |
| 11,666,415 | B2 | 6/2023 | Wang et al. |
| 11,937,991 | B2 | 3/2024 | Webber et al. |
| 2004/0243361 | A1 | 12/2004 | Steuben et al. |
| 2006/0093982 | A1 | 5/2006 | Wen |
| 2006/0093987 | A1 | 5/2006 | Wen |
| 2006/0093993 | A1 | 5/2006 | Wen |
| 2006/0127850 | A1 | 6/2006 | Wen |
| 2006/0127857 | A1 | 6/2006 | Zhenhuan et al. |
| 2006/0127858 | A1 | 6/2006 | Wen |
| 2006/0127859 | A1 | 6/2006 | Wen |
| 2006/0127860 | A1 | 6/2006 | Wen |
| 2006/0172250 | A1 | 8/2006 | Wen |
| 2006/0199145 | A1 | 9/2006 | Liu et al. |
| 2007/0092853 | A1 | 4/2007 | Liu et al. |
| 2007/0243502 | A1 | 10/2007 | Wen |
| 2008/0083348 | A1 | 4/2008 | Kuo et al. |
| 2009/0148814 | A1 | 6/2009 | Li et al. |
| 2014/0061974 | A1 | 3/2014 | Tyler |
| 2014/0265034 | A1 | 9/2014 | Dudley |
| 2015/0097315 | A1 | 4/2015 | DeSimone et al. |
| 2015/0238280 | A1 | 8/2015 | Wu et al. |
| 2016/0310236 | A1 | 10/2016 | Kopelman et al. |
| 2017/0007362 | A1 | 1/2017 | Chen et al. |
| 2017/0007365 | A1 | 1/2017 | Kopelman et al. |
| 2017/0007366 | A1 | 1/2017 | Kopelman et al. |
| 2017/0007368 | A1 | 1/2017 | Boronkay |
| 2017/0165032 | A1 | 6/2017 | Webber et al. |
| 2017/0319296 | A1 | 11/2017 | Webber et al. |
| 2020/0290262 | A1 | 9/2020 | Aguilar Mendez et al. |
| 2020/0311934 | A1* | 10/2020 | Cherkas .................. G06T 19/00 |
| 2021/0030516 | A1 | 2/2021 | O'Leary et al. |
| 2021/0169617 | A1 | 6/2021 | Nishimuta et al. |
| 2023/0141168 | A1* | 5/2023 | Gui ........................ A61C 13/34<br>433/24 |

* cited by examiner

300A
Data input 301
Target Output 303
Historical Sensor Data 154A
Historical Sensor Data 154Z
Data Set Generator 172
Historical Performance Data 164

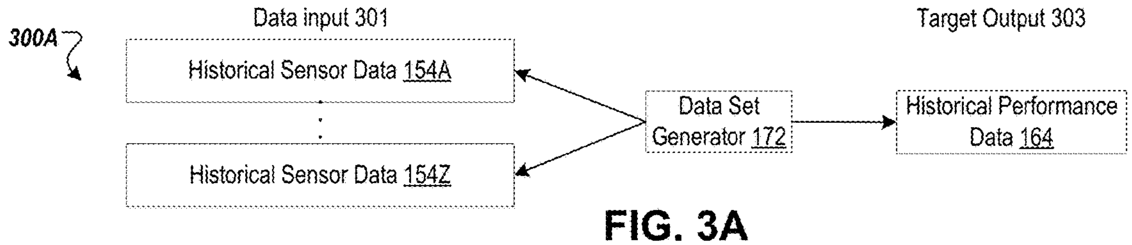

FIG. 3A
300B
Data input 301
Target Output 303
Historical Dental Appliance Data 154A
Historical Dental Appliance Data 154Z
Historical Laser Tool Data 158A
Historical Laser Tool Data 158Z
Data Set Generator 172
Historical Global Plan Data 164

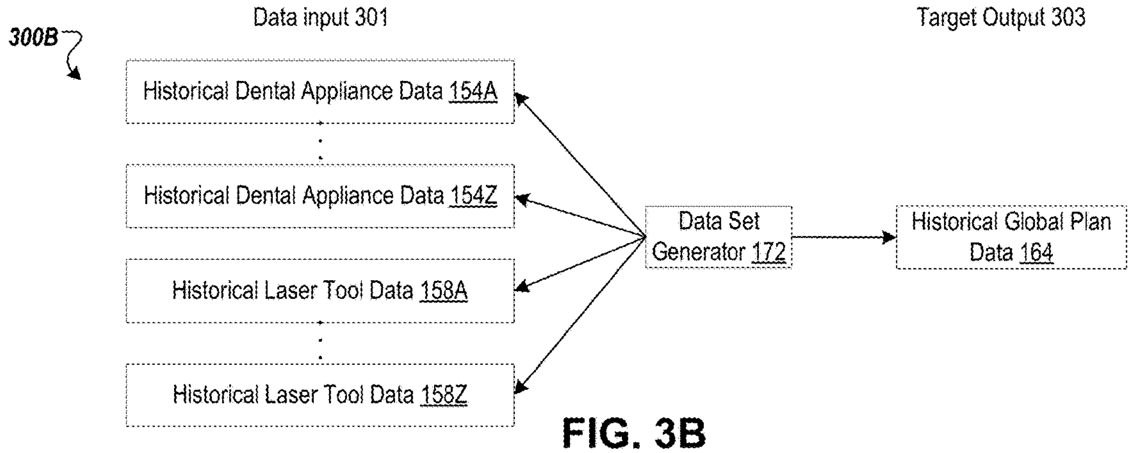

FIG. 3B
300C
Historical Data (e.g., Historical Sensor Data 154, Historical Performance Data 164, Historical Dental Appliance Data 154, Historical Laser Tool Data 158, Historical Global Plan Data 164)
Data Partitioning 330
Current Data (e.g., Current Performance Data 166, Current Global Plan Data 166)
Training Set 322
Model Training 332
Model Validation 334
Validation Set 324
Model Selection 336
Selected Model 328
Model Testing 338
Testing Set 326
Current Data (e.g., Current Sensor Data 152, Current Dental Appliance Data 152, Current Laser Tool Data 159)
Using Trained Model 340
Predictive Data 168

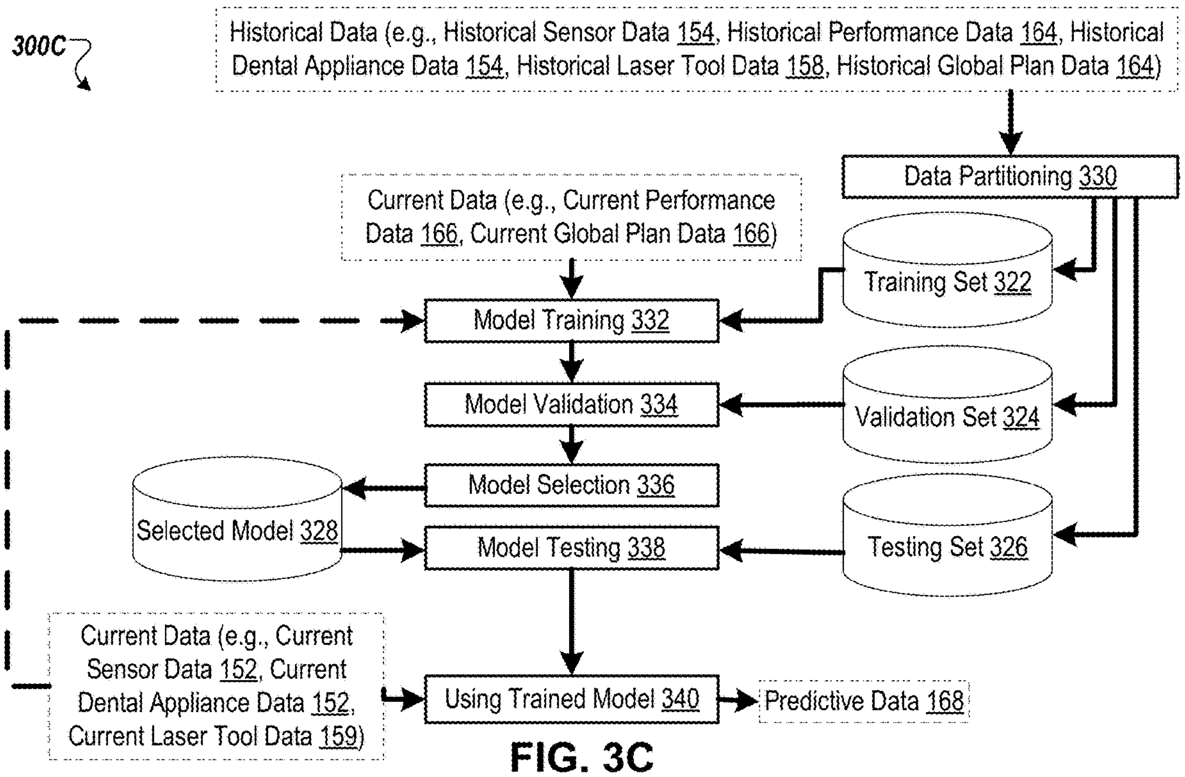

400D
Laser Tool 107
Mold 254
Modular Trays 244
400E
Sheet of Plastic 216
Modular Tray 244
Mold 254
400F
Sheet of Plastic 216
Modular Tray 244
Mold 254

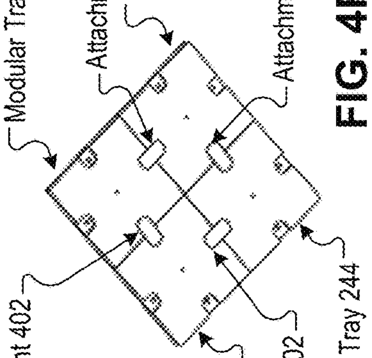

FIG. 4R

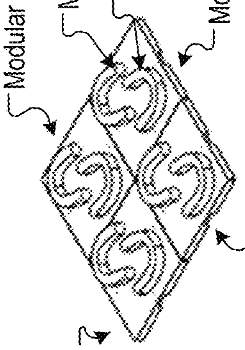

FIG. 4Q

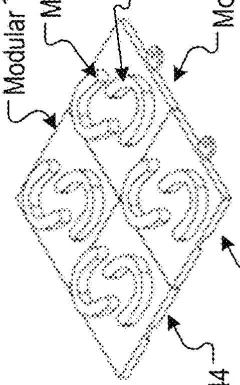

FIG. 4T

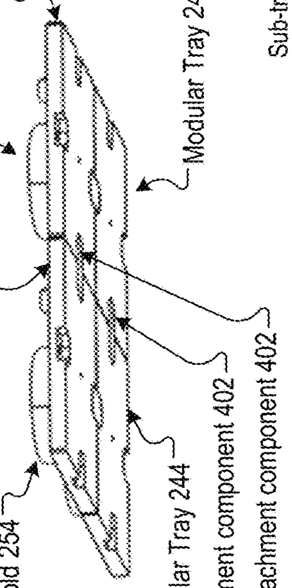

FIG. 4S

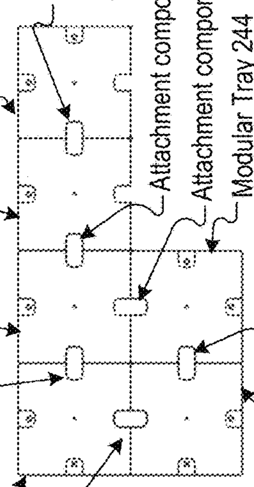

FIG. 4V

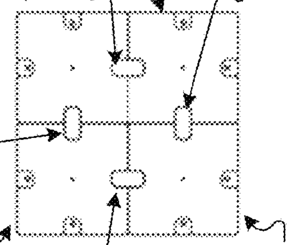

FIG. 4U

Sub-tray 404A
Modular Tray 244
Mold 254
Mold 254
Modular Tray 244
Modular Tray 244
Modular Tray 244
Attachment component 402
Modular Tray 244
Sub-tray 404A
Attachment component 402
Modular Tray 244
Modular Tray 244
Attachment component 402
Attachment component 402
Modular Tray 244
Sub-tray 404A
Modular Tray 244
Mold 254
Mold 254
Modular Tray 244
Modular Tray 244
Modular Tray 244
Attachment component 402
Attachment component 402
Modular Tray 244
Mold 254
Sub-tray 404A
Mold 254
Modular Tray 244
Modular Tray 244
Modular Tray 244
Sub-tray 404A
Attachment component 402
Modular Tray 244
Modular Tray 244
Attachment component 402
Attachment component 402
Modular Tray 244
Attachment component 402
Modular Tray 244
Sub-tray 404B
Attachment component 402
Modular Tray 244
Modular Tray 244
Modular Tray 244
Modular Tray 244
Attachment component 402
Attachment component 402
Attachment component 402
Attachment component 402
Modular Tray 244
Modular Tray 244
Attachment component 402

DENTAL APPLIANCE PRODUCTION SYSTEM

RELATED APPLICATIONS

This application claims benefit of U.S. Provisional Application No. 63/438,744, filed Jan. 12, 2023, and U.S. Provisional Application No. 63/442,375, filed Jan. 31, 2023, the contents of which are hereby incorporated by reference in their entirety.

TECHNICAL FIELD

The technical field relates to the field of production and, in particular, to dental appliance production.

BACKGROUND

Systems produce dental appliances to be used in corrective dentistry or orthodontic treatment. Dental appliances, such as palatal expanders, dental aligners and attachment formation templates, are used to perform particular functions in accordance with respective treatment plans. For example, incremental palatal expanders can include a set of dental appliances that fit into a palate of a patient and function to expand a patient's palate according to a treatment plan. Aligners can include polymeric dental appliances that include tooth-receiving cavities to receive and reposition a patient's teeth to correct malocclusions. Dental attachment templates can include dental appliances shaped to fit to a patient's dentition and allow for the placement of attachments, e.g., bonded attachments, prefabricated attachments, etc. to the patient's dentition.

SUMMARY

Some example implementations of the present disclosure are summarized herein.

In a first implementation, a method comprises: identifying marking parameters associated with performance of dental appliance etching; identifying a first segment of marking data to be etched onto a dental appliance; causing, via dental appliance marking equipment based on the marking parameters, etching of the first segment on the dental appliance; capturing image data associated with the etching of the first segment; and causing the marking parameters to be updated based on the image data.

A second implementation may further extend the first implementation. In the second implementation, the dental appliance is formed by heating a sheet of plastic and thermoforming the sheet of plastic on a dental mold, the dental mold being formed based on a digital model of at least a portion of a dental arch of a patient.

A third implementation may further extend the first or second implementations. In the third implementation, the method further comprises: capturing appliance image data associated with the dental appliance; determining that the appliance image data substantially matches a digital model of the dental appliance; and identifying the marking data associated with the digital model.

A fourth implementation may further extend any of the first through third implementations. In the fourth implementation, the method further comprises: determining dental appliance marking equipment position data associated with the etching of the dental appliance; and causing, based on the dental appliance marking equipment position data, positioning of the dental appliance marking equipment, wherein the dental appliance marking equipment position data comprises one or more of x-position, y-position, z-position, x-rotational position, y-rotational position, or z-rotational position.

A fifth implementation may further extend any of the first through fourth implementations. In the fifth implementation, the marking data comprises one or more characters, wherein the first segment being a first line or a first curve of the one or more characters.

A sixth implementation may further extend any of the first through fifth implementations. In the sixth implementation, the method further comprises determining marking size and marking area, wherein the causing of the etching of the first segment on the dental appliance is further based on the marking size and the marking area.

A seventh implementation may further extend any of the first through sixth implementations. In the seventh implementation, the marking parameters comprise one or more of power data, frequency data, pitch data, resolution data, focal data, or velocity data.

In an eighth implementation, a non-transitory computer readable storage medium having instructions stored thereon, which, when executed by a processing device, cause the processing device to perform operations comprising: identifying marking parameters associated with performance of dental appliance etching; identifying a first segment of marking data to be etched onto a dental appliance; causing, via dental appliance marking equipment based on the marking parameters, etching of the first segment on the dental appliance; capturing image data associated with the etching of the first segment; and causing the marking parameters to be updated based on the image data.

A ninth implementation may further extend the eighth implementation. In the ninth implementation, the dental appliance is formed by heating a sheet of plastic and thermoforming the sheet of plastic on a dental mold, the dental mold being formed based on a digital model of at least a portion of a dental arch of a patient.

A tenth implementation may further extend the eighth or ninth implementations. In the tenth implementation, the operations further comprise: capturing appliance image data associated with the dental appliance; determining that the appliance image data substantially matches a digital model of the dental appliance; and identifying the marking data associated with the digital model.

An eleventh implementation may further extend any of the eighth through tenth implementations. In the eleventh implementation, the operations further comprise: determining dental appliance marking equipment position data associated with the etching of the dental appliance; and causing, based on the dental appliance marking equipment position data, positioning of the dental appliance marking equipment, wherein the dental appliance marking equipment position data comprises one or more of x-position, y-position, z-position, x-rotational position, y-rotational position, or z-rotational position.

A twelfth implementation may further extend any of the eighth through eleventh implementations. In the twelfth implementation, the marking data comprises one or more characters, wherein the first segment being a first line or a first curve of the one or more characters.

A thirteenth implementation may further extend any of the eighth through twelfth implementations. In the thirteenth implementation, the operations further comprise determining marking size and marking area, wherein the causing of the etching of the first segment on the dental appliance is further based on the marking size and the marking area.

A fourteenth implementation may further extend any of the eighth through thirteenth implementations. In the fourteenth implementation, the marking parameters comprise one or more of power data, frequency data, pitch data, resolution data, focal data, or velocity data.

In a fifteenth implementation, a system comprises: a memory; a processing device coupled to the memory, the processing device to: identify marking parameters associated with performance of dental appliance etching; identify a first segment of marking data to be etched onto a dental appliance; cause, via dental appliance marking equipment based on the marking parameters, etching of the first segment on the dental appliance; capture image data associated with the etching of the first segment; and cause the marking parameters to be updated based on the image data.

A sixteenth implementation may further extend the fifteenth implementation. In the sixteenth implementation, the dental appliance is formed by heating a sheet of plastic and thermoforming the sheet of plastic on a dental mold, the dental mold being formed based on a digital model of at least a portion of a dental arch of a patient.

A seventeenth implementation may further extend the fifteenth or sixteenth implementations. In the seventeenth implementation, the processing device is further to: capture appliance image data associated with the dental appliance; determine that the appliance image data substantially matches a digital model of the dental appliance; and identify the marking data associated with the digital model.

An eighteenth implementation may further extend any of the fifteenth through seventeenth implementations. In the eighteenth implementation, the processing device is further to: determine dental appliance marking equipment position data associated with the etching of the dental appliance; and cause, based on the dental appliance marking equipment position data, positioning of the dental appliance marking equipment, wherein the dental appliance marking equipment position data comprises one or more of x-position, y-position, z-position, x-rotational position, y-rotational position, or z-rotational position.

A nineteenth implementation may further extend any of the fifteenth through eighteenth implementations. In the nineteenth implementation, the marking data comprises one or more characters, wherein the first segment being a first line or a first curve of the one or more characters.

A twentieth implementation may further extend any of the fifteenth through nineteenth implementations. In the twentieth implementation, the processing device is further to determine marking size and marking area, wherein the causing of the etching of the first segment on the dental appliance is further based on the marking size and the marking area.

In a twenty-first implementation, a method comprises: identifying sensor data associated with performance of dental appliance etching; providing the sensor data as input to a trained machine learning model; obtaining, from the trained machine learning model, output associated with predictive data; and determining, based on the predictive data, updated marking parameters to cause performance of the dental appliance etching.

In a twenty-second implementation, a method comprises: identifying historical sensor data associated with historical performance of dental appliance etching of historical dental appliances; and training a machine learning model using data input comprising the historical sensor data to generate a trained machine learning model, the trained machine learning model being capable of generating predictive data to determine updated marking parameters to cause performance of dental appliance etching.

In a twenty-third implementation, a non-transitory computer readable storage medium having instructions stored thereon, which, when executed by a processing device, cause the processing device to perform operations comprising: identifying marking parameters and image data associated with performance of dental appliance etching; providing the marking parameters and image data as input to a trained machine learning model; obtaining, from the trained machine learning model, output associated with predictive data; and determining, based on the predictive data, updated marking parameters to cause performance of the dental appliance etching.

In a twenty-fourth implementation, a method comprises: identifying image data associated with performance of dental appliance etching of dental appliances; providing the image data as input to a trained machine learning model; obtaining, from the trained machine learning model, output associated with predictive data; and causing, based on the predictive data, performance of a corrective action.

In a twenty-fifth implementation, a method comprises: identifying historical image data and historical performance data associated with dental appliance etching of historical dental appliances; and training a machine learning model using data input comprising the historical image data and target output comprising the historical performance data to generate a trained machine learning model, the trained machine learning model being capable of generating predictive data to cause performance of a corrective action.

In a twenty-sixth implementation, a non-transitory computer readable storage medium having instructions stored thereon, which, when executed by a processing device, cause the processing device to perform operations comprising: identifying image data associated with performance of dental appliance etching of dental appliances; providing the image data as input to a trained machine learning model; obtaining, from the trained machine learning model, output associated with predictive data; and causing, based on the predictive data, performance of a corrective action.

In a twenty-seventh implementation, a method comprises: subsequent to a plurality of dental appliances being simultaneously thermoformed via a thermoforming system in a single batch, determining dental appliance data and laser tool data; determining, based on the dental appliance data and the laser tool data, global plan data for performing laser operations of the plurality of dental appliances via a plurality of laser tools; and causing, based on the global plan data via the plurality of laser tools, the laser operations of the plurality of dental appliances.

A twenty-eighth implementation may further extend the twenty-seventh implementation. In the twenty-eighth implementation, the determining of the dental appliance data comprises: identifying three-dimensional (3D) model data associated with the plurality of dental appliances; and identifying image data of the plurality of dental appliances subsequent to being thermoformed, wherein the dental appliance data is based on the 3D model data and the image data.

A twenty-ninth implementation may further extend the twenty-seventh or twenty-eighth implementations. In the twenty-ninth implementation, the method further comprises determining that the plurality of dental appliances meet threshold values based on the dental appliance data.

A thirtieth implementation may further extend any of the twenty-seventh through twenty-ninth implementations. In the thirtieth implementation, the dental appliance data comprises corresponding geometry of each dental appliance, corresponding location of each dental appliance, and corresponding clearance between corresponding dental appliances of the plurality of dental appliances.

A thirty-first implementation may further extend any of the twenty-seventh through thirtieth implementations. In the thirty-first implementation, the laser tool data comprises potential trajectories, range of reach, and degrees of freedom of each of the plurality of laser tools.

A thirty-second implementation may further extend any of the twenty-seventh through thirty-first implementations. In the thirty-second implementation, the method further comprises: identifying image data associated with the plurality of laser tools during performance of the laser operations of the plurality of dental appliances; and updating the global plan data based on the image data to perform collision avoidance.

A thirty-third implementation may further extend any of the twenty-seventh through thirty-second implementations. In the thirty-third implementation, each of the plurality of laser tools comprises: a laser head configured to perform at least one of laser trimming or laser marking; and a positioning system configured to move the laser head in potential trajectories.

A thirty-fourth implementation may further extend any of the twenty-seventh through thirty-third implementations. In the thirty-fourth implementation, the determining of the global plan data comprises subdividing the single batch into a plurality of groups based on the dental appliance data, wherein a corresponding laser tool of the plurality of laser tools is configured to perform a corresponding laser operation of a corresponding group of the plurality of groups prior to performing a subsequent laser operation of a subsequent group.

In a thirty-fifth implementation, a non-transitory machine readable storage medium having instructions stored thereon, which, when executed by a processing device, cause the processing device to perform operations comprising: subsequent to a plurality of dental appliances being simultaneously thermoformed via a thermoforming system in a single batch, determining dental appliance data and laser tool data; determining, based on the dental appliance data and the laser tool data, global plan data for performing laser operations of the plurality of dental appliances via a plurality of laser tools; and causing, based on the global plan data via the plurality of laser tools, the laser operations of the plurality of dental appliances.

A thirty-sixth implementation may further extend the thirty-fifth implementation. In the thirty-sixth implementation, the determining of the dental appliance data comprises: identifying three-dimensional (3D) model data associated with the plurality of dental appliances; and identifying image data of the plurality of dental appliances subsequent to being thermoformed, wherein the dental appliance data is based on the 3D model data and the image data.

A thirty-seventh implementation may further extend the thirty-fifth or thirty-sixth implementations. In the thirty-seventh implementation, the operations further comprise determining that the plurality of dental appliances meet threshold values based on the dental appliance data.

A thirty-eighth implementation may further extend any of the thirty-fifth through thirty-seventh implementations. In the thirty-eighth implementation, the dental appliance data comprises corresponding geometry of each dental appliance, corresponding location of each dental appliance, and corresponding clearance between corresponding dental appliances of the plurality of dental appliances.

A thirty-ninth implementation may further extend any of the thirty-fifth through thirty-eighth implementations. In the thirty-ninth implementation, the laser tool data comprises potential trajectories, range of reach, and degrees of freedom of each of the plurality of laser tools.

A fortieth implementation may further extend any of the thirty-fifth through thirty-ninth implementations. In the fortieth implementation, the operations further comprise: identifying image data associated with the plurality of laser tools during performance of the laser operations of the plurality of dental appliances; and updating the global plan data based on the image data to perform collision avoidance.

In a forty-first implementation, a system comprises: a processing device; and a memory coupled to the processing device, the processing device to: subsequent to a plurality of dental appliances being simultaneously thermoformed via a thermoforming system in a single batch, determine dental appliance data and laser tool data; determine, based on the dental appliance data and the laser tool data, global plan data for performing laser operations of the plurality of dental appliances via a plurality of laser tools; and cause, based on the global plan data via the plurality of laser tools, the laser operations of the plurality of dental appliances.

A forty-second implementation may further extend the forty-first implementation. In the sixteenth implementation, to determine the dental appliance data, the processing device is to: identify three-dimensional (3D) model data associated with the plurality of dental appliances; and identify image data of the plurality of dental appliances subsequent to being thermoformed, wherein the dental appliance data is based on the 3D model data and the image data.

A forty-third implementation may further extend the forty-first or forty-second implementation. In the forty-third implementation, the processing device is further to determine that the plurality of dental appliances meet threshold values based on the dental appliance data.

A forty-fourth implementation may further extend any of the forty-first through forty-third implementations. In the forty-fourth implementation, the dental appliance data comprises corresponding geometry of each dental appliance, corresponding location of each dental appliance, and corresponding clearance between corresponding dental appliances of the plurality of dental appliances.

A forty-fifth implementation may further extend any of the forty-first through forty-fourth implementations. In the forty-fifth implementation, the laser tool data comprises potential trajectories, range of reach, and degrees of freedom of each of the plurality of laser tools.

A forty-sixth implementation may further extend any of the forty-first through forty-fifth implementations. In the forty-sixth implementation, the processing device is further to: identify image data associated with the plurality of laser tools during performance of the laser operations of the plurality of dental appliances; and update the global plan data based on the image data to perform collision avoidance.

In a forty-seventh implementation, a method comprises: identifying historical dental appliance data associated with historical dental appliances that were simultaneously thermoformed via a thermoforming system in a single batch; identifying historical laser tool data associated with historical laser tools used to perform historical laser operations of the historical dental appliances; identifying historical global plan data associated with historical performance of the historical laser operations; and training a machine learning model using data input comprising the historical dental appliance data and the historical laser tool data and target output comprising the historical global plan data to generate a trained machine learning model configured to provide output associated with predicted global plan data for performance of laser operations via a plurality of laser tools of a plurality of dental appliances.

In a forty-eighth implementation, a method comprises: identifying dental appliance data associated with a plurality of dental appliances that were simultaneously thermoformed via a thermoforming system in a single batch; identifying laser tool data associated with a plurality of laser tools configured to perform laser operations; providing the dental appliance data and the laser tool data as input to a trained machine learning model; receiving, from the trained machine learning model, output associated with predictive data; and determining, based on the predictive data, global plan data associated with performing the laser operations of the plurality of dental appliances via the plurality of laser tools.

In a forty-ninth implementation, a system comprises: a first modular tray comprising a first upper surface; a second modular tray comprising a second upper surface, wherein the first modular tray and the second modular tray are configured to be removably attached to each other; and a base tray, wherein the first modular tray and the second modular tray are to be disposed on the base tray responsive to the first modular tray and the second modular tray being removably attached to each other, wherein a plurality of molds are to be simultaneously printed on the first modular tray and the second modular tray responsive to the first modular tray and the second modular tray being disposed on the base tray, and wherein a plurality of dental appliances are to be simultaneously thermoformed on the plurality of molds disposed on the first modular tray and the second modular tray.

A fiftieth implementation may further extend the forty-ninth implementation. In the fiftieth implementation, the plurality of molds comprises: a first mold and a second mold printed on the first modular tray; and a third mold and a fourth mold printed on the second modular tray.

A fifty-first implementation may further extend the forty-ninth or fiftieth implementation. In the fifty-first implementation, the first modular tray comprises a first identifier to identify the first mold and the second mold.

A fifty-second implementation may further extend any of the forty-ninth through fifty-first implementations. In the fifty-second implementation, the first modular tray and the second modular tray are configured to be attached to each other via an attachment component that attaches to a first bottom portion of the first modular tray and a second bottom portion of the second modular tray via a friction fit.

A fifty-third implementation may further extend any of the forty-ninth through fifty-second implementations. In the fifty-third implementation: an adjustable pallet is configured to be adjusted in size based on a quantity of modular trays to be used to simultaneously thermoform the plurality of dental appliances; and a sheet of plastic is to be attached to the adjustable pallet, heated, and thermoformed on the plurality of molds to form the plurality of dental appliances.

A fifty-fourth implementation may further extend any of the forty-ninth through fifty-third implementations. In the fifty-fourth implementation: an adjustable heating mask is configured to be adjusted in size based on a quantity of modular trays to be used to simultaneously thermoform the plurality of dental appliances; and the adjustable heating mask is to be placed on a sheet of plastic during heating of the sheet of plastic before the sheet of plastic is thermoformed on the plurality of molds to form the plurality of dental appliances.

A fifty-fifth implementation may further extend any of the forty-ninth through fifty-fourth implementations. In the fifty-fifth implementation: an adjustable thermoforming chamber is configured to be adjusted in size based on a quantity of modular trays to be used to simultaneously thermoform the plurality of dental appliances; and a sheet of plastic is to be thermoformed via the adjustable thermoforming chamber on the plurality of molds to form the plurality of dental appliances.

A fifty-sixth implementation may further extend any of the forty-ninth through fifty-fifth implementations. In the fifty-sixth implementation: an adjustable lift device is configured to be adjusted in size based on a quantity of modular trays; and the plurality of molds are to be disposed on the adjustable lift device and the adjustable lift device is to transport the plurality of molds to simultaneously thermoform the plurality of dental appliances.

A fifty-seventh implementation may further extend any of the forty-ninth through fifty-sixth implementations. In the fifty-seventh implementation, a heating station is configured to be adjusted based on a quantity of modular trays to be used to simultaneously thermoform the plurality of dental appliances.

In a fifty-eighth implementation, a modular tray includes: an upper surface that is substantially planar; and a lower surface comprising: a substantially planar portion; and a recessed feature, wherein an attachment component is to removably attach to the recessed feature of the modular tray and an additional recessed feature of an additional modular tray to attach the modular tray to the additional modular tray, wherein a plurality of molds are to be simultaneously three-dimensionally (3D) printed on the upper surface of the modular tray and on the additional modular tray, and wherein a plurality of dental appliances are to be simultaneously thermoformed on the plurality of molds printed on the modular tray and the additional modular tray.

A fifty-ninth implementation may further extend the fifty-eighth implementation. In the fifty-ninth implementation, the attachment component is to removably attach the modular tray to the additional modular tray via one or more of a friction fit or a mechanical coupling.

A sixtieth implementation may further extend the fifty-eighth or fifty-ninth implementation. In the sixtieth implementation, the modular tray comprises an identifier to be associated with corresponding molds to be printed on the modular tray.

A sixty-first implementation may further extend any of the fifty-eighth through sixtieth implementations. In the sixty-first implementation, the identifier comprises one or more of an optically-readable identifier or a radio-frequency identification (RFID) identifier.

A sixty-second implementation may further extend any of the fifty-eighth through sixty-first implementations. In the sixty-second implementation, the modular tray comprises a marker to be used to differentiate a first mold printed on the modular tray from a second mold printed on the modular tray.

A sixty-third implementation may further extend any of the fifty-eighth through sixty-second implementations. In the sixty-third implementation, the marker is located proximate a first edge or a first corner of the upper surface of the modular tray.

In a sixty-fourth implementation, a system comprises: an assembly station comprising an assembly device configured to removably attach two or more modular trays to each other to form a sub-tray; and a printing station comprising a printing device configured to simultaneously three-dimensionally (3D) print a plurality of molds on the two or more modular trays of the sub-tray, wherein a sheet of plastic is to be thermoformed on the plurality of molds to form a plurality of dental appliances.

A sixty-fifth implementation may further extend the sixty-fourth implementation. In the sixty-fifth implementation, the system may further comprise a loading station configured to select the sheet of plastic and adjust a pallet based on the sub-tray of the two or more modular trays.

A sixty-sixth implementation may further extend the sixty-fourth or sixty-fifth implementation. In the sixty-sixth implementation, the system may further comprise a heating station configured to adjust a heating device and a heating mask based on the sub-tray of the two or more modular trays.

A sixty-seventh implementation may further extend any of the sixty-fourth through sixty-sixth implementations. In the sixty-seventh implementation, the system may further comprise a thermoforming station configured to adjust a pressure device based on the sub-tray of the two or more modular trays.

A sixty-eighth implementation may further extend any of the sixty-fourth through sixty-seventh implementations. In the sixty-eighth implementation, the system may further comprise a laser operation station configured to perform laser operations on the plurality of dental appliances subsequent to being thermoformed.

In a sixty-ninth implementation, a method comprises: determining that a plurality of modular trays are to be used for simultaneously thermoforming a set of dental appliances; causing the plurality of modular trays to be removably attached to each other; and causing a set of molds to be simultaneously printed onto the plurality of modular trays, wherein the set of dental appliances are to be simultaneously thermoformed on the set of molds.

A seventieth implementation may further extend the sixty-ninth implementation. In the seventieth implementation, the method further comprises: causing the plurality of modular trays that have been attached to each other to be placed on a base tray, wherein the set of molds are to be simultaneously printed onto the plurality of modular trays disposed on the base tray.

A seventy-first implementation may further extend the sixty-ninth or seventieth implementation. In the seventy-first implementation, the method further comprises: causing pallet size of a pallet to be adjusted based on the plurality of modular trays that are to be used for the simultaneous thermoforming; identifying a sheet of plastic based on the plurality of modular trays that are to be used for the simultaneous thermoforming; causing a heating mask and a heating device to be adjusted based on the plurality of modular trays that are to be used for the simultaneous thermoforming; and causing corresponding size of a thermoforming chamber and a lifting device to be adjusted based on the plurality of modular trays that are to be used for the simultaneous thermoforming.

A seventy-second implementation may further extend any of the sixty-ninth through seventy-first implementations. In the seventy-second implementation, the method further comprises: causing the sheet of plastic to be attached to the pallet; causing, via the heating device, the sheet of plastic attached to the pallet to be heated; causing the plurality of modular trays to be placed on the lifting device; causing the lifting device to transport the plurality of modular trays to be proximate the sheet of plastic that has been heated; and causing, via the thermoforming chamber, the sheet of plastic to be thermoformed on the set of molds to form the set of dental appliances.

A seventy-third implementation may further extend any of the sixty-ninth through seventy-second implementations. In the seventy-third implementation, the method further comprises: causing the plurality of modular trays to be moved to a laser operation station; and causing, via laser tools, marking and trimming of the set of dental appliances.

A seventy-fourth implementation may further extend any of the sixty-ninth through seventy-third implementations. In the seventy-fourth implementation, the method further comprises: identifying a plurality of dental appliances to be produced; categorizing, based on dental appliance data, a subset of the plurality of dental appliances into a category; determining, based on the category, a set of modular trays to be formed into a sub-tray; assigning the sub-tray to a base tray; and determining position and orientation of each modular tray of the set of modular trays and of the sub-tray relative to the base tray.

A seventy-fifth implementation may further extend any of the sixty-ninth through seventy-fourth implementations. In the seventy-fifth implementation, the method further comprises: causing a first modular tray and a second modular tray of the set of modular trays to be inverted; causing an attachment component to be attached to a lower surface of the first modular tray and the second modular tray to form the sub-tray; and causing the sub-tray to be placed on the base tray, where the set of molds are to be formed on the sub-tray disposed on the base tray.

In a seventy-sixth implementation, a non-transitory machine readable storage medium having instructions stored thereon, which, when executed by a processing device, cause the processing device to perform operations comprising: determining that a plurality of modular trays are to be used for simultaneously thermoforming a set of dental appliances; causing the plurality of modular trays to be removably attached to each other; and causing a set of molds to be simultaneously printed onto the plurality of modular trays, wherein the set of dental appliances are to be simultaneously thermoformed on the set of molds.

A seventy-seventh implementation may further extend the seventy-sixth implementation. In the fifty-first implementation, the operations further comprise: causing the plurality of modular trays that have been attached to each other to be placed on a base tray, wherein the set of molds are to be simultaneously printed onto the plurality of modular trays disposed on the base tray.

A seventy-eighth implementation may further extend the seventy-sixth or seventy-seventh implementation. In the seventy-eighth implementation, the operations further comprise: causing pallet size of a pallet to be adjusted based on the plurality of modular trays that are to be used for the simultaneous thermoforming; identifying a sheet of plastic based on the plurality of modular trays that are to be used for the simultaneous thermoforming; causing a heating mask and a heating device to be adjusted based on the plurality of modular trays that are to be used for the simultaneous thermoforming; and causing corresponding size of a thermoforming chamber and a lifting device to be adjusted based on the plurality of modular trays that are to be used for the simultaneous thermoforming.

A seventy-ninth implementation may further extend any of the seventy-sixth through seventy-eighth implementations. In the seventy-ninth implementation, the operations further comprise: causing the sheet of plastic to be attached to the pallet; causing, via the heating device, the sheet of plastic attached to the pallet to be heated; causing the plurality of modular trays to be placed on the lifting device; causing the lifting device to transport the plurality of modular trays to be proximate the sheet of plastic that has been heated; and causing, via the thermoforming chamber, the sheet of plastic to be thermoformed on the set of molds to form the set of dental appliances.

An eightieth implementation may further extend any of the seventy-sixth through seventy-ninth implementations. In the eightieth implementation, the operations further comprise: causing the plurality of modular trays to be moved to a laser operation station; and causing, via laser tools, marking and trimming of the set of dental appliances.

An eighty-first implementation may further extend any of the seventy-sixth through eightieth implementations. In the eighty-first implementation, the operations further comprise: identifying a plurality of dental appliances to be produced; categorizing, based on dental appliance data, a subset of the plurality of dental appliances into a category; determining, based on the category, a set of modular trays to be formed into a sub-tray; assigning the sub-tray to a base tray; and determining position and orientation of each modular tray of the set of modular trays and of the sub-tray relative to the base tray.

An eighty-second implementation may further extend any of the seventh-sixth through eighty-first implementations. In the eighty-second implementation, the operations further comprise: causing a first modular tray and a second modular tray of the set of modular trays to be inverted; causing an attachment component to be attached to a lower surface of the first modular tray and the second modular tray to form the sub-tray; and causing the sub-tray to be placed on the base tray, where the set of molds are to be formed on the sub-tray disposed on the base tray.

In a eighty-third implementation, a system comprises: a processing device; and a memory coupled to the processing device, the processing device to: determine that a plurality of modular trays are to be used for simultaneously thermoforming a set of dental appliances; cause the plurality of modular trays to be removably attached to each other; and cause a set of molds to be simultaneously printed onto the plurality of modular trays, wherein the set of dental appliances are to be simultaneously thermoformed on the set of molds.

An eighty-fourth implementation may further extend the eighty-third implementation. In the eighty-fourth implementation, the processing device is further to: cause the plurality of modular trays that have been attached to each other to be placed on a base tray, wherein the set of molds are to be simultaneously printed onto the plurality of modular trays disposed on the base tray.

An eighty-fifth implementation may further extend the eighty-third or eighty-fourth implementation. In the eighty-fifth implementation, the processing device is further to: cause pallet size of a pallet to be adjusted based on the plurality of modular trays that are to be used for the simultaneous thermoforming; identify a sheet of plastic based on the plurality of modular trays that are to be used for the simultaneous thermoforming; cause a heating mask and a heating device to be adjusted based on the plurality of modular trays that are to be used for the simultaneous thermoforming; and cause corresponding size of a thermoforming chamber and a lifting device to be adjusted based on the plurality of modular trays that are to be used for the simultaneous thermoforming.

An eighty-sixth implementation may further extend any of the eighty-third through eighty-fifth implementations. In the eighty-sixth implementation, the processing device is further to: cause the sheet of plastic to be attached to the pallet; cause, via the heating device, the sheet of plastic attached to the pallet to be heated; cause the plurality of modular trays to be placed on the lifting device; cause the lifting device to transport the plurality of modular trays to be proximate the sheet of plastic that has been heated; and cause, via the thermoforming chamber, the sheet of plastic to be thermoformed on the set of molds to form the set of dental appliances.

An eighty-seventh implementation may further extend any of the eighty-third through eighty-sixth implementations. In the eighty-seventh implementation, the processing device is further to: cause the plurality of modular trays to be moved to a laser operation station; and cause, via laser tools, marking and trimming of the set of dental appliances.

An eighty-eighth implementation may further extend any of the eighty-third through eighty-seventh implementations. In the eighty-eighth implementation, the processing device is further to: identify a plurality of dental appliances to be produced; categorize, based on dental appliance data, a subset of the plurality of dental appliances into a category; determine, based on the category, a set of modular trays to be formed into a sub-tray; assign the sub-tray to a base tray; and determine position and orientation of each modular tray of the set of modular trays and of the sub-tray relative to the base tray.

An eighty-ninth implementation may further extend any of the eighty-third through eighty-eighth implementations. In the eighty-ninth implementation, the processing device is further to: cause a first modular tray and a second modular tray of the set of modular trays to be inverted; cause an attachment component to be attached to a lower surface of the first modular tray and the second modular tray to form the sub-tray; and cause the sub-tray to be placed on the base tray, where the set of molds are to be formed on the sub-tray disposed on the base tray.

BRIEF DESCRIPTION OF THE DRAWINGS

The present invention is illustrated by way of example, and not by way of limitation, in the figures of the accompanying drawings.

FIGS. 3A-B are example data set generators to create data sets for a machine learning model, according to certain embodiments.

FIG. 3C is a block diagram illustrating determining predictive data, according to certain embodiments.

DETAILED DESCRIPTION

Figure 1:
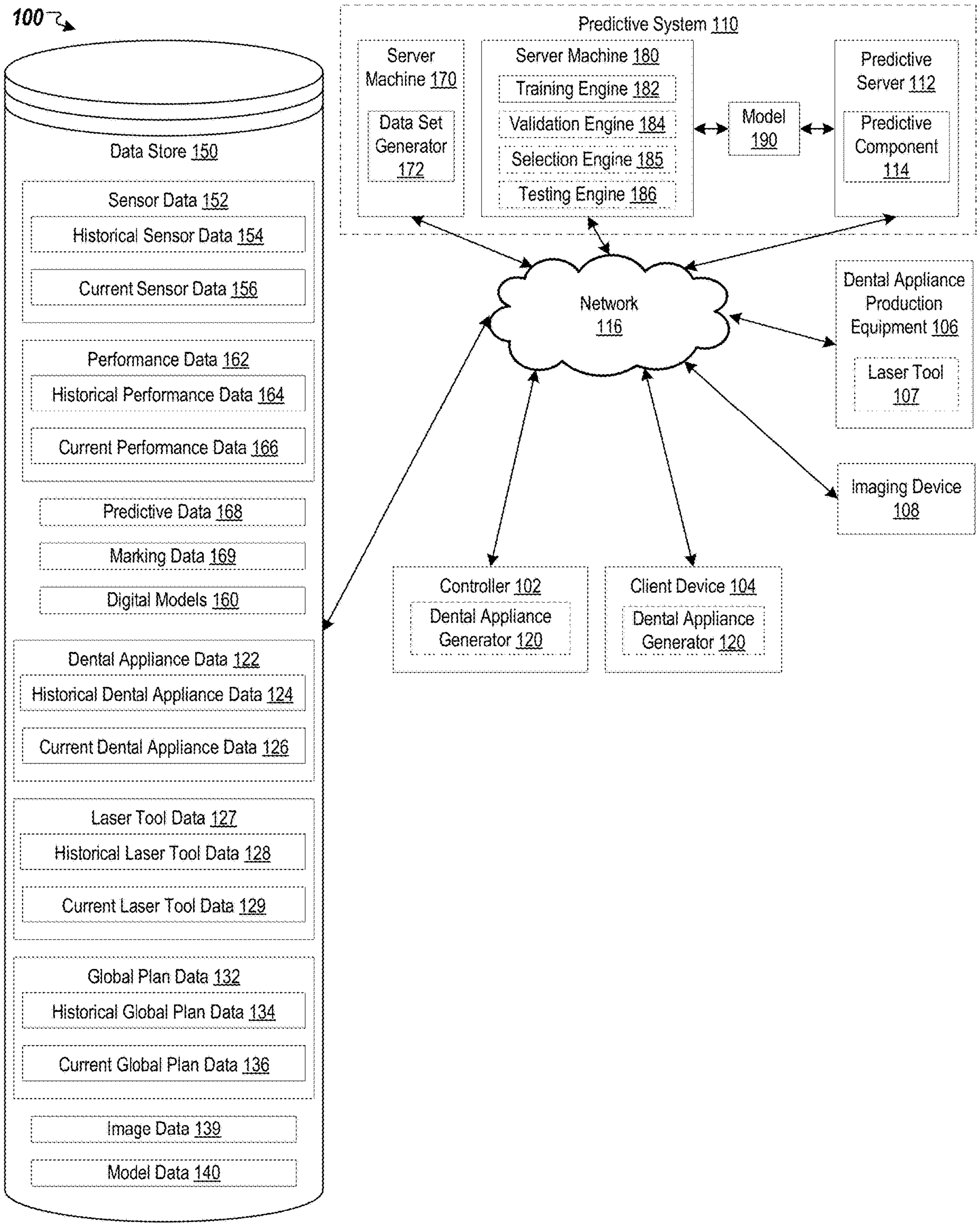
FIG. 1 is a block diagram illustrating an exemplary system architecture, according to certain embodiments.

Described herein are technologies related to dental appliance production (e.g., laser marking of dental appliances).

Manufacturing systems are used to produce products. Some manufacturing systems use molds to produce products. For example, some dental appliance systems use molds (e.g., of jaws, associated with teeth of a user, associated with a dental arch of a user, etc.) to form dental appliances. A dental appliance may include one or more incremental palatal expanders, orthodontic aligners (e.g., dental appliances with or without mandibular advancement structures and/or other structures), sleep apnea treatment devices, dental attachment templates, attachment formation templates (e.g., appliances used to place attachments that engage with attachment wells and/or other structures in aligners to exert repositioning forces on a patient's dentition) that include regions that comprise pre-fabricated (e.g., 3D printed) attachments, and/or other dental appliances.

During manufacturing of dental appliances, laser operations are performed. Laser operations may include laser marking (e.g., to add an identifier to the dental appliance that is a machine readable and/or human readable label), trimming (e.g., removing the dental appliance from the sheet of plastic), and/or the like. Laser equipment use parameters to perform the laser operations. Incorrect parameters cause failure in dental appliance production, defective dental appliances, reduced life of dental appliances, increased energy used, waste of materials, and/or the like. Conventionally, a user performs a laser operation, manually inspects the dental appliance, manually adjusts the parameters, performs a laser operation on a new dental appliance, manually inspects the new dental appliance, manually adjusts the parameters, and continues until the user determines a dental appliance passes a manual inspection. This process (e.g., manual re-calibration) is time consuming and generates material waste. Due to variability in the material composition (e.g., roll of plastic, thickness of plastic, etc.), equipment degradation, geometrical changes in each dental appliance, etc., laser operations are conventionally inconsistent and result in poor results (e.g., poor marking quality of the dental appliance, poor trimming quality of the dental appliance, etc.).

Conventionally, production of dental appliances (e.g., aligners, retainers, etc.) includes many operations, variability of dental appliances (e.g., high variability in geometries and anatomies, each anatomy may be unique), and variability in materials (e.g., different thicknesses of sheets of plastic, etc.) used to make the dental appliances. The many operations, variability of dental appliances and variability of materials causes increase in processing time, increase in equipment, decrease in yield, waste of material, etc. This also causes errors and an increase in user time, processor overhead, energy consumption, and bandwidth used to correct the errors. This also causes a decrease in the amount of dental appliances that can be produced simultaneously (e.g., prohibits high mix and/or high volume manufacturing processes). This also causes an increase in different types of equipment to be used, maintained, and cleaned to produce dental appliances.

Embodiments of the devices, systems, components, and methods described herein address at least some of the above described deficiencies of conventional systems.

In some embodiments, a processing device identifies marking parameters associated with performance of dental appliance etching (e.g., marking). For example, the marking parameters may include one or more of power data, frequency data, pitch data, resolution data, focal data (e.g., focal point position), focus data, velocity data, number of passes, and/or the like. The processing device identifies a segment of marking data to be etched onto a dental appliance. The segment may be a line or a curve of a character (e.g., letter or number). The processing device causes dental appliance marking equipment to etch, based on the marking parameters, the segment on the dental appliance. The processing device captures image data associated with the etching of the segment (e.g., in real time). The processing device causes the marking parameters to be updated based on the image data. For example, if the processing device determines, based on the image data, that the segment does not meet one or more threshold values (e.g., thickness, intensity, legibility, non-blurriness, etc.), the processing device may cause the marking parameters to be updated so that segments meet threshold values.

The processing device may use a trained machine learning models to determine the updated manufacturing parameters. In some embodiments, the processing device identifies marking parameters and image data associated with the performance of the dental appliance etching and provides the marking parameters and the image data as input to a trained machine learning model. The trained machine learning model may have been trained using data input of historical marking parameters and historical performance data (e.g., image data, whether the segment etched meets threshold values, etc.). The trained machine learning model may have been trained using target output of historical updated marking parameters. The processing device may obtain output associated with predictive data from the trained machine learning model and may determine, based on the predictive data, updated marking parameters to cause performance of the dental appliance etching.

The processing device may use a trained machine learning model to determine whether a corrective action is to be performed. In some embodiments, the processing device identifies image data associated with performance of dental appliance etching of a dental appliance and provides the image data as input to a trained machine learning model. The trained machine learning model may have been trained with data input of historical image data and target output of historical performance data (e.g., whether the segment in the image data meets threshold values). The processing device obtains output associated with predictive data from the trained machine learning model and causes performance of a corrective action based on the predictive data. The corrective action may include updating manufacturing parameters, discarding the dental appliance, re-etching the dental appliance, and/or the like.

In some embodiments, dental appliances are simultaneously thermoformed via a thermoforming system in a single batch. For example, the dental appliances may be formed by a single sheet of plastic being simultaneously thermoformed on molds. Subsequent to the dental appliances being simultaneously thermoformed, a process device may determine dental appliance data and laser tool data. The dental appliance data may include one or more of a three-dimensional (3D) model associated with the dental appliances, image data of the dental appliances, corresponding geometry of each dental appliance, corresponding location of each dental appliance, and/or corresponding clearance between corresponding dental appliances. The laser tool data may include potential trajectories, range of reach, and degrees of reach of each laser tools. Each laser tool may include a laser heat configured to perform one or more laser operations (e.g., laser marking, laser trimming, etc.) and a positioning system configured to move the laser head in potential trajectories.

The processing device further determines, based on the dental appliance data and the laser tool data, global plan data for performing laser operations of the dental appliances via laser tools. In some embodiments, determining the global plan data includes subdividing the single batch into groups (e.g., sub-trays) based on dental appliance data, where a laser tool is configured to perform a corresponding laser operation of a corresponding group (e.g., sub-tray) prior to performing a subsequent laser operation of a subsequent group (e.g., sub-tray). For example, a global plan may include: causing a first laser tool to laser mark a first group (e.g., first sub-tray) of dental appliances and simultaneously causing a second laser tool to laser trim a second group (e.g., second sub-tray) of dental appliances; and then causing the first laser tool to laser mark the second group of dental appliances and simultaneously causing the second laser tool to trim the first group of dental appliances. The global plan may include the trajectories, speeds, etc. of the laser tools (e.g., to avoid collision). The processing device further causes, based on the global plan data via the laser tools, the laser operations of the dental appliances.

In some embodiments, the processing device uses machine learning to perform one or more operations. For example, the processing device may identify: historical dental appliance data associated with historical dental appliances that were simultaneously thermoformed via a thermoforming system in a single batch; historical laser tool data associated with historical laser tools used to perform historical laser operations of the historical dental appliances; and historical global plan data associated with historical performance of the historical laser operations. The processing device may train a machine learning model using data input including the historical dental appliance data and the historical laser tool data and target output including the historical global plan data to generate a trained machine learning model configured to provide output associated with predicted global plan data for performance of laser operations via a plurality of laser tools of a plurality of dental appliances.

The processing device may identify: dental appliance data associated with dental appliances that were simultaneously thermoformed via a thermoforming system in a single batch; and laser tool data associated with a laser tools configured to perform laser operations. The processing device may further provide the dental appliance data and the laser tool data as input to a trained machine learning model and receive, from the trained machine learning model, output associated with predictive data. The processing device may further determine, based on the predictive data, global plan data associated with performing the laser operations of the plurality of dental appliances via the plurality of laser tools.

In some embodiments, dental appliance production is performed using modular trays. A system may include a first modular tray, a second modular tray, and a base tray. The first modular tray may include a first upper surface and the second modular tray may include a second upper surface. The first modular tray and the second modular tray may be configured to be removably attached to each other. The first modular tray and the second modular tray are to be disposed on the base tray responsive to the first modular tray and the second modular tray being removably attached to each other. Molds are to be simultaneously printed on the first modular tray and the second modular tray responsive to the first modular tray and the second modular tray being disposed on the base tray. Dental appliances are to be simultaneously thermoformed on the molds disposed on the first modular tray and the second modular tray.

In some embodiments, a processing device determines that modular trays are to be used for simultaneously thermoforming a set of dental appliances. The processing device causes the modular trays to be removably attached to each other and causes a set of molds to be simultaneously printed onto the modular trays. The set of dental appliances are to be simultaneously thermoformed on the set of molds.

Aspects of the present disclosure result in technological advantages compared to conventional systems. The present disclosure, even with variability of dental appliances and variability of materials, may have decreased processing time, decreased equipment, increased yield, decrease in waste of material, increase in throughput, improvement in quality, etc. compared to conventional systems. The present disclosure may have less errors compared to conventional systems and a decrease in user time, processor overhead, energy consumption, and bandwidth compared to that used by conventional systems to correct errors. This causes an increase in amount of dental appliances that can be produced simultaneously (e.g., allows high mix and/or high volume manufacturing processes). This present disclosure may have a decrease in different types of equipment to be used maintained, and cleaned to produce dental appliances. The present disclosure may remove the manual calibration process of conventional systems. The present disclosure may evaluate and perform adjustments of manufacturing parameters in real-time to achieve a consistent and better marking quality compared to conventional systems. This results in less time, less energy, less waste, and improved dental appliances.

Although some embodiments of the present disclosure describe dental appliances and laser operations (e.g., etching) of dental appliances, in other embodiments, other types of objects may be formed and other processes may be performed by the methods of the present disclosure (e.g., laser marking and trimming processes for orthodontic appliances, industrial laser marking and cutting, etc.).

FIG. 1 is a block diagram illustrating an exemplary system architecture of system 100, according to certain embodiments. The system 100 may perform one or more processes associated with mold and/or dental appliance production. For example, system 100 may perform mold design, mold formation, mold identification, dental appliance production, laser operations, dental appliance marking, dental appliance trimming, and/or the like. In some embodiments, processes associated with mold and/or dental appliance production are controlled by a controller 102 or a client device 104.

In some embodiments, controller 102 and/or client device 104 may perform dental appliance production operations, such as laser operations (e.g., laser marking, laser etching, trimming, etc.) associated with dental appliances (e.g., see FIGS. 5A-L). In some embodiments, controller 102 and/or client device 104 may perform mold and/or dental appliance production (e.g., see FIG. 5G).

The system 100 includes a controller 102, a client device 104, dental appliance production equipment 106, imaging device 108, predictive server 112, and data store 150. Dental appliance production equipment 106 may include laser tools 107. The predictive server 112 may be part of a predictive system 110. The predictive system 110 may further include server machines 170 and 180.

The controller 102, client device 104, dental appliance production equipment 106, imaging device 108, predictive server 112, data store 150, server machine 170, and server machine 180 may be coupled to each other via a network 116. In some embodiments, network 116 is a public network that provides client device 104 with access to the predictive server 112, data store 150, and other publicly available computing devices. In some embodiments, network 116 is a private network that provides controller 102 access to the dental appliance production equipment 106, imaging device 108, data store 150, and other privately available computing devices and that provides client device 104 access to the predictive server 112, data store 150, and other privately available computing devices. Network 116 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 104 may include a computing device such as a personal computer (PC), desktop computer, laptop, mobile phone, smart phone, tablet computer, netbook computer, etc. The client device 104 may include a dental appliance generator 120. Dental appliance generator 120 may receive user input (e.g., via a graphic user interface (GUI) displayed via the client device 104) of a mold to be generated and/or a dental appliance to be formed using a mold. In some embodiments, the dental appliance generator 120 transmits data to the predictive system 110, receives output (e.g., predictive data 168) from the predictive system 110, and/or causes the mold and/or dental appliance to be generated. Client device 104 may include an operating system that allows users to one or more of generate, view, or edit data. In some embodiments, the dental appliance generator 120 may cause a mold and/or dental appliance to be generated.

The controller 102, predictive server 112, server machine 170, and server machine 180 may each include one or more computing devices such as a rackmount server, a router computer, a server computer, a PC, a mainframe computer, a laptop computer, a tablet computer, a desktop computer, graphics processing unit (GPU), accelerator application-specific integrated circuit (ASIC) (e.g., tensor processing unit (TPU)), etc.

The controller 102 and/or client device 104 may include a dental appliance generator 120. The dental appliance generator 120 may perform processes associated with mold and/or dental appliance production (e.g., FIGS. 5A-5F). For example, dental appliance generator 120 may receive data (e.g., from imaging device 108, from the data store 150), and store the data in the data store 150. Predictive system 110 may use at least a portion of the data to determine predictive data 168.

The predictive server 112 may include a predictive component 114. In some embodiments, the predictive component 114 may retrieve data from data store 150 and generate output (e.g., predictive data 168) for production of molds and/or dental appliances. In some embodiments, the predictive component 114 may use a trained machine learning model 190 to determine the output for producing the molds and/or dental appliances. The trained machine learning model 190 may be trained using data to learn key process and hardware parameters.

Data store 150 may be memory (e.g., random access memory), a drive (e.g., a hard drive, a flash drive), a database system, or another type of component or device capable of storing data. Data store 150 may include multiple storage components (e.g., multiple drives or multiple databases) that may span multiple computing devices (e.g., multiple server computers). The data store 150 may store one or more of sensor data 152 (e.g., historical sensor data 154, current sensor data 156, etc.), performance data 162 (e.g., historical performance data 164, current performance data 166, etc.), predictive data 168, marking data 169 (e.g., one or more of characters, alphanumeric characters, segments of characters, etc.), digital models 160, dental appliance data 122 (e.g., historical dental appliance data 124, current dental appliance data 126, etc.), laser tool data 127 (e.g., historical laser tool data 128, current laser tool data 129), global plan data 132 (e.g., historical global plan data 134, current global plan data 136, etc.), image data 139, model data 140 (e.g., digital models), etc.

Sensor data 152 may include marking parameters used by dental appliance production equipment 106 to produce (e.g., mark, trim, perform laser operations) dental appliances. The marking parameters may include one or more of power data, frequency data, pitch data, resolution data, focal data, or velocity data. Sensor data 152 may include image data (e.g., from imaging device 108) of a mold and/or dental appliance before, during (e.g., in real-time), and/or after dental appliance manufacturing operations (e.g., laser operations, marking, trimming, etc.). Sensor data may include temperature data associated with the dental appliance (e.g., temperature of the dental appliance).

Performance data 162 may include an indication of a thickness, intensity, blurriness, legibility, illegibility, and/or the like of the laser operation (e.g., etching, marking, trimming, etc.) of the dental appliance resulting from the laser operation. A thickness may be the thickness of the segment etched via the laser operation. The intensity may be a depth (e.g., into the dental appliance) of the segment etched via the laser operation. The blurriness may be associated with the edges of the laser marking (e.g., whether the edges are a straight or pixelated). Legibility or illegibility may refer to whether a person and/or machine can correctly read the laser marking (e.g., the alphanumeric characters of the laser marking).

In some embodiments, predictive data 168 includes predictive performance data 162 based on the sensor data 152. In some embodiments, predictive data 168 includes predictive global plan data based on the dental appliance data 152 and the laser tool data 157.

Digital model 160 may be associated with a model of the dental arch of a user. The digital model 160 may be of the current dental arch of the user or may be of a future dental arch of the user (e.g., after using a stage of a dental appliance).

Dental appliance data 122 may include geometry of each dental appliance, location of each dental appliance (e.g., on modular trays), clearance between dental appliances, etc. The dental appliance data 122 may be determined based on model data (e.g., of dental appliances) and image data (e.g., of the dental appliances).

Laser tool data 127 may include potential trajectories, range of reach, degrees of freedom, etc. of each laser tool 107.

Global plan data 132 may include one or more of when particular laser tools 107 are to move (e.g., schedule data), how the particular laser tools 107 are to move (e.g., trajectory data), what operations the laser tools 107 are to perform (e.g., marking, trimming, etc.), laser parameters (e.g., velocity, focus, etc.) that the laser tools 107 are to use, etc. Global plan data 132 may be updated based on image data 139 to perform collision avoidance. Global plan data 132 may be determined by subdividing a single batch of dental appliances (e.g., to be simultaneously thermoformed) into groups (e.g., sub-trays) based on dental appliance data. Global plan data 132 may indicate, for each laser tool 107, that the laser tool 107 is to perform a corresponding laser operation of a corresponding group (e.g., sub-tray) of dental appliances prior to performing a subsequent laser operation of a subsequent group (e.g., sub-tray) of dental appliances.

Image data 139 (e.g., from imaging device 108) may be of a mold and/or dental appliance before, during (e.g., in real-time), and/or after dental appliance production operations (e.g., laser operations, marking, trimming, etc.).

Model data 140 (e.g., digital models) may be associated with a mold and/or dental appliance. The model data 140 may be associated with the current dental arch of the user or may be associated with a future dental arch of the user (e.g., after using a stage of a dental arch). The model data 140 may be three-dimensional (3D) model data associated with dental appliances.

In some embodiments, the data store 150 includes laser parameters (e.g., marking parameters, trimming parameters). Laser parameters may include one or more of power data, frequency data, pitch data, resolution data, focal data, velocity data, etc. Laser parameters may be used by dental appliance production equipment 106 to produce (e.g., mark, trim, perform laser operations) dental appliances.

In some embodiments, the client device 104 may store data in the data store 150 and the predictive server 112 may retrieve the data from the data store 150. In some embodiments, the predictive server 112 may store output (e.g., predictive data 168) of the trained machine learning model 190 in the data store 150 and the client device 104 may retrieve the output from the data store 150.

In some embodiments, predictive system 110 further includes server machine 170 and server machine 180. Server machine 170 includes a data set generator 172 that is capable of generating data sets (e.g., a set of data inputs, a set of data inputs and a set of target outputs) to train, validate, and/or test a machine learning model 190. Some operations of data set generator 172 are described in detail below with respect to FIG. 2. In some embodiments, the data set generator 172 may partition data into a training set (e.g., sixty percent of the data), a validating set (e.g., twenty percent of the data), and a testing set (e.g., twenty percent of the data). In some embodiments, the predictive system 110 (e.g., via predictive component 114) generates multiple sets of features. For example, a first set of features may be a first set of data that correspond to each of the data sets (e.g., training set, validation set, and testing set) and a second set of features may be a second set of types of data that correspond to each of the data sets.

Server machine 180 includes a training engine 182, a validation engine 184, selection engine, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a machine learning model 190 using one or more sets of features associated with the training set from data set generator 172. The training engine 182 may generate multiple trained machine learning models 190, where each trained machine learning model 190 corresponds to a distinct set of features of the training set. For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features.

The validation engine 184 may be capable of validating a trained machine learning model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained machine learning models 190 based on the corresponding sets of features of the validation set. The validation engine 184 may discard trained machine learning models 190 that have an accuracy that does not meet a threshold accuracy. In some embodiments, the selection engine 185 may be capable of selecting one or more trained machine learning models 190 that have an accuracy that meets a threshold accuracy. In some embodiments, the selection engine 185 may be capable of selecting the trained machine learning model 190 that has the highest accuracy of the trained machine learning models 190.

The testing engine 186 may be capable of testing a trained machine learning model 190 using a corresponding set of features of a testing set from data set generator 172. For example, a first trained machine learning model 190 that was trained using a first set of features of the training set may be tested using the first set of features of the testing set. The testing engine 186 may determine a trained machine learning model 190 that has the highest accuracy of all of the trained machine learning models based on the testing sets.

The machine learning model 190 may refer to the model artifact that is created by the training engine 182 using a training set that includes data inputs and, in some embodiments, corresponding target outputs (correct answers for respective training inputs). Patterns in the data sets can be found that cluster the data input and/or map the data input to the target output (the correct answer), and the machine learning model 190 is provided mappings that captures these patterns. The machine learning model 190 may use one or more of linear regression, random forest, neural network (e.g., artificial neural network), etc.

Predictive component 114 may provide current data to the trained machine learning model 190 and may run the trained machine learning model 190 on the input to obtain one or more outputs. The predictive component 114 may be capable of determining (e.g., extracting) predictive data 168 associated with producing dental appliances from the output of the trained machine learning model 190 and may determine (e.g., extract) confidence data from the output that indicates a level of confidence that the predictive data 168 corresponds to current data. The predictive component 114 or dental appliance generator 120 may use the confidence data to decide whether to cause a mold or dental appliance to be produced and/or to cause a corrective action to be performed based on the predictive data 168. For example, responsive to determining confidence data that does not meet a threshold amount, the dental appliance generator 120 may cause the dental appliance to not be produced.

The confidence data may include or indicate a level of confidence that the predictive data 168 corresponds to the current data. In one example, the level of confidence is a real number between 0 and 1 inclusive, where 0 indicates no confidence that the predictive data 168 corresponds to the current data and 1 indicates absolute confidence that the predictive data 168 corresponds to the current data. In some embodiments, the system 100 may use predictive system 110 to determine predictive data 168 instead of performing manual operations. In some embodiments, responsive to the confidence data indicating a level of confidence that is below a threshold level, the system 100 may cause a corrective action of providing an alert to not use the dental appliance, re-etch the dental appliance, stop producing dental appliances, inspect the equipment, to manually inspect the dental appliance, to update the manufacturing parameters, etc. Responsive to the confidence data indicating a level of confidence below a threshold level for a predetermined number of instances (e.g., percentage of instances, frequency of instances, total number of instances, etc.) the predictive component 114 may cause the trained machine learning model 190 to be re-trained (e.g., based on current data).

For purpose of illustration, rather than limitation, aspects of the disclosure describe the training of a machine learning model using historical data and inputting current data into the trained machine learning model to determine predictive data 168. In other implementations, a heuristic model or rule-based model is used to determine predictive data 168 (e.g., without using a trained machine learning model). Predictive component 114 may monitor data. Any of the information described with respect to data inputs 301 of FIGS. 3A-B may be monitored or otherwise used in the heuristic or rule-based model.

In some embodiments, the functions of controller 102, client device 104, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, controller 102 and client device 104 may be integrated into a single machine.

In general, functions described in one embodiment as being performed by controller 102, client device 104, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine whether to cause a mold or dental appliance to be produced or performance of a corrective action based on the predictive data 168. In another example, client device 104 may determine the predictive data 168 based on output from the trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Although embodiments of the disclosure are discussed in terms of determining predictive data 168 (e.g., based on sensor data 152, dental appliance data 122, laser tool data 127, etc.) to produce molds and/or dental appliances or to perform a corrective action in dental appliance production, embodiments may also be generally applied to determining predictive data to perform an action.

Figure 2A:
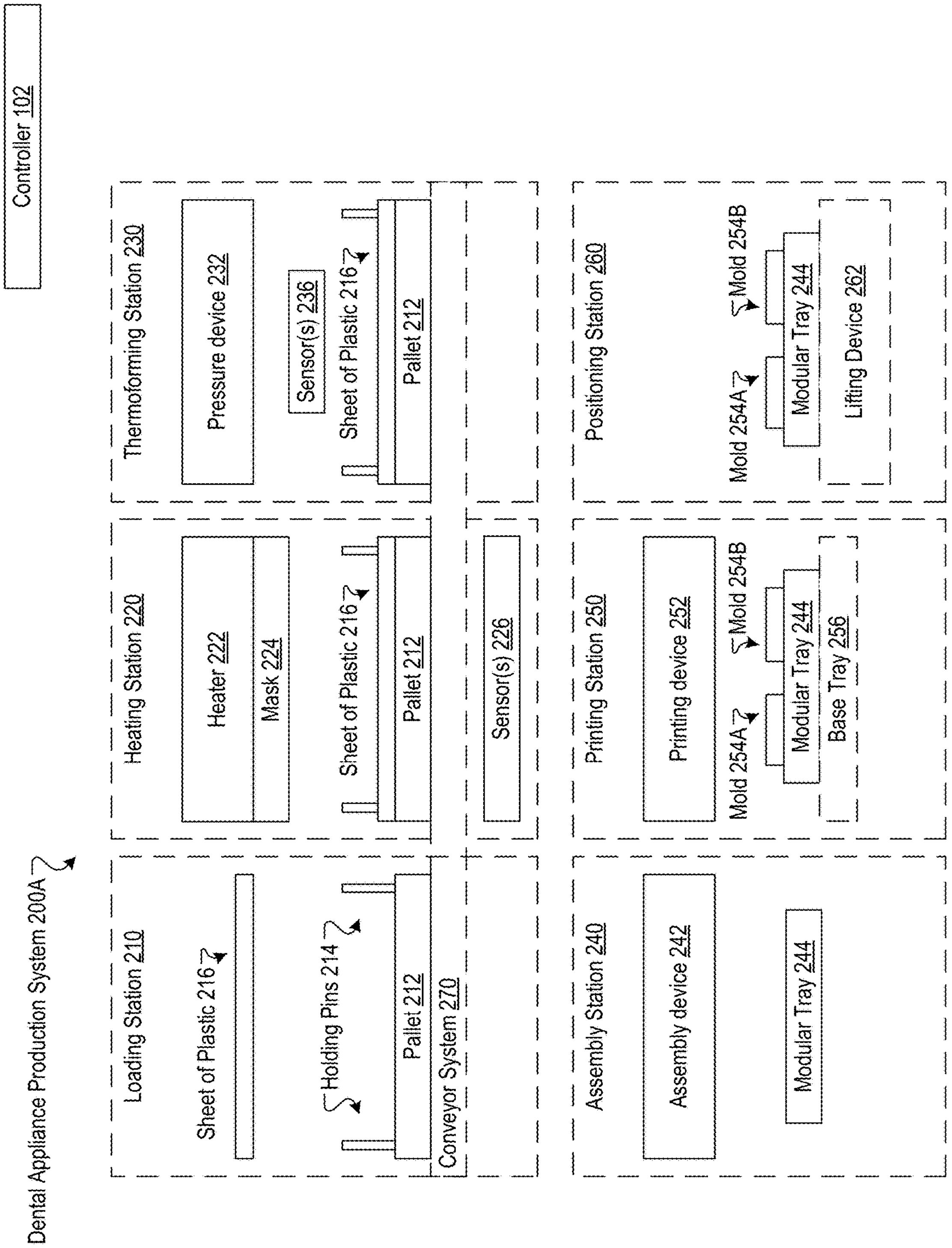
FIGS. 2A-B illustrate dental appliance production systems, according to certain embodiments.
Figure 2B:
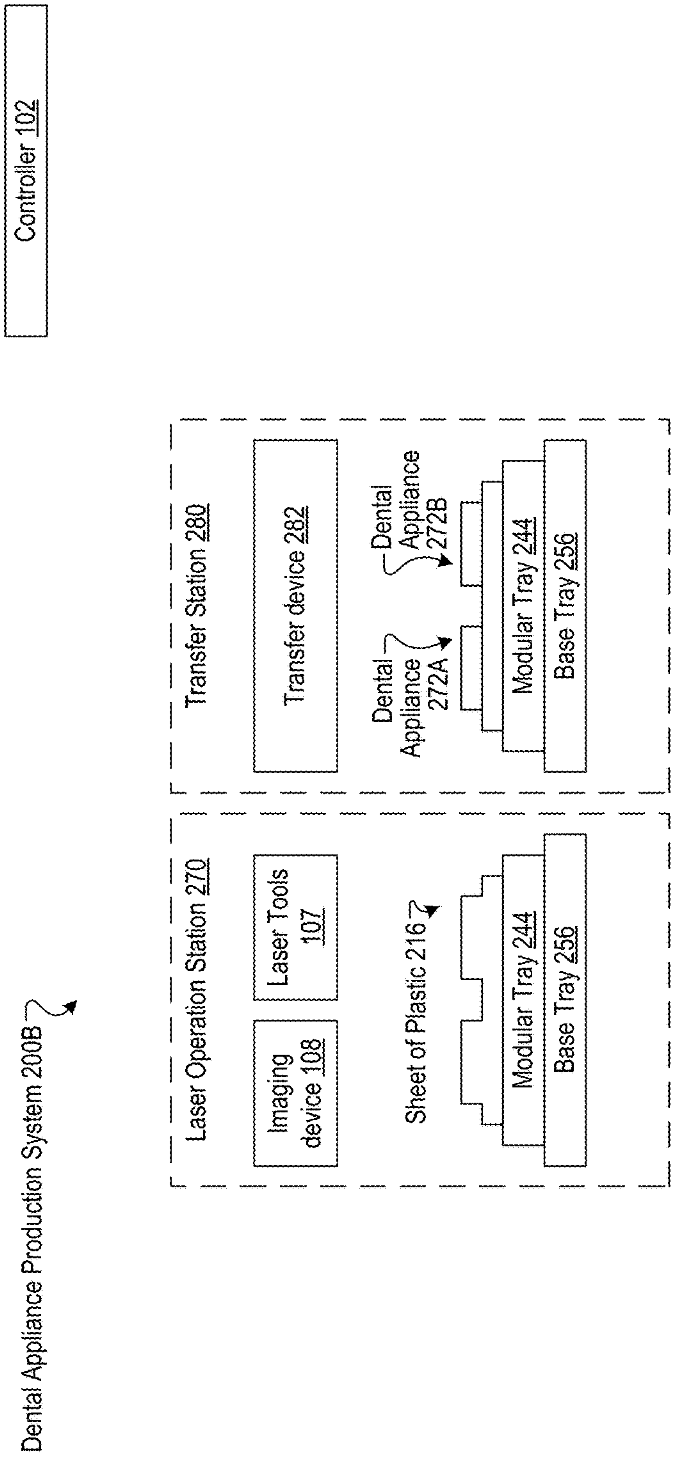

FIGS. 2A-B illustrate dental appliance production systems 200A-B, according to certain embodiments. In some embodiments, one or more of the stations of dental appliance production systems 200A-B are combined into one dental appliance production system 200. In some embodiments, one or more of the stations of dental appliance production systems 200A-B are not included in a dental appliance production system 200. In some embodiments, a dental appliance production system 200 includes one or more of the stations show in FIGS. 2A-B and one or more additional or alternative stations. In some embodiments, dental appliance production systems 200A-B include dental appliance production equipment 106 (e.g., laser tool 107, etc.) of FIG. 1.

Referring to FIG. 2A, a dental appliance production system 200A may include a loading station 210, a heating station 220, a thermoforming station 230, an assembly station 240, a printing station 250, and/or a positioning station 260. Referring to FIG. 2B, a dental appliance production system 200B may include a laser operation station 270 and/or a transfer station 280. In some embodiments, one or more stations may be included before, after, or between the stations illustrated in FIGS. 2A-B.

In some embodiments, dental appliance production system 200 adjusts dynamically to different input data (e.g., dental appliance data 152 and/or laser tool data 157 of FIG. 1). The dental appliance production system 200 optimizes material utilization to produce the dental appliances (e.g., allows maximization of material and resources by mechanisms adjustment during the forming cycle). Based on the input data, the dental appliance production system 200 (e.g., the dynamic forming system) determines and adjusts the material, reconfiguring the dimensions and behavior of one or more components of the dental appliance production system 200 to create dental appliances. The dental appliance production system 200 provides the ability to use different material geometries for thermoforming, whether manually or automatically.

In some embodiments, one or more components (e.g., pallet 212) are transported via a conveyor system 202 (e.g., see FIG. 2A) through one or more of loading station 210, heating station 220, thermoforming station 230, assembly station 240, printing station 250, positioning station 260, laser operation station 270, and/or transfer station 280. The conveyor system 202 may be a conveyor belt, chain conveyor system, and/or the like. The pallets 212 may be chain conveyor pallets.

In some embodiments, one or more stations (e.g., loading station 210, heating station 220, thermoforming station 230, assembly station 240, printing station 250, positioning station 260, laser operation station 270, transfer station 280, etc.) are rotated (e.g., via a dial system) and one or more components (e.g., positioning station 260, molds 254) are rotated (e.g., via dial system) to interface with each other.

At loading station 210, a pallet 212 including holding pins 214 and/or a sheet of plastic 216 may be configured and/or selected and the sheet of plastic 216 may be secured to the pallet 212 via the holding pins 214 (e.g., the holding pins pierce the sheet of plastic). At heating station 220, heater 222 may heat the sheet of plastic 216 secured to the pallet 212. In some embodiments, mask 224 is disposed between the heater 222 and the sheet of plastic 216 (e.g., to provide a substantially thermally isolated environment for heating the sheet of plastic 216). At thermoforming station 230, a pressure device 232 may thermoform the heated sheet of plastic 216 onto the molds 254. In some embodiments, the molds 254 are secured to a modular tray 244 that is lifted via a lifting device 262 to interface with the heated sheet of plastic 216 for the thermoforming. In some embodiments, the molds 254 and sheet of plastic 216 are secured to the same component (e.g., pallet 212, modular tray 244).

At assembly station 240, assembly device 242 (e.g., a robot) secures modular trays 244 to each other. The assembly device 242 may dispose the modular trays 244 on a base tray 256. At printing station 250, printing device 252 prints molds 254 on the modular tray 244 (e.g., that is disposed on the base tray 256). At positioning station 260, lifting device 262 may lift the molds 254 disposed on modular tray 244 to interface with the heated sheet of plastic 216 for thermoforming. At laser operation station 270, laser tools 107 perform laser operations (e.g., marking, trimming) on the sheet of plastic 216 to form dental appliances 272 and imaging device 108 captures image data before, during, and/or after the laser operations. In some embodiments, the thermoformed sheet of plastic is on the molds 254 secured to the modular tray 244 that is on the base tray 256 during the laser operations. In some embodiments, the base tray 256 of laser operation station 270 is different than the base tray of the printing station 250. At transfer station 280, a transfer device 282 (e.g., robot) may remove the dental appliances 272 and molds 254 from the modular tray 244. The transfer device 282 may cause the modular trays 244 to be cleaned as used for additional operations. The transfer device 282 may remove the dental appliances 272 from the molds 254.

In some embodiments, molds 254 and/or dental appliances 272 are generated based on digital models (e.g., model data 160) associated with a dental arch of a user. One or more imaging devices 108 may be used to determine whether each mold 254 and/or dental appliances 272 matches a corresponding digital model. In some embodiments, the imaging device 108 captures image data (e.g., images) of each mold 254 and/or dental appliance 272. A controller 102 (e.g., processing device, client device, server device) may determine, based on the image data, geometries of a mold 254. The controller 102 may determine (e.g., based on image data) an identifier of the mold 254 and/or dental appliance 272 (e.g., via optical character recognition (OCR), reading a bar code, reading a quick response (QR) code, reading an asset tag, reading a radio frequency identification (RFID) tag, reading a near-field communication (NFC) tag, etc.). The controller 102 may identify a digital model based on the identifier. The controller 102 may compare the geometry of the mold 254 and/or dental appliance 272 with the digital model to determine whether the dimensions of the mold 254 and/or dental appliance 272 match the dimensions of the digital model within a threshold value (e.g., meet threshold difference of dimensions). Responsive to the controller 102 determining the mold 254 and/or dental appliance 272 matches the digital model, controller 102 causes the mold 254 and/or dental appliance 272 to be used. Responsive to the mold 254 and/or dental appliance 272 not matching the digital model, controller 102 causes a corrective action to be performed (e.g., discard the mold 254 and/or dental appliance 272, prevent the mold 254 from being used for generating a dental appliance 272, etc.).

The controller 102 identifies two or more molds 254 and two or more modular trays 244 that are to be used for simultaneous thermoforming of dental appliances (e.g., responsive to the molds 254 matching corresponding digital models). The controller 102 may identify the molds 254 and modular trays 244 for simultaneous thermoforming of dental appliances that would use the least amount of material, energy, and/or time per dental appliance. In some examples, the molds 254 that are identified for simultaneous thermoforming of dental appliances are similarly sized.

In some embodiments, the controller 102 causes one or more portions of the dental appliance production system 200 to be configured (e.g., adjusted, re-sized, etc.) based on the molds 254 (e.g., geometries of the molds 254, printing of the molds 254 on the modular tray 244, etc.) and/or modular trays 244 (e.g., shape and size of assembled modular trays 244) that are to be used to simultaneously thermoform dental appliances. In some embodiments, the controller 102 selects (e.g., generates, cuts, etc.) the sheet of plastic 216 based on the molds 254 and/or modular trays 244. In some embodiments, the controller 102 adjusts width and/or length of the pallet 212 (e.g., via servo motors) based on the molds 254 and/or modular trays 244. In some embodiments, the sheet of plastic 216 is sized based on the adjusted size of the pallet 212.

In some embodiments, the controller 102 causes the heating station 220 to be configured based on the molds 254 and/or modular trays 244. The size of the mask 224 may be adjusted (e.g., via servo motors) based on the molds 254 and/or modular trays 244 (e.g., to match the pallet 212 and/or sheet of plastic 216). The position of heating elements in the heater 222 may be adjusted based on the molds 254 and/or modular trays 244. The temperature and/or heating time associated with the heater 222 heating the sheet of plastic 216 may be adjusted based on the molds 254 and/or modular trays 244.

In some embodiments, the controller 102 causes the thermoforming station 230 to be configured based on the molds 254 and/or modular trays 244. The controller 102 may configure the pressure device 232 (e.g., size of the cup used to thermoform the sheet of plastic 216) and/or the pressure provided by the pressure device 232 based on the molds 254 and/or modular trays 244.

In some embodiments, controller 102 may control one or more robots to assemble the modular trays 244 together, place modular trays 244 on a base tray 256, secure sheet of plastic 216 (e.g., activate vacuum to pick up sheet of plastic 216), secure sheet of plastic 216 to pallet 212 (e.g., push the sheet of plastic 216 onto the holding pins 214 and deactivate vacuum), etc. In some embodiments, controller 102 may control one or more adjustment devices (e.g., servo motors, pneumatic devices) to adjust size of one or more of pallet 212, mask 224, heater 222, pressure device 232, lifting device 262, and/or the like.

Responsive to the sheet of plastic 216 being secured to the pallet 212 in loading station 210, the sheet of plastic 216 may remain secured to the pallet 212 during heating via the heating station 220 and during thermoforming via the thermoforming station 230. In some embodiments, the pallet 212 has an upper surface that has a substantially rectangular surface area that forms four corners. The pallet 212 may include a holding pin 214 on the upper surface at each corner. The pallet 212 may include a holding pin 214 on the upper surface at a midpoint between each set of adjacent corners and/or at other positions along a perimeter of the pallet 212. The pallet 212 may have multiple holding pins 214 (e.g., six holding pins, eight holding pins) on the upper surface of the pallet 212 in some embodiments. The holding pins may have sharp points, and may pierce the sheet of plastic 216 to secure the sheet of plastic 216 in embodiments.

After the loading station 210, the controller 102 (e.g., via conveyor system 202) may move pallet 212 to the heating station 220. The heating station 220 may include a heater 222 and a mask 224 (e.g., heater mask, heat mask). The heater 222 may be a ceramic heater, a convection oven, or an infrared heater in embodiments. The mask 224 may be heat resistant up to about 500° F. in embodiments. The mask 224 may be an insulator. The mask 224 may not adhere to the sheet of plastic 216 when the mask 224 and sheet of plastic 216 are heated. The mask may include polytetrafluoroethylene (PTFE) (e.g., Teflon™) in some embodiments. Other materials that are heat resistant, have low thermal conductivity, and that will not adhere to the plastic sheet may also be used.

In some embodiments, the heating station 220 includes one or more heaters 222 (e.g., three heaters, four heaters, heating elements), where each heater 222 (e.g., heating element, infrared heater) heats a corresponding zone. The heating station 220 may include one or more sensors 226 (e.g., to measure temperature). In some embodiments, there is at least one sensor 226 per heater 222 (e.g., at least one sensor 226 per zone). A sensor 226 may be located below each heater 222 (e.g., below the sheet of plastic 216). The sensors 226 may determine the temperature of the sheet of plastic 216 and/or the air around the sheet of plastic 216. A heating profile of the sheet of plastic 216 may be determined based on sensor data from the sensors 226.

In some embodiments, one or more sensors 226 may be disposed in the heating station 220 (e.g., in the heating chamber, above the sheet of plastic 216, etc.). In some embodiments, a corresponding sensor 226 is located above or below each corner of the sheet of plastic 216 (e.g., within the heating space, within the interior perimeter of the mask 224). In some embodiments, one or more sensors 226 are located above or below a middle portion of the sheet of plastic 216 (e.g., between a first mold and a second mold).

In some embodiments, the sensors 226 may be disposed below the sheet of plastic 216. One or more sensors 226 may be disposed in a first plane and the sheet of plastic 216 may be disposed in a second plane. The second plane may be substantially parallel to the first plane. The second plane may be a distance above the first plane. The distance between a first sensor 226 and a second sensor 226 may be less than the distance between the first plane and the second plane. In some embodiments, the distance between a first sensor 226 and a second sensor 226 is about one tenth the distance between the first plane and the second plane (e.g., sensor spacing is about one tenth the spacing between a sensor 226 and the sheet of plastic 216).

Controller 102 (e.g., processing device) may receive the sensor data from the sensors 226. The controller 102 may determine whether one or more temperatures associated with the sheet of plastic 216 meet one or more threshold values (e.g., high enough of temperature, not too high of temperature, total time of heating, rate of increase of temperature, temperature in each of the zones is substantially the same, etc.). Responsive to determining that the one or more temperatures associated with the sheet of plastic 216 meet the one or more threshold values, the controller 102 may allow the heated sheet of plastic continue being formed into a dental appliance. Responsive to determining that one or more temperatures associated with the sheet of plastic 216 do not meet one or more threshold values (e.g., uneven temperature, overheating, underheating, etc.), the controller 102 may perform a corrective action. A corrective action may include one or more of causing the heated sheet of plastic 216 to be discarded, causing the sheet of plastic 216 to be reheated, recalibrating the heaters 222, interrupting one or more components (e.g., heaters 222) of the dental appliance production system 200, providing an alert, changing the manufacturing parameters (e.g., controlling power fed to the heaters 222, controlling the heat to be in an acceptable range, controlling total time of heating, etc.), and/or the like.

The heating station 220 may move (e.g., via a pneumatic cylinder of the heating station 220) the mask 224 to interface with the sheet of plastic 216 on the pallet 212. The mask 224 may include features so that the mask 224 avoids interfacing with the holding pins 214 while the mask 224 surrounds the sheet of plastic 216. The mask 224 may surround the sheet of plastic 216 to minimize heat transfer from the heating section to other sheets of plastic 216. The heater 222 may heat the sheet of plastic 216 to about 320 to about 350° F. (e.g., about 336° F.) without hanging of the sheet of plastic 216 (e.g., without sagging portions of the sheet of plastic) by using the mask 224. For example, the mask 224 may surround a perimeter of the sheet of plastic 216 and provide a force sandwiching the sheet of plastic 216 between the mask 224 and the pallet 212. The force may be applied approximately uniformly about the perimeter of the sheet of plastic 216, and may prevent or mitigate sagging and/or warping of the sheet of plastic 216 during the heating process. By avoiding generation of hanging or sagging portions of the sheet of plastic 216, air leaks may be avoided during the thermoforming. The mask 224 may be removed from the sheet of plastic 216 after the heating is completed.

After the heating station 220, the controller 102 (e.g., via conveyor system 270) may move the pallet 212 (e.g., with the heated sheet of plastic 216 secured to the pallet 212 via the holding pins 214) to the thermoforming station 230. The thermoforming station 230 may include a pressure device 232. In some embodiments, the pressure device 232 may be lowered to interface with at least a portion (e.g., of an upper surface of the heated sheet of plastic 216 and/or of an upper surface of the pallet 212 proximate the perimeter of the pallet 212). Molds 254 (e.g., at least a first mold 254A and a second mold 254B) may be printed on the modular trays 244 that are disposed on a lifting device 262. The pallet 212 may form a border, where the molds 254A-B and/or modular trays 244 may pass through the pallet 212 (e.g., the pallet 212 creates a channel from the lower surface to the upper surface of the pallet 212 sized for the molds 254 and/or modular trays 244 to pass through the channel).

The lifting device 262 may lift the molds 254A-B and modular tray 244 to interface with a lower surface of the heated sheet of plastic 216 in the thermoforming station 230. The pressure device 232 may maintain a pressure level (e.g., high pressure, lower pressure, vacuum, substantially vacuum, etc.) at the upper surface of the heated sheet of plastic 216. The lifting device 262 may push the molds 254A-B against the lower surface of the heated sheet of plastic 216 to thermoform the heated sheet of plastic 216 to form aligners. Subsequent to thermoforming the heated sheet of plastic 216, the lifting device 262 may lower to allow the conveyor system 270 to move the pallet 212 and thermoformed sheet of plastic 216 out of the thermoforming station 230. The modular tray 244 and molds 254 may be secured to the sheet of plastic 216 responsive to the thermoforming and may move with the sheet of plastic 216. The thermoforming station 230 may include one or more sensors 236. The controller 102 may receive sensor data from the sensors 236 to configure the pressure device 232 (e.g., adjust size of the cup of the pressure device 232, adjust pressure value provided by the pressure device 232, etc.).

After the thermoforming station 230, the thermoformed sheet of plastic 216 may be moved (e.g., via conveyor system 270) to other sections of the dental appliance production system 200 for one or more of reading identifiers on the dental appliances, marking the dental appliances, dividing the dental appliances, trimming the dental appliances, etc.

The conveyor system 270 may continue to move pallets 212 from the loading station 210, to the heating station 220, and to the thermoforming station 230 to thermoform additional sets of dental appliances in parallel (e.g., simultaneously, on the same modular trays 244). For example, there may be a pallet 212 in the loading station 210, a pallet 212 in the heating station 220, and a pallet 212 in the thermoforming station 230 at substantially the same time.

Embodiments are discussed with reference to dynamically generating dental appliances (e.g., using mold 254A and mold 254B and modular trays 244 to form dental appliances at substantially the same time). However, it should be understood that in alternative embodiments more than two dental appliances may be formed together using a single sheet of plastic. For example, three dental appliances, four dental appliances, five dental appliances, etc. may be formed in parallel on a single sheet of plastic. Additionally, embodiments are discussed with reference to the simultaneous thermoforming of multiple dental appliances. It should be understood that in some embodiments there may be a slight delay between the beginning of thermoforming a first dental appliance and thermoforming a second dental appliance and/or between the ending of thermoforming a first dental appliance and ending of thermoforming a second dental appliance. For example, mold 254A may be slightly vertically offset from mold 254B, which may cause the thermoforming of a first dental appliance by mold 254A to start and end at a slightly different time from the thermoforming of a second dental appliance by mold 254B. Accordingly, it should be understood that embodiments that are discussed with reference to simultaneous processing or manufacturing also include parallel processing or manufacturing that may not be simultaneous.

FIGS. 3A-B are example data set generators 172 to create data sets for a machine learning model 190 (e.g., associated with laser operations of a dental appliance), according to certain embodiments. Systems 300A-B of FIGS. 3A-B shows data set generator 172, data inputs 301, and target output 303.

In some embodiments, data set generator 172 generates a data set (e.g., training set, validating set, testing set) that includes one or more data inputs 301 (e.g., training input, validating input, testing input). In some embodiments, the data set further includes one or more target outputs 303 that correspond to the data inputs 301. The data set may also include mapping data that maps the data inputs 301 to the target outputs 303. Data inputs 301 may also be referred to as "features," "attributes," or information." In some embodiments, data set generator 172 may provide the data set to the training engine 182, validating engine 184, or testing engine 186, where the data set is used to train, validate, or test the machine learning model 190.

In some embodiments, data set generator 172 generates the data input 301 based on historical data (e.g., historical sensor data 154, historical dental appliance data 124, historical laser tool data 128, etc.) and generates the target output 303 based historical data (e.g., historical performance data 164, historical global plan data 134) associated with the historical data (e.g., historical sensor data 154, historical dental appliance data 124, historical laser tool data 128, etc.). The data set generator 172 may determine the mapping (e.g., from each set of the historical sensor data 154 to historical performance data 164, from each set of the historical dental appliance data 124 and historical laser tool data 128 to historical global plan data 134).

In some embodiments, data inputs 301 may include one or more sets of features (e.g., for the historical sensor data 154, historical dental appliance data 124, historical laser tool data 128). In some embodiments, data set generator 172 may generate a first data input corresponding to a first set of features to train, validate, or test a first machine learning model and the data set generator 172 may generate a second data input corresponding to a second set of features to train, validate, or test a second machine learning model.

In some embodiments, the data set generator 172 may discretize one or more of the data input 301 or the target output 303 (e.g., to use in classification algorithms for regression problems). Discretization of the data input 301 or target output 303 may transform continuous values of variables into discrete values. In some embodiments, the discrete values for the data input 301 indicate discrete portions of images to obtain a target output 303.

Data inputs 301 and target outputs 303 to train, validate, or test a machine learning model may include information for a particular facility (e.g., for a particular dental appliance production facility). For example, the historical sensor data 154 and historical performance data 164 and/or historical dental appliance data 124, historical laser tool data 128, and historical global plan data 134 may be for the same dental appliance manufacturing facility.

In some embodiments, the information used to train the machine learning model may be from specific types of manufacturing equipment (e.g., dental appliance production equipment 106) of the dental appliance production facility having specific characteristics and allow the trained machine learning model to determine outcomes for a specific group of dental appliance production equipment. In some embodiments, the information used to train the machine learning model may be for components from two or more manufacturing facilities and may allow the trained machine learning model to determine outcomes for molds based on input from one manufacturing facility.

In some embodiments, subsequent to generating a data set and training, validating, or testing machine learning model 190 using the data set, the machine learning model 190 may be further trained, validated, or tested (e.g., further sensor data 152 and performance data 162 and/or further dental appliance data 122 and global plan data 132) or adjusted (e.g., adjusting weights associated with input data of the machine learning model 190, such as connection weights in a neural network).

FIG. 3C is a block diagram illustrating determining predictive data 168 (e.g., associated with laser operations of a dental appliance), according to certain embodiments. System 300C may be used to determine whether to produce a dental appliance or to perform a corrective action (e.g., associated with one or more of the dental appliance, modular trays 244, dental appliance production equipment 106, etc.) based on historical data (e.g., historical sensor data 154 and historical performance data 164 or historical dental appliance data 124, historical laser tool data 128, and historical global plan data 134).

At block 330, the system 300C (e.g., predictive system 110 of FIG. 1) performs data partitioning (e.g., via data set generator 172 of server machine 170 of FIG. 1) of the historical data (e.g., historical sensor data 154 and historical performance data 164 or historical dental appliance data 124, historical laser tool data 128, and historical global plan data 134) to generate the training set 322, validation set 324, and testing set 326. For example, the training set may be 60% of the historical data, the validation set may be 20% of the historical data, and the testing set may be 20% of the historical data. The system 300C may generate a plurality of sets of features for each of the training set, the validation set, and the testing set. For example, if the historical data is associated with 20 imaging devices 108 and 100 dental appliances (e.g., dental appliances that correspond to sensor data 152 from the 20 imaging devices 108), a first set of features may be imaging devices 1-10, a second set of features may be imaging devices 11-20, the training set may be dental appliances 1-60, the validation set may be dental appliances 61-80, and the testing set may be dental appliances 81-100. In this example, the first set of features of the training set would be associated with sensor data 152 and performance data 162 associated with imaging devices 1-10 and dental appliances 1-60. In some examples, if the historical data is associated with 10 laser tools 107 and 100 dental appliances (e.g., dental appliances that correspond to dental appliance data 152 to be processed by the 10 laser tools 107), a first set of features may be laser tools 1-5, a second set of features may be laser tools 6-10, the training set may be dental appliances 1-60, the validation set may be dental appliances 61-80, and the testing set may be dental appliances 81-100. In this example, the first set of features of the training set would be associated with dental appliance data 152, laser tool data 157, and global plan data 162 associated with laser tools 1-5 and dental appliances 1-60.

At block 332, the system 300C performs model training (e.g., via training engine 182 of FIG. 1) using the training set 322. The system 300C may train multiple models using multiple sets of features of the training set 322 (e.g., a first set of features of the training set 322, a second set of features of the training set 322, etc.). For example, system 300C may train a machine learning model to generate a first trained machine learning model using the first set of features in the training set (e.g., sensor data from imaging devices 1-10 for dental appliances 1-60, dental appliance data associated with laser tools 6-10 and dental appliances 1-60) and to generate a second trained machine learning model using the second set of features in the training set (e.g., sensor data from imaging devices 11-20 for dental appliances 1-60). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., first set of features being from imaging devices 1-15 and second set of features being from imaging devices 5-20, first set of features associated with laser tools 1-7 and second set of features associated with laser tools 3-10). In some embodiments, hundreds of models may be generated including models with various permutations of features and combinations of models.

At block 334, the system 300C performs model validation (e.g., via validation engine 184 of FIG. 1) using the validation set 324. The system 300C may validate each of the trained models using a corresponding set of features of the validation set 324. For example, system 300C may validate the first trained machine learning model using the first set of features in the validation set (e.g., sensor data from imaging devices 1-10 for dental appliances 61-80, dental appliance data associated with laser tools 1-5 and dental appliances 61-80) and the second trained machine learning model using the second set of features in the validation set (e.g., sensor data from imaging devices 11-20 for dental appliances 61-80, dental appliance data associated with laser tools 6-10 and dental appliances 61-80). In some embodiments, the system 300C may validate hundreds of models (e.g., models with various permutations of features, combinations of models, etc.) generated at block 332. At block 334, the system 300C may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 332 where the system 300C performs model training using different sets of features of the training set. Responsive to determining that one or more of the trained models has an accuracy that meets a threshold accuracy, flow continues to block 336. The system 300C may discard the trained machine learning models that have an accuracy that is below the threshold accuracy (e.g., based on the validation set).

At block 336, the system 300C performs model selection (e.g., via selection engine 185 of FIG. 1) to determine which of the one or more trained models that meet the threshold accuracy has the highest accuracy (e.g., the selected model 328, based on the validating of block 334). Responsive to determining that two or more of the trained models that meet the threshold accuracy have the same accuracy, flow may return to block 332 where the system 300C performs model training using further refined training sets corresponding to further refined sets of features for determining a trained model that has the highest accuracy.

At block 338, the system 300C performs model testing (e.g., via testing engine 186 of FIG. 1) using the testing set 326 to test the selected model 328. The system 300C may test, using the first set of features in the testing set (e.g., sensor data from imaging devices 1-10 for dental appliances 81-100, dental appliance data associated with laser tools 1-5 and dental appliances 81-100), the first trained machine learning model to determine the first trained machine learning model meets a threshold accuracy (e.g., based on the first set of features of the testing set 326). Responsive to accuracy of the selected model 328 not meeting the threshold accuracy (e.g., the selected model 328 is overly fit to the training set 322 and/or validation set 324 and is not applicable to other data sets such as the testing set 326), flow continues to block 332 where the system 300C performs model training (e.g., retraining) using different training sets corresponding to different sets of features. Responsive to determining that the selected model 328 has an accuracy that meets a threshold accuracy based on the testing set 326, flow continues to block 340. In at least block 332, the model may learn patterns in the historical data (e.g., historical sensor data 154, historical dental appliance data 124, historical laser tool data 128) to make predictions and in block 338, the system 300C may apply the model on the remaining data (e.g., testing set 326) to test the predictions.

At block 340, system 300C uses the trained model (e.g., selected model 328) to receive current data (e.g., current sensor data 156, current dental appliance data 126, current laser tool data 129) and determines (e.g., extracts), from the output of the trained model, predictive data 168 to produce molds and/or dental appliances or to perform corrective actions associated mold or dental appliance production.

In some embodiments, current data (e.g., current performance data 166, current dental appliance data 126, current laser tool data 129) corresponding to the current sensor data 156 is received and the model is re-trained based on the current sensor data 156 and the current performance data 166.

In some embodiments, one or more operations of the blocks 330-340 may occur in various orders and/or with other operations not presented and described herein. In some embodiments, one or more operations of blocks 330-340 may not be performed. For example, in some embodiments, one or more of data partitioning of block 330, model validation of block 334, model selection of block 336, or model testing of block 338 may not be performed.

Figure 4A:
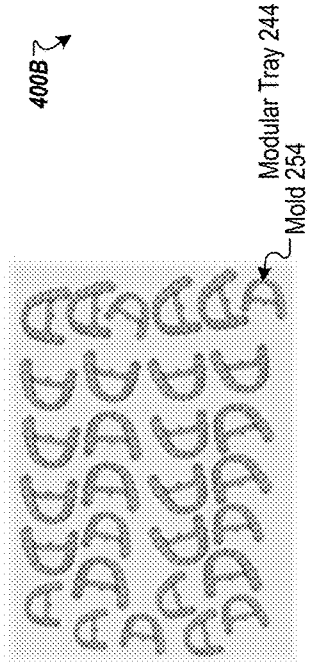
FIGS. 4A-W illustrate components of a dental appliance production system, according to certain embodiments.
Figure 4B:
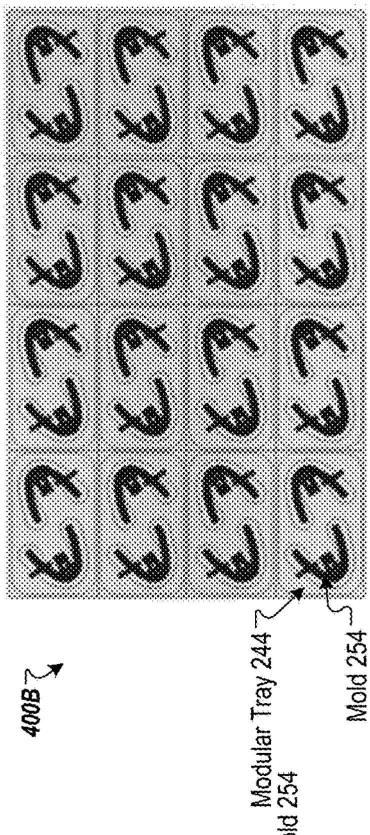
FIG. 4X is a block diagram illustrating systems associated with laser marking, according to certain embodiments.
Figure 4C:
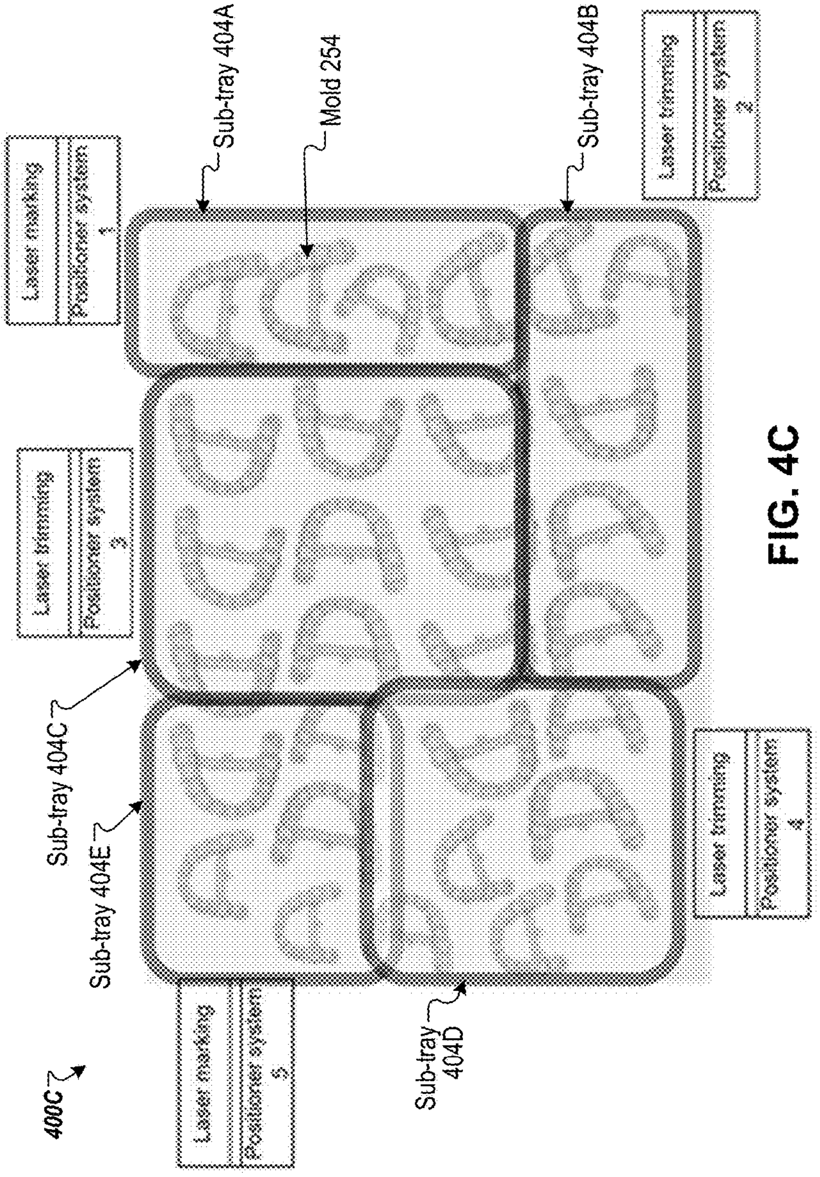
Figure 4D:
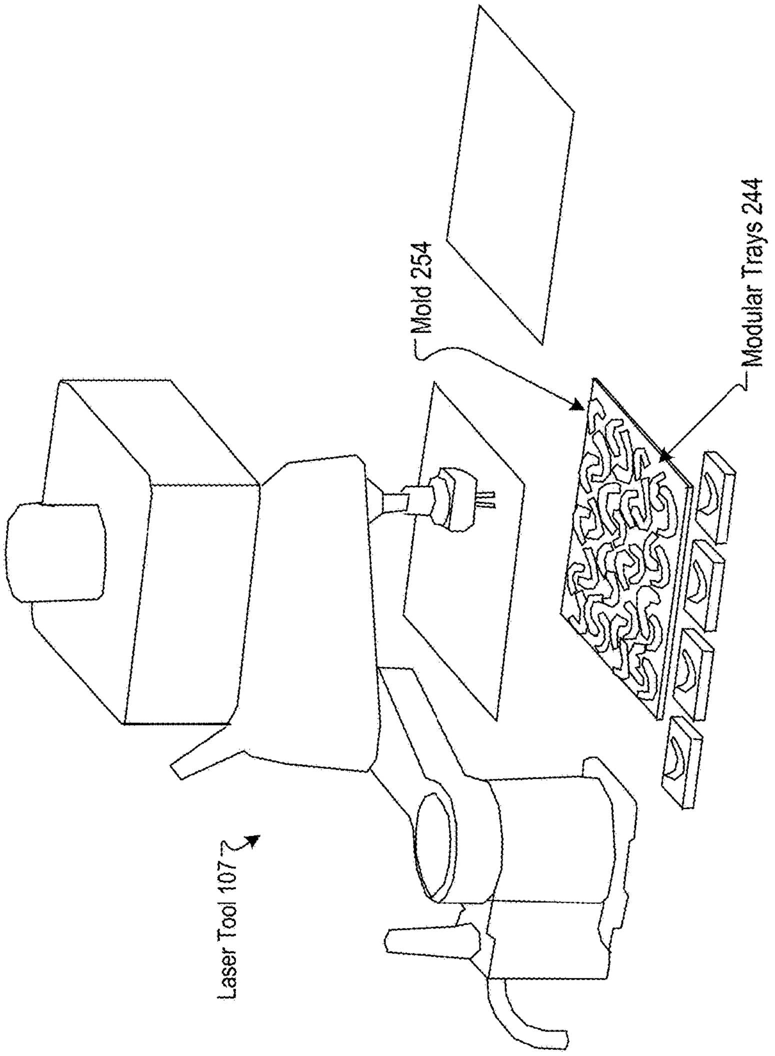
Figure 4E:
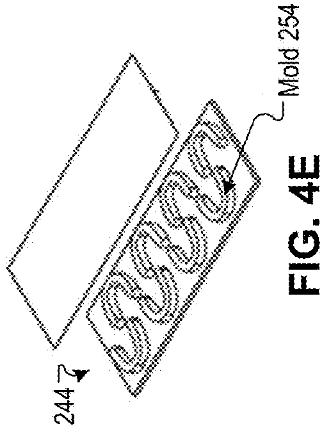
Figure 4F:
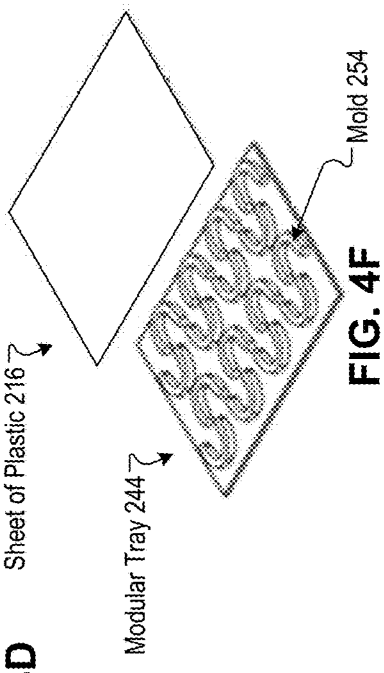
Figure 4G:
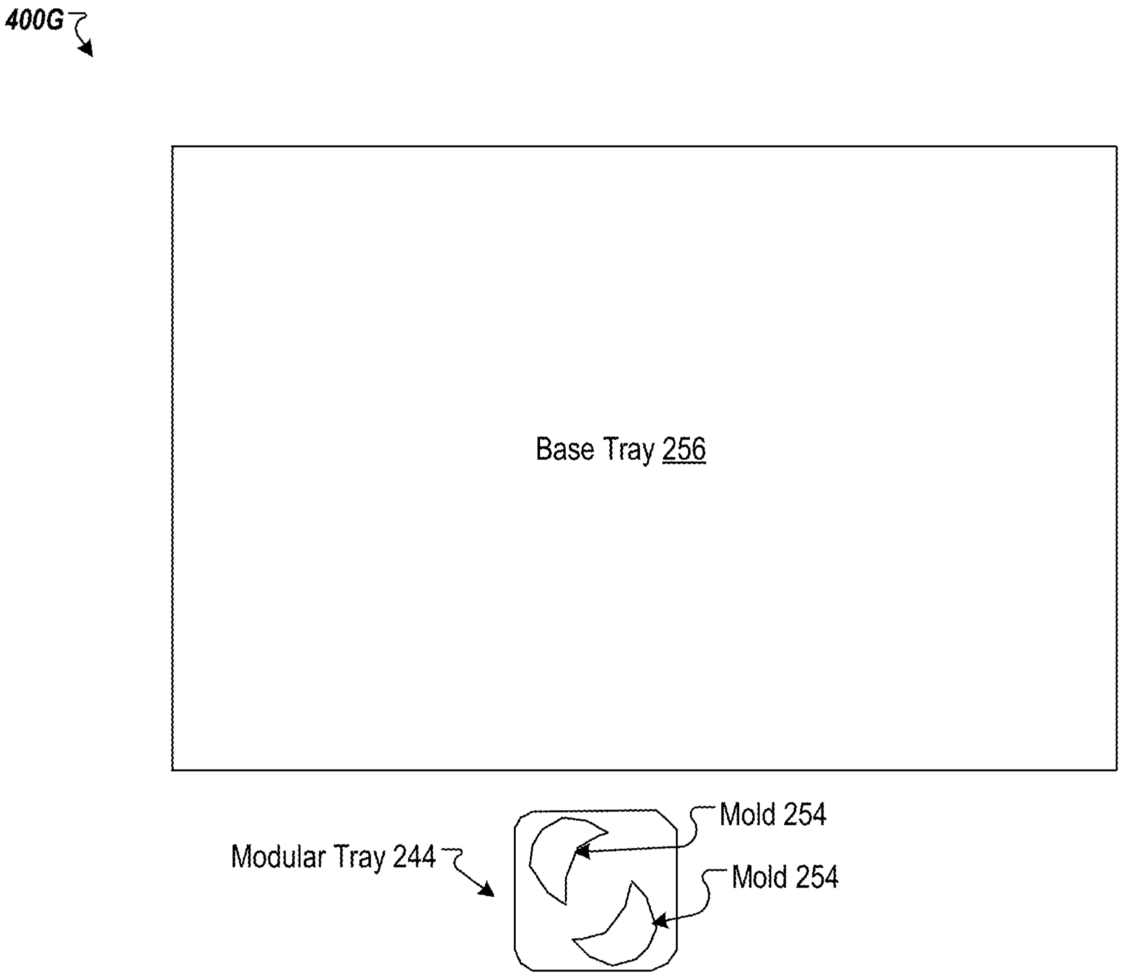
Figure 4H:
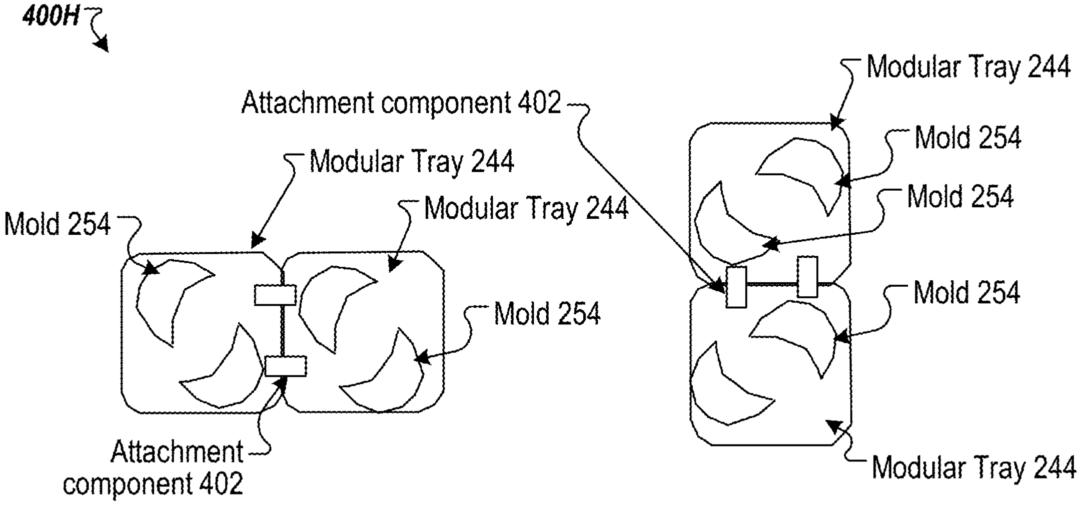
Figure 4I:
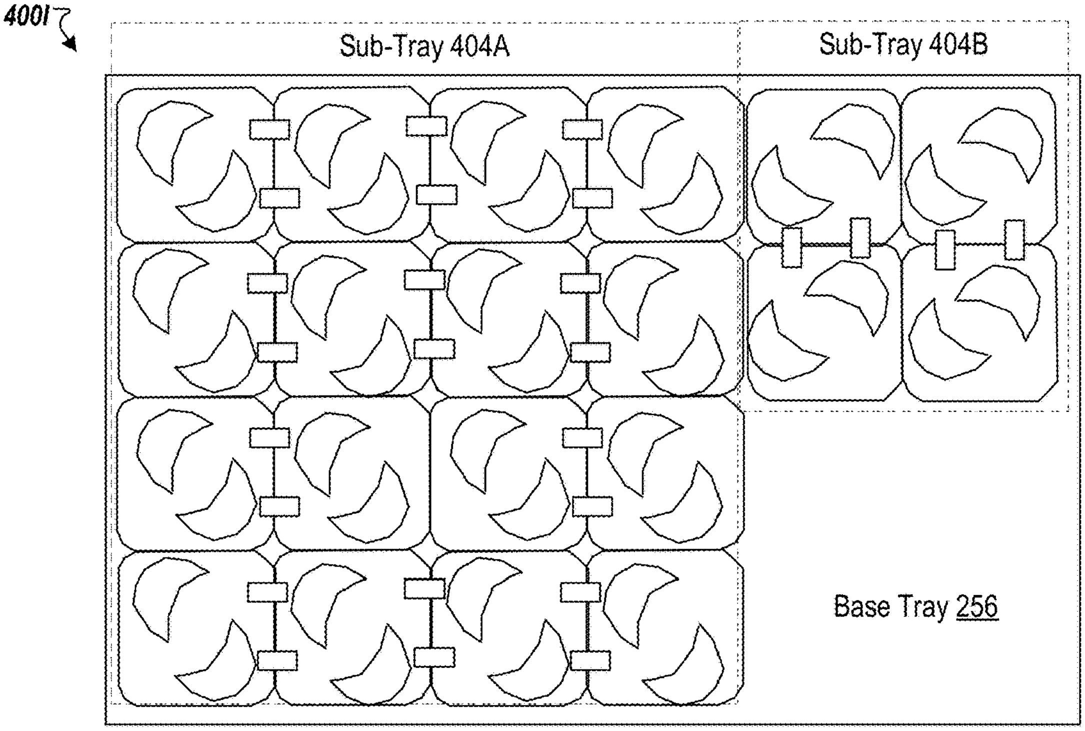
Figure 4J:
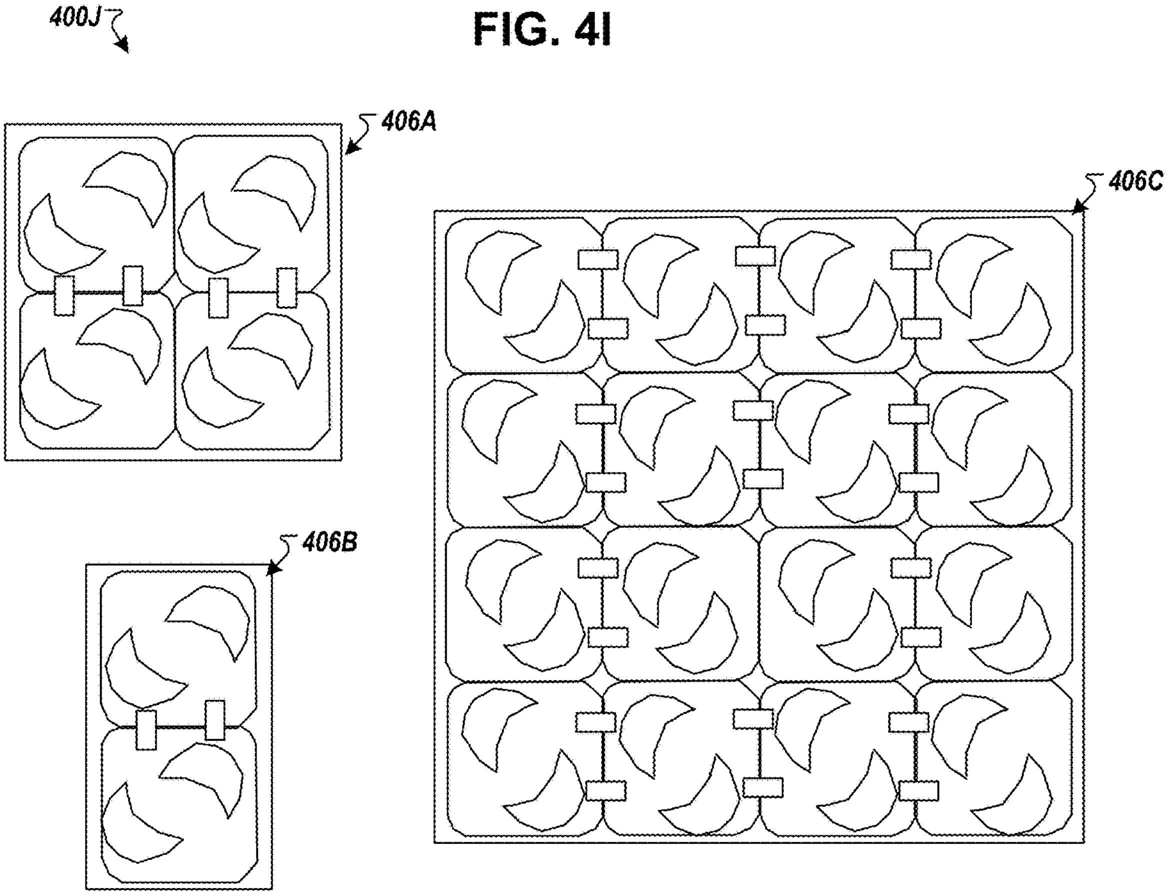
Figure 4L:
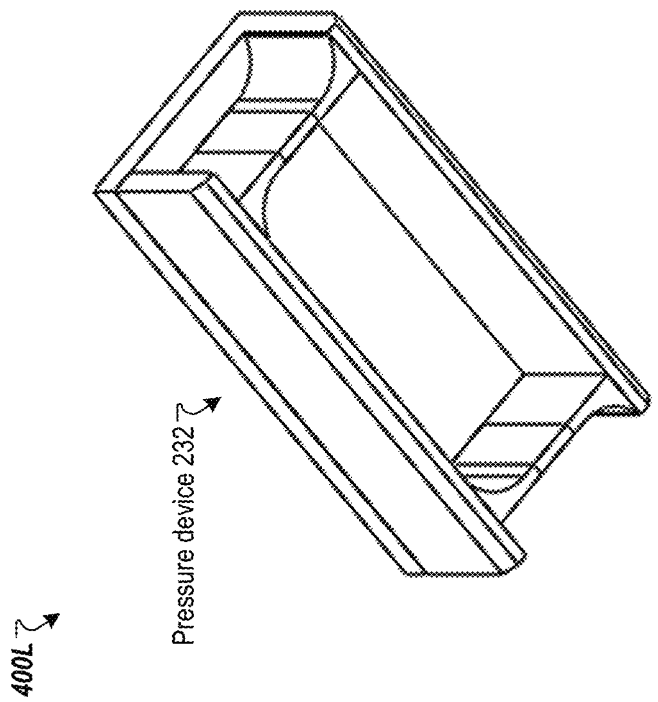
Figure 4K:
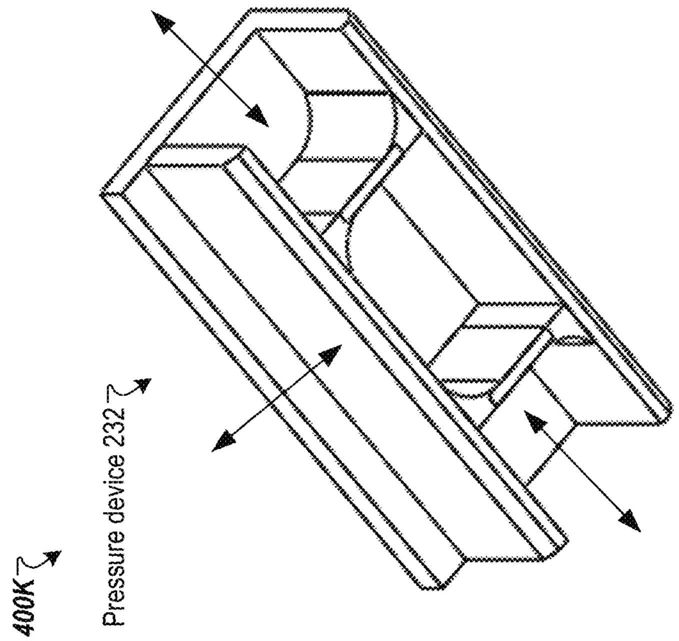
Figure 4M:
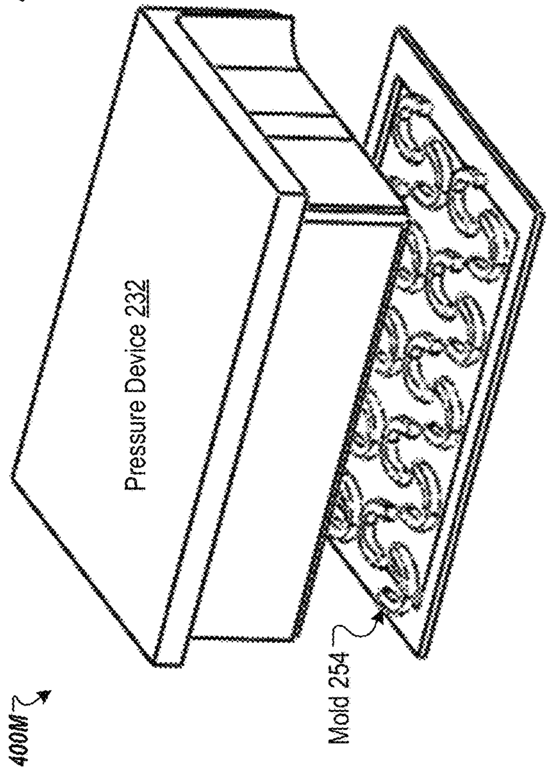
Figure 4N:
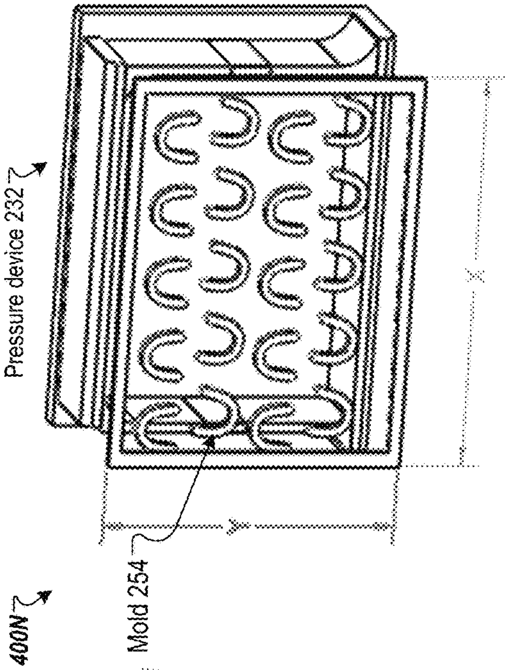
Figure 4O:
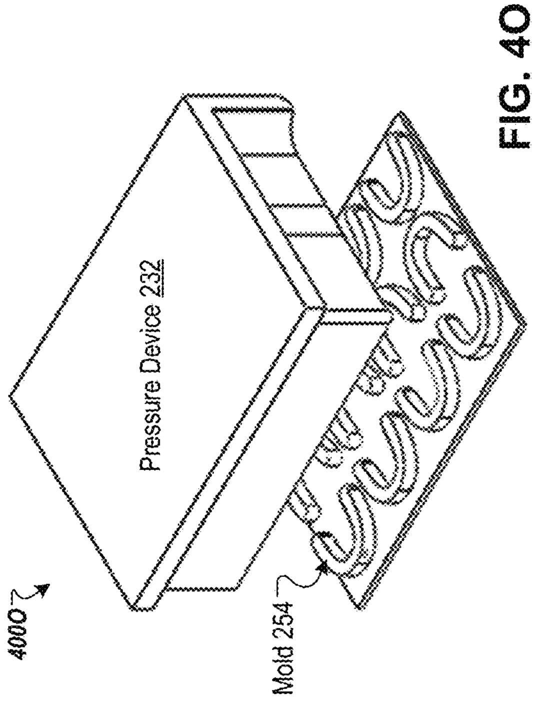
Figure 4P:
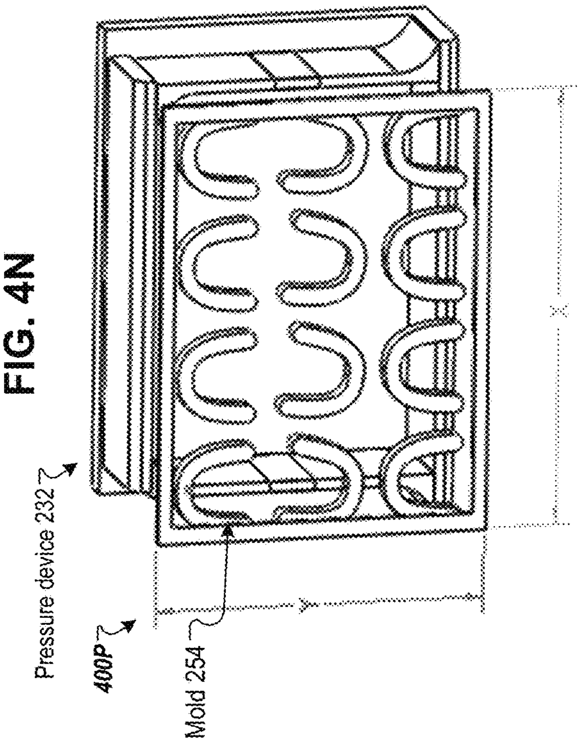
Figure 4W:
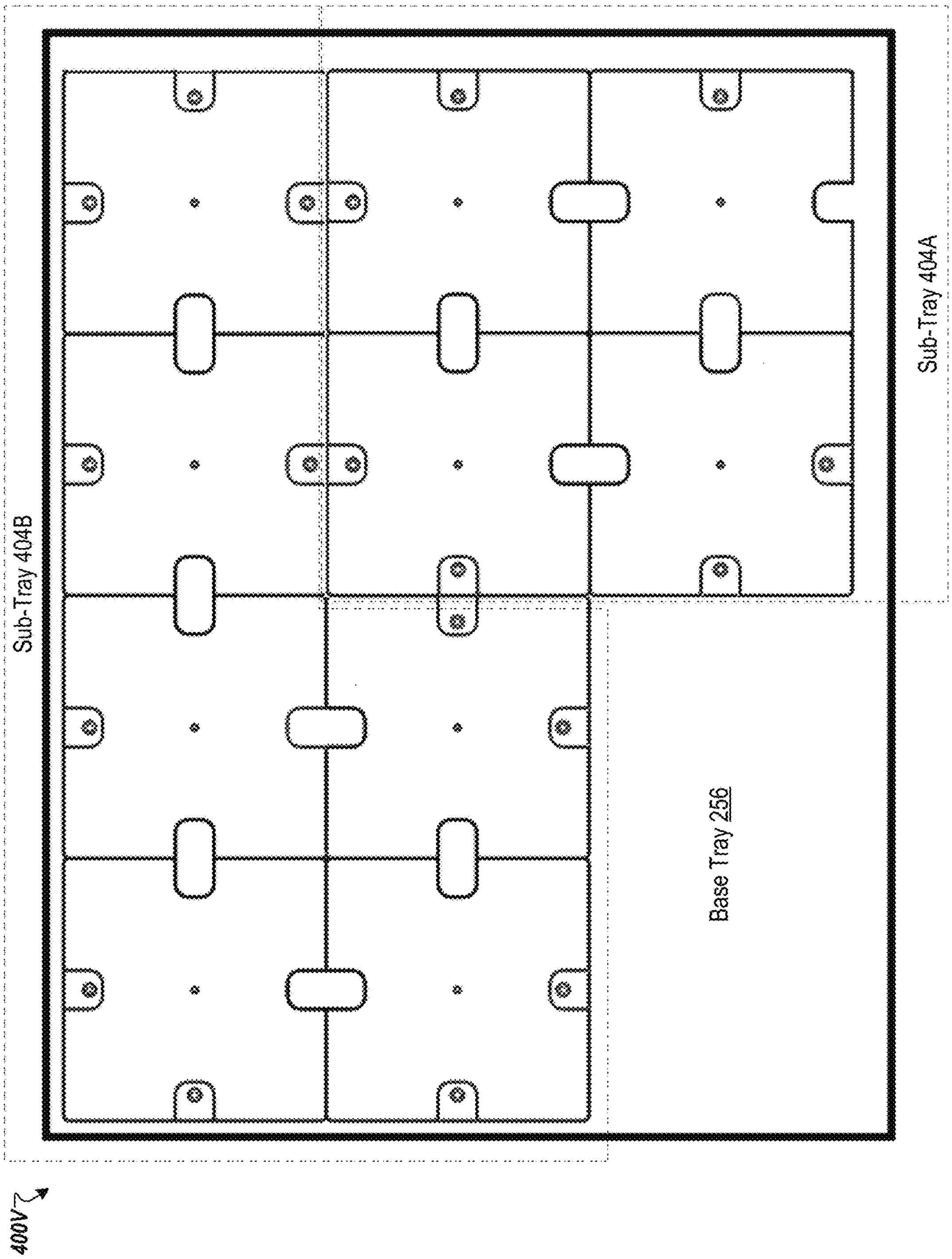

FIGS. 4A-W illustrate components of a dental appliance production system (e.g., system 100 of FIG. 1, dental appliance production system 200A of FIG. 2A, and/or dental appliance production system 200B of FIG. 2B), according to certain embodiments.

A dental appliance production system may be used for multiple laser marking and trimming. The dental appliance (e.g., orthodontic appliance) trimming process may conventionally present a challenge due to high variability in the geometries and/or anatomies of dental appliances (e.g., orthodontic appliances, aligners, retainers, etc.). Each anatomy may be unique in a high mix and/or high volume manufacturing process. The laser robotic and servo system of the present disclosure may address this challenge by accurately detecting the correct positions in the three-dimensional (3D) space of each dental appliance. The system may use multiple positioning systems (e.g., laser tools) with various degrees of freedom to laser mark and trim each dental appliance. The process may perform real-time monitoring (e.g., via imaging device(s) 108) for position and quality. The dental appliance production system may process multiple dental appliances at the same time (e.g., using robotics, laser, marking, trimming, servomotor, kinematics, and/or vision systems).

Referring to FIGS. 4A-C, multiple dental appliances can be formed on molds 254.

Referring to FIG. 4A, system 400A includes multiple molds 254 on which dental appliances can be simultaneously thermoformed. The molds 254 may be disposed on (e.g., printed on) a tray.

Dental appliance production may include sub-processes of laser marking and laser trimming. After a batch of dental appliances is received, an inspection system (e.g., controller, imaging devices) may identify the different dental appliances and may determine and evaluate the geometric characteristics, localization in 3D space, quality, matching, and characterization of the dental appliances. The information from the inspection system may be transferred to a machine learning control system (e.g., controller, prediction system) that may determine an optimal process distribution (e.g., global plan data). The distribution (e.g., global plan data) may be selected based on one or more of time, potential interferences, process parameters, etc. The control system may assign several positioning systems to each sub-process based on the distribution (e.g., global plan data). The control system initiates each sub-process laser marking and laser trimming each with "n" number of positioning systems (e.g., laser tools).

The control system may calculate kinematic solutions for each positioner system evaluating and avoiding any potential collision between positioner systems during the marking and trimming processes.

After completion of each sub-process, the control system may evaluate the distribution (e.g., global plan data) again and repeat the previous operations.

Referring to FIG. 4B, system 400B includes multiple molds 254 on which dental appliances can be simultaneously thermoformed. Modular trays 244 are connected to each other and the molds 254 are printed on the modular trays 244. Once thermoformed, a multiple laser system can start with the trimming and marking process. After the thermoforming process, a machine learning system may identify the location and distribution of the appliances. Multiple laser systems (e.g., laser tools) receive the information and initiate the laser operations (e.g., laser marking and laser trimming) of the dental appliances. The dental appliance production system may perform the laser operations without holding the dental appliance in place and without splitting the process into marking and trimming. The dental appliance production system of the present disclosure may allow marking and trimming to be executed simultaneously (e.g., without fixturing to hold the dental appliances in place as the vision and control system accommodates for position variability.

Referring to FIG. 4C, system 400C includes multiple molds 254 on which dental appliances can be simultaneously thermoformed. FIG. 4C may include a tray with a batch of dental appliances and a distribution of the batch of dental appliances to five positioner systems that perform different processes. The dental appliances (e.g., corresponding to particular molds) are in different groups (e.g., groups 1-5, sub-trays 404A-E), where a corresponding laser tool is to perform an operation on one group of dental appliances at a time. Each laser tool may perform one or more of laser marking or laser trimming.

Referring to FIG. 4D, system 400D (e.g., dental appliance production system) includes a laser tool 107 (e.g., dental appliance production equipment 106). Laser tool 107 may be used to simultaneously thermoform dental appliances on molds 254 that have been printed on modular trays 244. The modular trays 244 may be connected to each other (e.g., to form a sub-tray).

Conventional thermoforming dental appliances using multiple molds at a time uses a different sized tray (e.g., a tray size smaller) than the tray used for stereolithography (SLA) printing. Conventionally, molds are to be removed from the SLA tray and attached to the thermoforming tray. For example, conventional 3D printing process builds a mold in a base tray that supports molds and then molds are processed before being delivered to a thermoforming phase by being punched out, removing supports, sanding, sorting, and sequencing. The additional processes (e.g., removal and attaching, etc.) can cause damage to molds, dental appliances that do not meet threshold values, more time and energy to be used, more opportunities for error, and/or the like.

The present disclosure may provide for using a tray (e.g., modular tray) for both mold printing and thermoforming (e.g., a similar tray size and that has the ability to disassemble and thermoform with a smaller size tray). The present disclosure may have an overall tray size that has a particular size using multiple smaller size trays. The modular trays may allow avoidance of certain processes. The present disclosure may fit to multiple tooling form factors.

Referring to FIGS. 4E-F, size of a sheet of plastic 216 (e.g., plastic dimensions) may be chose (e.g., cut, adjust) according to molds 254 on the modular trays 244 (e.g., molds in SLA tray). For example, system 400E includes two rows of molds 254 and system 400F includes four rows of molds 254.

Referring to FIG. 4G, system 400G (e.g. modular tray system) includes a base tray 256, a modular tray 244, and molds 254. The molds 254 are 3D printed onto the modular tray 244. Thermoforming dental appliances on multiple molds 254 at a time may use a tray size smaller to the tray size used for conventional SLA printing. The present disclosure may allow use of a similar tray size (e.g., via modular trays 244 connected to each other) and with an ability to disassemble (e.g., disconnect some of the modular trays 244 from each other) and thermoform with a smaller size tray (e.g., with a subset of the modular trays 244 used for 3D printing). Base tray 256 may be used for 3D printer equipment.

Referring to FIG. 4H, system 400H includes modular trays 244 that have been joined together (e.g., via an attachment component, such as a clamp and/or junction device). Modular trays 244 may serve as an identifier for molds and may extend the traceability over the manufacturing process.

Referring to FIG. 4I, system 400I includes modular trays 244 assembled and disposed on the base tray 256. Molds 254 (e.g., mold parts) are printed (e.g., built) on the modular trays 244 that are disposed (e.g., mounted) on the base tray 256. Modular trays 244 may be arranged and assembled based on operations to be performed (e.g., laser operations, etc.). Sub-tray 404A (e.g., group) of modular trays may be connected to each other. Sub-tray 404B (e.g., group) of modular trays may be connected to each other. Sub-trays 404A and 404B may be used for simultaneously printing molds 254. Sub-trays 404A and 404B may be separated from each other for one or more operations (e.g., thermoforming, laser marking, trimming, etc.) on one or more different base trays. Sub-tray 404A may include modular trays at zero degree setup (e.g., attachment components run left to right in FIG. 4I). Sub-tray 404B may include modular trays at 90 degree setup (e.g., attachment components run up and down in FIG. 4I).

A modular tray 244 may include an upper surface that is substantially planar and a lower surface that includes a substantially planar portion and a recessed feature. An attachment component 402 is to removably attach to the recessed feature of the modular tray 244 and an additional recessed feature of an additional modular tray 244 to attach the modular tray 244 to the additional modular tray 244. Molds are to be simultaneously three-dimensionally (3D) printed on the upper surface of the modular tray and on the additional modular tray, and wherein a plurality of dental appliances are to be simultaneously thermoformed on the plurality of molds printed on the modular tray and the additional modular tray. In some embodiments, the attachment component 402 is to removably attach the modular tray 244 to the additional modular tray 244 via one or more of a friction fit or a mechanical coupling. In some embodiments, the modular tray 244 includes an identifier to be associated with corresponding molds 254 to be printed on the modular tray 244. In some embodiments, the identifier includes one or more of an optically-readable identifier or a radio-frequency identification (RFID) identifier. In some embodiments, the modular tray 244 includes a marker to be used to differentiate a first mold 254 printed on the modular tray 244 from a second mold 254 printed on the modular tray 244. In some embodiments, the marker is located proximate a first edge or a first corner of the upper surface of the modular tray 244.

A first modular tray 244 may include a first upper surface (e.g., that is substantially planar). A second modular tray 244 may include a second upper surface. The first modular tray 244 and the second modular tray 244 may be configured to be removably attached to each other. The first modular tray 244 and the second modular tray 244 are to be disposed on a base tray 256 responsive to the first modular tray 244 and the second modular tray 244 being removably attached to each other. Molds 254 are to be simultaneously printed on the first modular tray 244 and the second modular tray 244 responsive to the first modular tray 244 and the second modular tray 244 being disposed on the base tray 256. Dental appliances are to be simultaneously thermoformed on the molds 254 disposed on the first modular tray 244 and the second modular tray 244.

The molds 254 may include: a first mold and a second mold printed on the first modular tray 244; and a third mold and a fourth mold printed on the second modular tray 244. In some embodiments, the first modular tray 244 includes a first identifier (e.g., RFID component, NFC component, QR code, barcode, etc.) to identify the first mold and the second mold. In some embodiments, the first modular tray 244 and the second modular tray 244 are configured to be attached to each other via an attachment component 402 that attaches to a first bottom portion of the first modular tray 244 and a second bottom portion of the second modular tray 244 via a friction fit.

In some embodiments, an adjustable pallet 212 is configured to be adjusted in size based on a quantity of modular trays 244 to be used to simultaneously thermoform the dental appliances. In some embodiments, a sheet of plastic 216 is to be attached to the adjustable pallet 212, heated, and thermoformed on the molds 254 to form the dental appliances 272.

In some embodiments, an adjustable heating mask 224 is configured to be adjusted in size based on a quantity of modular trays 244 to be used to simultaneously thermoform the dental appliances 272. In some embodiments, the adjustable heating mask 224 is to be placed on a sheet of plastic 216 during heating of the sheet of plastic 216 before the sheet of plastic 216 is thermoformed on the molds 254 to form the dental appliances 272.

In some embodiments, an adjustable thermoforming chamber (e.g., pressure device 232) is configured to be adjusted in size based on a quantity of modular trays 244 to be used to simultaneously thermoform the dental appliances 272. In some embodiments, a sheet of plastic 216 is to be thermoformed via the adjustable thermoforming chamber on the molds 254 to form the dental appliances 272.

In some embodiments, an adjustable lift device 262 is configured to be adjusted in size based on a quantity of modular trays 244. In some embodiments, the molds 254 are to be disposed on the adjustable lift device 262 and the adjustable lift device 262 is to transport the plurality of molds to simultaneously thermoform the dental appliances 272.

In some embodiments, a heating station 220 is configured to be adjusted based on a quantity of modular trays 244 to be used to simultaneously thermoform the dental appliances 272.

In some embodiments, an assembly station 240 includes an assembly device 242 (e.g., robot) configured to removably attach two or more modular trays 244 to each other to form a sub-tray (e.g., multiple modular trays connected to each other). In some embodiments, a printing station 250 includes a printing device 252 configured to simultaneously 3D print molds 254 on the two or more modular trays 244 of the sub-tray. A sheet of plastic 216 is to be thermoformed on the molds 254 to form dental appliances 272. In some embodiments, a loading station 210 is configured to select the sheet of plastic 216 and adjust a pallet 212 based on the sub-tray of the two or more modular trays 244. In some embodiments, a heating station 220 is configured to adjust a heating device (e.g., heater 222) and a heating mask (e.g., mask 224) based on the sub-tray of the two or more modular trays 244. In some embodiments, a thermoforming station 230 is configured to adjust a pressure device 232 based on the sub-tray of the two or more modular trays 244. In some embodiments, a laser operation station 270 is configured to perform laser operations (e.g., trimming, marking) on the dental appliances 272 (e.g., on the thermoformed sheet of plastic 216) subsequent to being thermoformed.

Referring to FIG. 4J, system 400J illustrates modular trays on different base trays. Base tray 406A (e.g., thermoforming base) may be sized for thermoforming (e.g., for thermoforming tooling). Base tray 406B (e.g., laser mark base) may be sized for laser marking. Base tray 406C (e.g., trimming base) may be sized for trimming. Each of the sub-trays 404 of modular trays 244 may be adapted to the tooling. Modular trays 244 may be adapted to multiple tooling and operations (e.g., thermoforming, laser marking, laser trimming, sorting, etc.).

Referring to FIGS. 4K-L, systems 400K-L include a pressure device 232 (e.g., dynamic thermoforming chamber). Pressure device 232 may be configured for automatic adjustment based on an incoming set of modular trays 244 (e.g., automatic adjustment based on incoming SLA Modular tray). In some embodiments, the pressure device 232 (e.g., thermoforming chamber) can adjust in the X-axis and in the Y-axis to accommodate an incoming set of modular trays (e.g., incoming SLA tray). The printing station 250 (e.g., printing device 252, printing system) prints on the modular tray 244 based on a configuration (e.g., optimal configuration) for the number of incoming molds 254. An imaging device (e.g., vision system) may confirm the dimension of tray and may perform calculations to request plastic and positioning the pressure device 232 (e.g., forming cup).

Referring to FIGS. 4M-P, systems 400M-P are pressure devices 232 that include a dynamic forming cup that is configured to process the modular tray(s) (e.g., SLA modular trays), adjusting to the incoming modular tray dimensions (e.g., SLA tray dimensions).

FIGS. 4Q and 4T illustrate upper perspective views of a sub-tray 404A. FIGS. 4R and 4U illustrate bottom views of a sub-tray 404A. FIG. 4S illustrates a side perspective view of a sub-tray 404A. FIG. 4V illustrates a bottom view of a sub-tray 404B. FIG. 4W illustrates a back view of system 400W that includes sub-trays 404A-B disposed on base tray 256. Each sub-tray 404 includes modular trays 244. Molds 254 are printed on an upper surface of the modular trays 244. The modular trays 244 in a sub-tray 404 are attached via attachment components 402. Sub-tray 404A may accommodate 8 dental appliances and sub-tray 404B may accommodate 12 dental appliances.

Figure 4X:
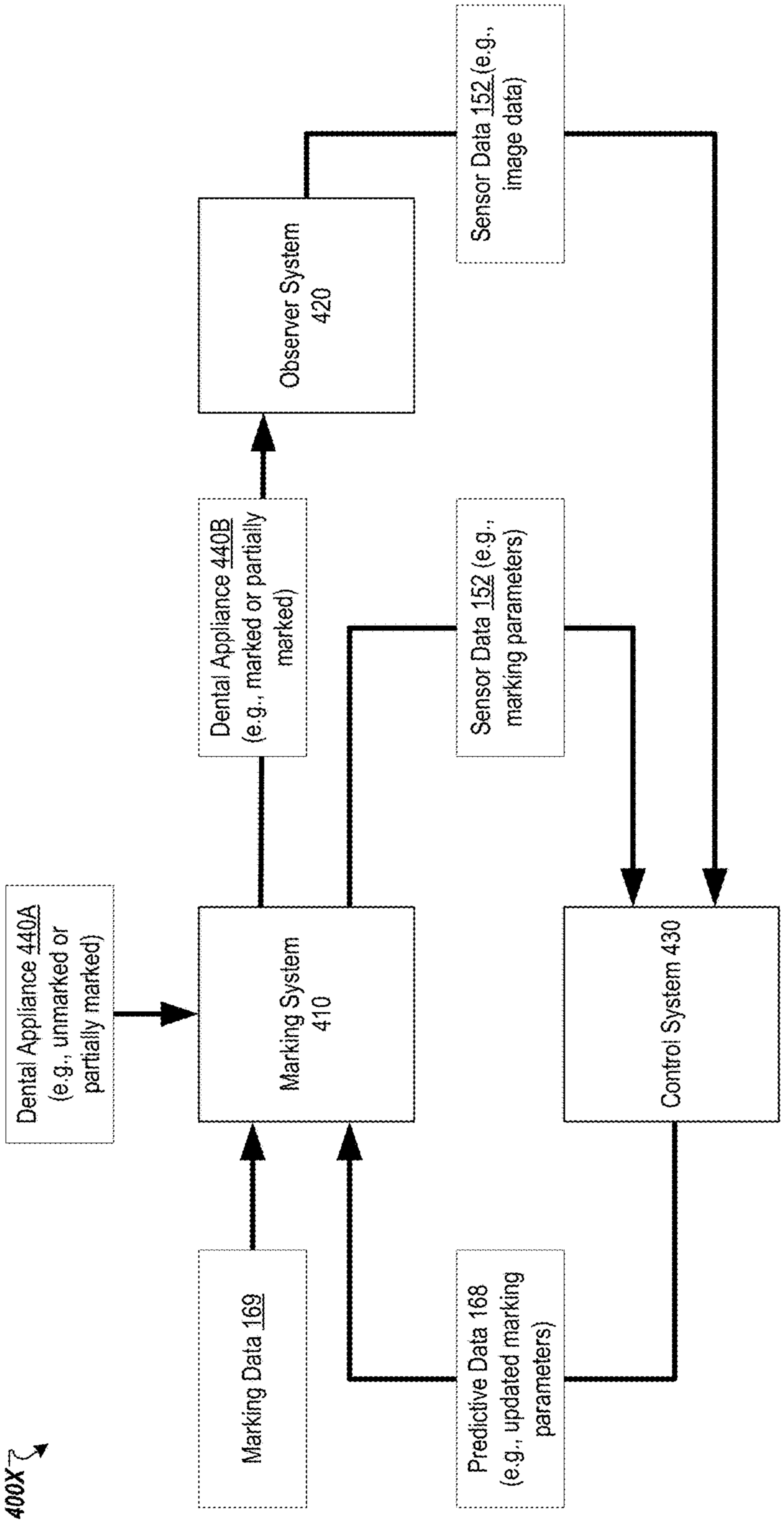

FIG. 4X is a block diagram illustrating a system 400X associated with laser marking of dental appliances 440, according to certain embodiments.

The laser marking process for dental appliances may be susceptible due to variability in the material composition, equipment degradation, and geometrical changes in the dental appliance itself, etc. These variations result in inconsistent and poor marking quality on the appliance. A manual re-calibration of the laser marking system is conventionally used to attempt to correct these inconsistencies. Manual re-calibration is time-consuming and generates material waste. Manual re-calibration may only be performed when a new plastic roll is loaded into the machine, which ignores variations in the composition of the plastic within the plastic roll. System 400X may remove the manual calibration, using a vision system (e.g., observer system 420) and machine learning control (e.g., control system 430) to evaluate and perform adjustments (e.g., update marking parameters) in real-time to improve marking quality (e.g., achieve consistent good marking quality) compared to conventional systems.

System 400X may provide real-time laser marking (e.g., via marking system 410) on dental appliances via machine learning control algorithms (e.g., control system 430, FIGS. 5C-F, etc.). System 400X may include plastic classification in real-time based on machine learning models. System 400X may define via machine learning a laser marking recipe (e.g., best laser marking recipe, updated marking parameters) for current plastic loaded. System 400X may reduce rejection of dental appliances based on bad laser marking quality.

System 400X may include marking system 410, observer system 420, and/or control system 430. One or more of marking system 410, observer system 420, and/or control system 430 may be combined into less systems or may be separated into further systems.

In some embodiments, control system 430 is used to control marking parameters (e.g., power, velocity, resolution, frequency, number of passes, focus, pitch, focal point position, etc.) of the marking system 410 (e.g., laser marking system). The marking data 169 may be segmented (e.g., to a minimum possible marking size) into segments (e.g., to an atomic segment or individuals to be used by control system 430). The segment (e.g., atomic segment) may contain data (e.g., marking data 169) for the marking process, including geometry and process parameters data. A population may be the total marking data 169, which contains segments (e.g., "n" number of atomic segments, individuals). The control system 430 (e.g., machine learning control) may generate the next generation of marking parameters (e.g., predictive data 168) based on feedback from the observer system 420 (e.g., quality control system). The next generation of marking parameters (e.g., predictive data 168) in the control system 430 (e.g., machine learning control algorithm) may be transferred to the marking system 410 (e.g., laser marking system) for marking.

Marking system 410 may receive marking data 169 and the latest marking parameters (e.g., predictive data 168). The marking data 169 may include segments of characters (e.g., alphanumeric characters) to be etched into a dental appliance 440. The marking parameters (e.g., predictive data 168) may indicate one or more of power data, frequency data, pitch data, resolution data, focal data, or velocity data to be used to etch the dental appliance 440. In some embodiments, dental appliances 440 include dental appliances 440A that are to undergo marking operations and dental appliances 440B that have undergone one or more marking operations. The marking system 410 may cause dental appliance production equipment 106 (e.g., dental appliance marking equipment, laser device) to etch a segment into dental appliance 440A (e.g., unmarked or partially marked dental appliance) to generate dental appliance 440B (e.g., marked or partially marked dental appliance).

Observer system 420 may receive the dental appliance 440B and may capture sensor data 152 (e.g., image data via imaging device 108) of the dental appliance 440 etched using the marking data 169 and marking parameters. In some embodiments, observer system 420 generates sensor data 152 (e.g., image data) while or after the dental appliance 440B is being marked. After the sensor data 152 (e.g., image data) is generated, the dental appliance 440 may undergo one or more further marking operations (e.g., dental appliance 440B returns to the dental appliance 440A position).

Control system 430 may receive sensor data 152 (e.g., marking parameters, temperature data of the dental appliance 440, etc.) from marking system 410 and sensor data 152 (e.g., image data) from observer system 420. The control system 430 may use the sensor data 152 to determine predictive data 168 (e.g., updated marking parameters to provide to the marking system 410 to update etching operations and/or perform a corrective action. Control system 430 may include a trained machine learning model that is trained using historical sensor data (e.g., historical marking parameters and historical image data) and historical performance data (e.g., historical updated marking parameters, an indication of whether the marking meets threshold values).

In some embodiments, dental appliances 440 are to be labeled with a patient identifier (PIN) and stage identifier (e.g., stage number). In subsequent operations (e.g., edge cutting of the dental appliance 440), dental appliances 440 may be properly identified to perform respective patient ID and stage number dependent processing operations, such as to determine proper trimming instructions to use to trim the dental appliance 440. The label (e.g., etched label) may be formed by stencil font symbols in some embodiments. The label (e.g., etched label) may be readable by both humans and machine vision systems, or by just humans or by just machine vision systems. Additional control information may be provided in the form of extra symbols in the label (e.g., etched label) or other features that can be recognizable by machine vision systems. The label (e.g., etched label) may include one or more recesses, grooves, and/or other types of features that are readable by a machine to determine a value (e.g., an identifier for the dental appliance 440). Dental appliances 440 may combine both human- and machine-readable labels in one component (e.g., etched label).

The label (e.g., etched label) may include an identifier made of digits. In some embodiments, the first 7-8 digits of the label (e.g., etched label) are the patient identifier (PIN), the next 1-2 digits are the control information, the next digit is the material-jaw identifier, and the final 2 digits is the stage identifier. Each patient may have a specific PIN (e.g., specific number unique to that patient). A patient may have different dental appliances 440 that each have a corresponding stage (e.g., a patient first uses a first dental appliance 440 of a first stage, after a first predetermined amount of time the patient uses a second dental appliance 440 of a second stage, etc. to move the teeth). Each stage corresponds to a corresponding stage identifier. Material-jaw identifier may identify what type of dental appliance 440 and if the dental appliance 440 is for the upper or the lower jaw. The label (e.g., etched label) formed by the may include 11-13 digits in some embodiments. Alternatively, the label (e.g., etched label) may include a different number of digits.

The material-jaw identifier may be selected according to the following table:

| Material-Jaw Identifier value | Material | Jaw |
|---|---|---|
| 0 | N | U |
| 1 | N | L |
| 2 | T | U |
| 3 | T | L |
| 4 | R | U |
| 5 | R | L |

The material-jaw identifier may be a single digit (e.g., 0-5). Each material-jaw identifier may correspond to an N (e.g., which may indicate a material for an aligner), T (e.g., which may indicate a material for a template), or R (e.g., which may indicate a material for a retainer). Each material-jaw identifier may correspond to an upper jaw (U) or a lower jaw (L). In the embodiment in which there are three possible materials (N, T and R) and two possible jaw options (U and L), there may be five possible combinations, each of which may be represented by a material-jaw identifier value (e.g., ranging from 0 to 5).

In some embodiments, the dental appliance 440 forms a type label. The type label may be a "T" (template) if a template is to be formed, an "R" (retainer) if a retainer is to be formed, or nothing (aligner) if an aligner is to be formed. The type label may allow for quick human-identification of whether the dental appliance 440 is an aligner, a template, or a retainer.

In some embodiments, marking system 410 performs a laser operation in addition to or instead of laser marking. For example, marking system 410 may be used to perform laser trimming, where dental appliance 440A is part of a sheet of plastic and dental appliance 440B is separated from the sheet of plastic.

FIGS. 5A-L are flow diagrams of methods 500A-L associated with dental appliance production (e.g., laser marking), according to certain embodiments. In some embodiments, one or more of methods 500A-L can be used with other operations (e.g., laser trimming, etc.) of dental appliance production.

In some embodiments, one or more operations of methods 500A-L are performed by a processing logic of a computing device (e.g., controller 102 of FIG. 1, client device 104 of FIG. 1, predictive server 112 of FIG. 1, etc.) to automate one or more operations of producing an object (e.g., a dental appliance, marked dental appliance). The processing logic may include hardware (e.g., circuitry, dedicated logic, programmable logic, microcode, processing device, etc.), software (e.g., instructions executed by a processing device, a general purpose computer system, or a dedicated machine), firmware, microcode, or a combination thereof. For example, one or more operations of methods 500A-L may be performed by a processing device executing a program or module, such as dental appliance generator 120 of FIGS. 1 and 6.

It may be noted that components described with respect to one or more of FIGS. 1-4X may be used to illustrate aspects of FIGS. 5A-L. In some embodiments, a non-transitory machine-readable storage medium stores instructions that when executed by a processing device (e.g., of controller 102 of FIG. 1, client device 104 of FIG. 1, predictive server 112 of FIG. 1, predictive system 110 of FIG. 1, etc.) cause the processing device to perform methods 500A-L.

For simplicity of explanation, methods 500A-L are depicted and described as a series of acts. However, acts in accordance with this disclosure can occur in various orders and/or concurrently and with other acts not presented and described herein. Furthermore, not all illustrated acts may be performed to implement the methods 500A-L in accordance with the disclosed subject matter. In addition, those skilled in the art will understand and appreciate that the methods 500A-L could alternatively be represented as a series of interrelated states via a state diagram or events.

Figure 5A:
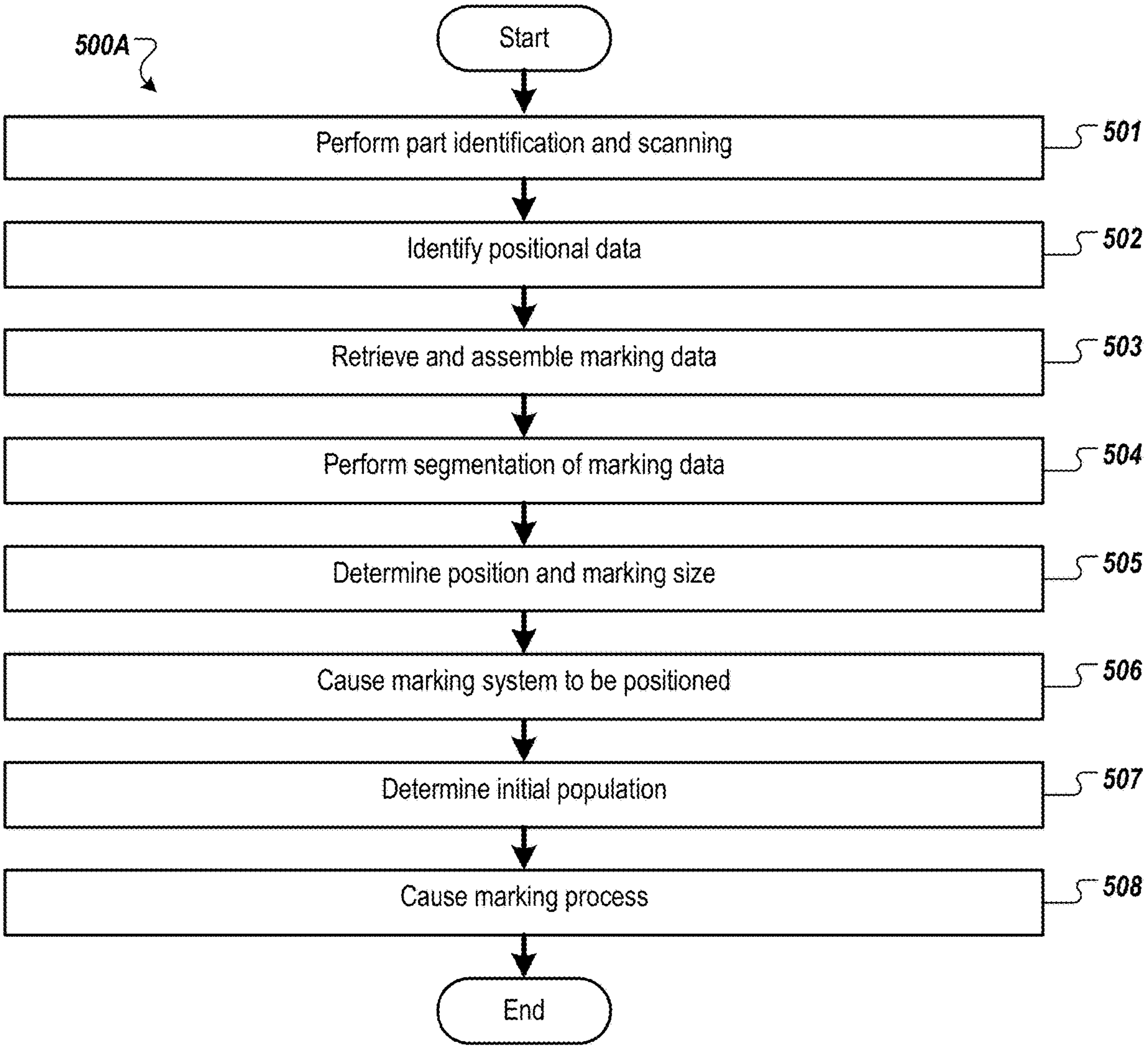
FIGS. 5A-L are flow diagrams of methods associated with dental appliance production, according to certain embodiments.

Referring to FIG. 5A, method 500A is associated with laser marking dental appliances, according to certain embodiments.

At block 501, processing logic performs part (e.g., dental appliance) identification and scanning. In some embodiments, processing logic captures appliance image data (e.g., one or more images of the dental appliance) associated with the dental appliance. The processing logic may determine the appliance image data substantially matches a digital model of the dental appliance. Responsive to determining the appliance image data does not substantially match the digital model, a corrective action may be performed (e.g., the dental appliance may be discarded, the dental appliance may be further examined, dental appliance production may be interrupted, etc.).

At block 502, processing logic identifies positional data (e.g., of the dental appliance equipment). The processing logic may determine dental appliance marking equipment position data associated with the etching of the dental appliance. The dental appliance marking equipment position data may include one or more of x-position (X), y-position (Y), z-position (Z), x-rotational position ($R_x$), y-rotational position ($R_y$), and/or z-rotational position ($R_z$) associated with the dental appliance marking equipment.

At block 503, processing logic retrieves and assembles marking data. The marking data may include alphanumeric characters that are to be etched into the dental appliance (e.g., for manual and/or computer-identification of the dental appliance).

The marking data may include digits, where a first subset of the digits is associated with the patient identifier, a second subset of the digits is associated with the control information, a third subset of the of digits is associated with the material-jaw identifier, and a fourth subset of the digits is associated with the stage identifier. The control information may be used to verify the identifier. For example, a sum of all of the digits of at least a portion of the identifier may be performed, then an algorithm (e.g., modulus 10 algorithm, mod 10 algorithm, Luhn algorithm, Luhn formula) is applied to the sum, and then a permutation is applied to the algorithm result (e.g., apply permutation 1246395078). The result (e.g., permutation applied to the mod 10 result of the sum of the digits) may be compared to the control information digit(s). If the result matches the control information digit(s), then it may be verified that the digits are correct.

For example, if at least a portion of the identifier is 123456, then:

Sum of each of the digits 123456: 1+2+3+4+5+6=21

Apply mod 10 to the sum: 21 mod 10=1

Apply permutation: apply permutation 1246395078 to 1=2 (second digit, indexing from zero)

2 is used as the control information digit of the marking data.

At block 504, processing logic performs segmentation (e.g., atomic segmentation) of marking data (e.g., into segments). Each segment may be a line or a curve of an alphanumeric character. For example, the letter "A" may undergo atomic segmentation into segments including the left angled line (e.g., forward-slash), the right angled line (e.g., backslash), and the horizontal line between the two angled lines. In some embodiments, the segment size is selected based on processing system variables (e.g., marking parameters). For example, laser velocity, density, and computational power. In other examples, other sets of processing system variables (e.g., marking parameters) are used.

At block 55, processing logic determines position (e.g., marking area, optimal position) and marking size. The marking area may be a substantially flat location on the dental appliance where alphanumeric characters can be etched. In some embodiments, processing logic determines the marking size (e.g., enlarges or shrinks the alphanumeric characters) so that the alphanumeric characters fit in the marking area.

At block 506, processing logic causes marking system (e.g., dental appliance marking equipment, laser, etc.) to be positioned (e.g., based on the dental appliance marking equipment position data of block 502; to optimal position; to X, Y, Z, $R_x$, $R_y$, $R_z$; etc.)

At block 507, processing logic determines (e.g., creates) an initial population (e.g., marking parameters). The processing logic may determine the marking parameters based on the previous known best population. The marking parameters may include one or more of power data, frequency data, pitch data, resolution data, focal data, and/or velocity data. The marking parameters may be associated with the latest output of a trained machine learning model.

At block 508, processing logic causes marking process. In some embodiments, the processing logic causes, via dental appliance marking equipment based on the marking parameters, etching of a segment on the dental appliance. In some embodiments, block 508 includes one or more of the operations of method 500B.

Figure 5B:
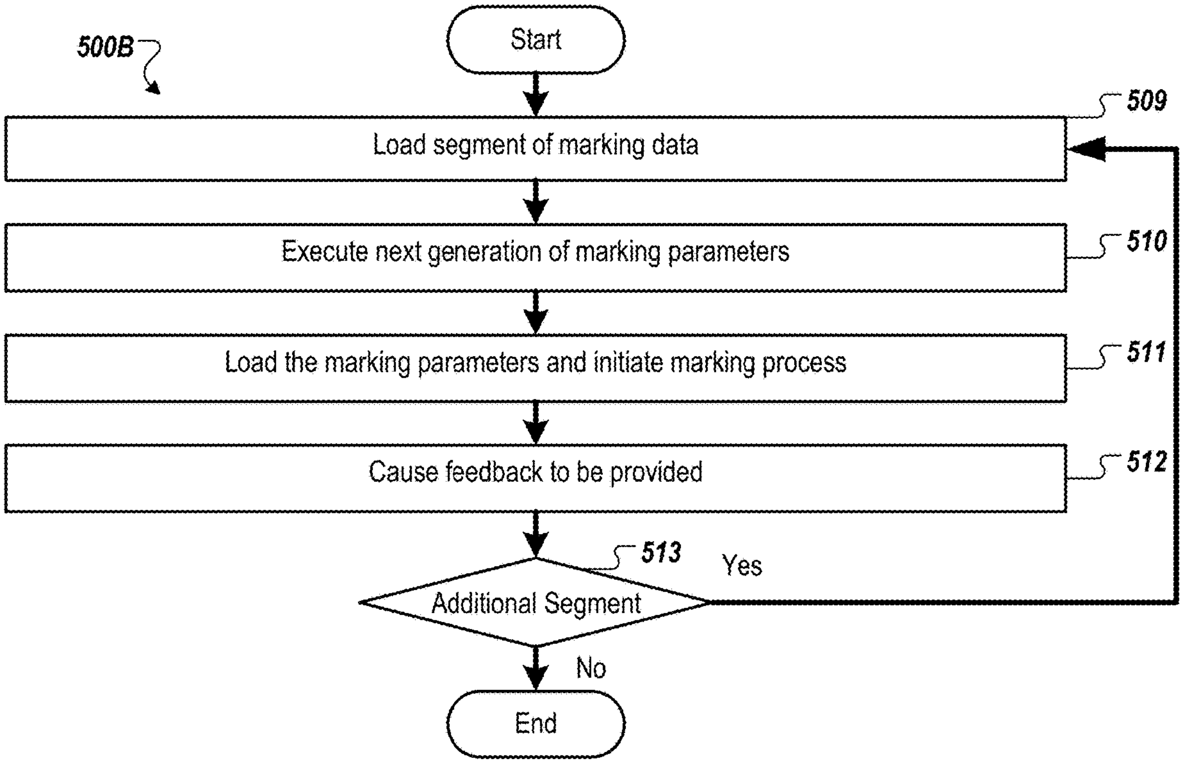

Referring to FIG. 5B, method 500B is associated with laser marking dental appliances, according to certain embodiments.

At block 509, processing logic loads a segment of marking data. The segment may be a straight line or curved line of an alphanumeric character.

At block 510, processing logic executes next generation of marking parameters (e.g., from machine learning (ML) control). The processing logic may identify the predictive data (e.g., updated marking parameters) from the trained machine learning model.

At block 511, processing logic loads the marking parameters and initiates marking process. The processing logic causes the dental appliance marking equipment to etch the segment from block 509 into the dental appliance based on one or more of power data, frequency data, pitch data, resolution data, focal data, or velocity data.

At block 512, processing logic causes feedback to be provided (e.g., to ML control). The feedback may include one or more of marking parameters used, image data obtained during or after the marking process, an indication of whether the etching of the segment meets threshold values, etc. The processing logic may determine if the segment meets threshold thickness, threshold intensity, threshold blurriness, etc. Responsive to the segment not meeting threshold values, the processing logic may update marking parameters. For example, the processing logic may update focus data responsive to the segment not meeting a blurriness threshold.

At block 513, processing logic determines whether an additional segment is to be marked into the dental appliance. Responsive to determining that an additional segment is to be marked into the dental appliance, flow returns to block 509. Responsive to determining that an additional segment is not to be marked into the dental appliance, method 500B may end.

FIGS. 5A and/or 5B may use a trained machine learning model of one or more of FIGS. 5C-F to perform one or more operations.

Figure 5C:
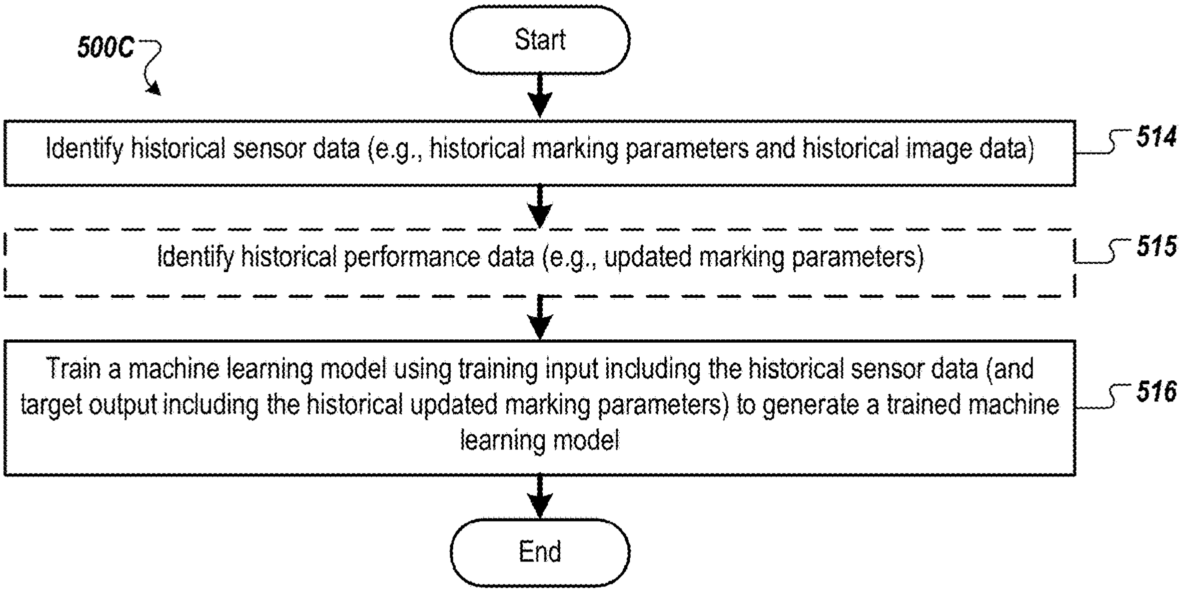

Referring to FIG. 5C, method 500C is associated with laser marking dental appliances, according to certain embodiments. FIG. 5C may be performed by control system 430 of FIG. 4X.

At block 514, processing logic identifies historical sensor data. In some embodiments, the historical sensor data includes historical marking parameters (e.g., one or more of power data, frequency data, pitch data, resolution data, focal data, and/or velocity data.) used to etch a dental appliance and historical image data captured during or after the etching of the dental appliance. In some embodiments, historical sensor data includes plastic sheet thickness data, dental appliance temperature data, etc.

In some embodiments, at block 515, processing logic identifies historical performance data. In some embodiments, the historical performance data includes updated marking parameters to cause the etching of the dental appliance to meet threshold values (e.g., intensity, thickness, non-blurriness, etc.). The updated marking parameters may include an indication of whether the historical image data met threshold values.

At block 516, processing logic trains a machine learning model using training input including the historical sensor data (e.g., historical marking parameters and the historical performance data) to generate a trained machine learning model (e.g., unsupervised machine learning model). In some embodiments, the processing logic trains the machine learning model using training input including the historical sensor data and target output including performance data (e.g., updated marking parameters, an indication of whether the marking meets threshold values, etc.) to generate a trained machine learning model (e.g., supervised machine learning model). The trained machine learning model of block 516 may be used in method 500D of FIG. 5D.

Figure 5D:
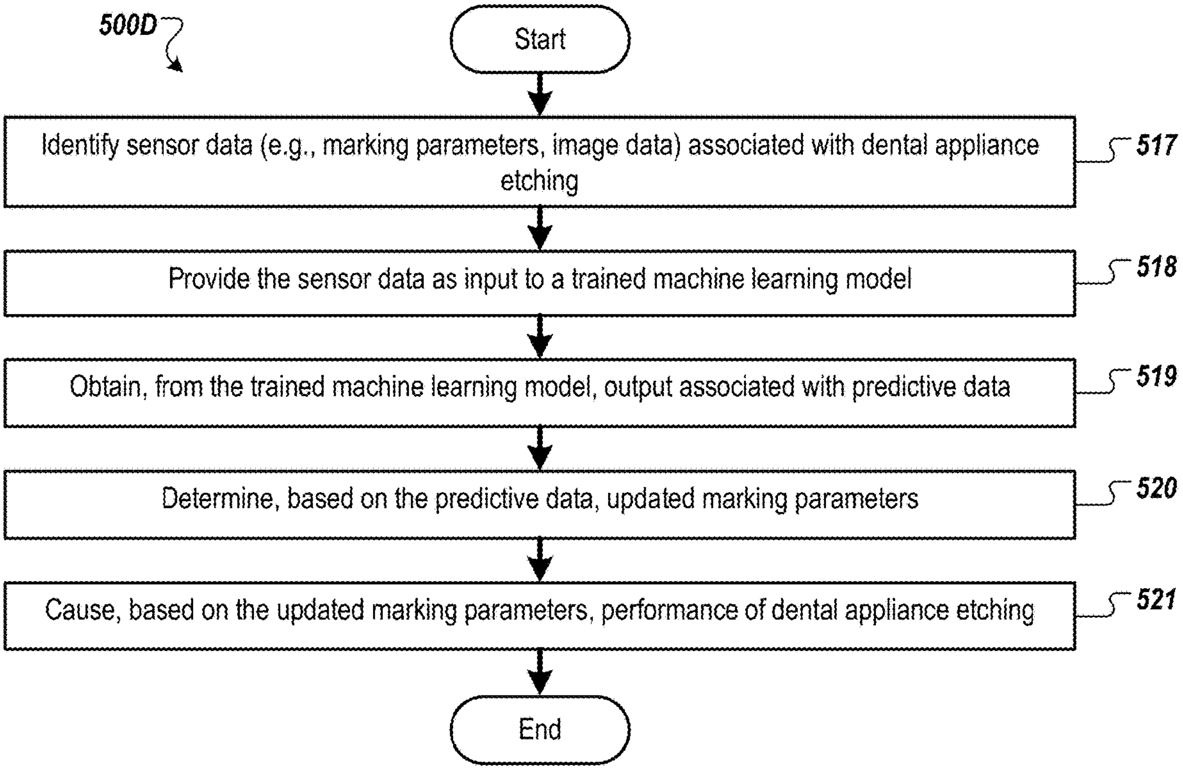

Referring to FIG. 5D, method 500D is associated with laser marking dental appliances, according to certain embodiments.

At block 517, processing logic identifies sensor data (e.g., marking parameters, image data, plastic sheet thickness data, dental appliance temperature data, etc.) associated with dental appliance etching.

At block 518, processing logic provides the sensor data as input to a trained machine learning model (e.g., trained via method 500C).

At block 519, processing logic obtains, from the trained machine learning model, output associated with predictive data.

At block 520, processing logic determines, based on the predictive data, updated marking parameters.

At block 521, processing logic causes, based on the updated marking parameters, performance of dental appliance etching.

Processing logic may repeat method 500D using the updated marking parameters of block 521 and image data of dental appliance etched using the updated marking parameters as sensor data in block 517. In some embodiments, method 500D may repeat until markings on the dental appliance performed via block 521 meet threshold values. In some embodiments, method 500D is performed responsive to markings in image data not meeting threshold values. Determination of whether markings in image data meets threshold values may be performed via FIGS. 5E-F.

Figure 5E:
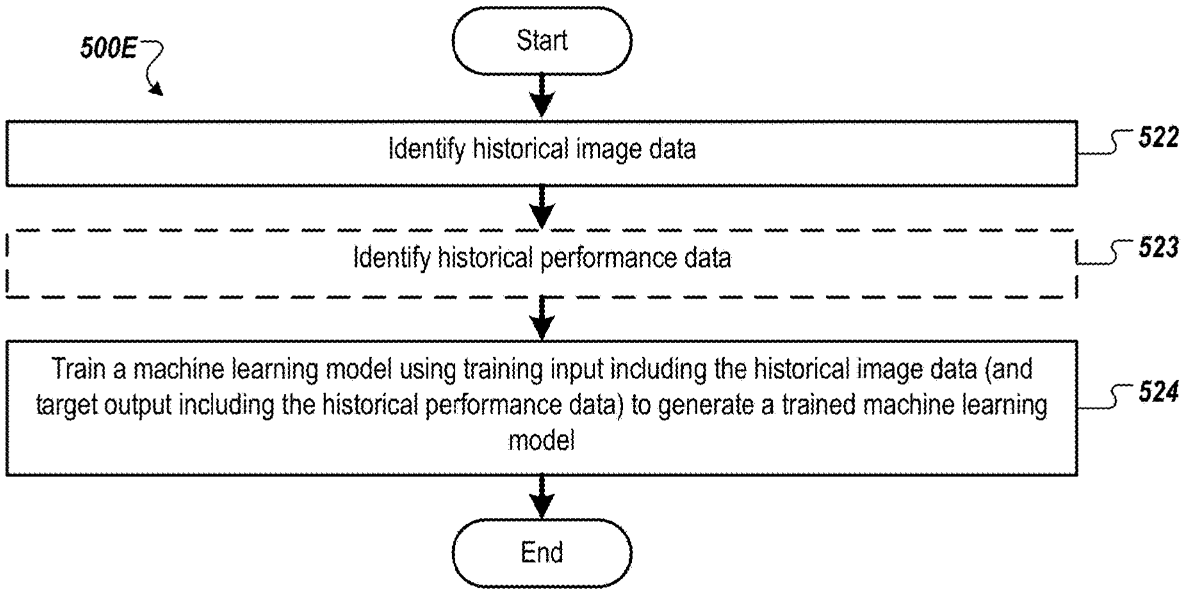

Referring to FIG. 5E, method 500E is associated with laser marking dental appliances, according to certain embodiments.

At block 522, processing logic identifies historical image data. The historical image data may include historical images captured during or after performing an etching of a segment of a dental appliance.

In some embodiments, at block 523, processing logic identifies historical performance data. The historical performance data may be an indication of whether the segment etched into the dental appliance meets threshold values (e.g., intensity, blurriness, thickness, depth, etc.).

At block 524, processing logic trains a machine learning model using training input including the historical image data to generate a trained machine learning model (e.g., unsupervised machine learning model). In some embodiments, processing logic trains a machine learning model using training input including the historical image data and target output including historical performance data to generate a trained machine learning model (e.g., supervised machine learning model).

Figure 5F:
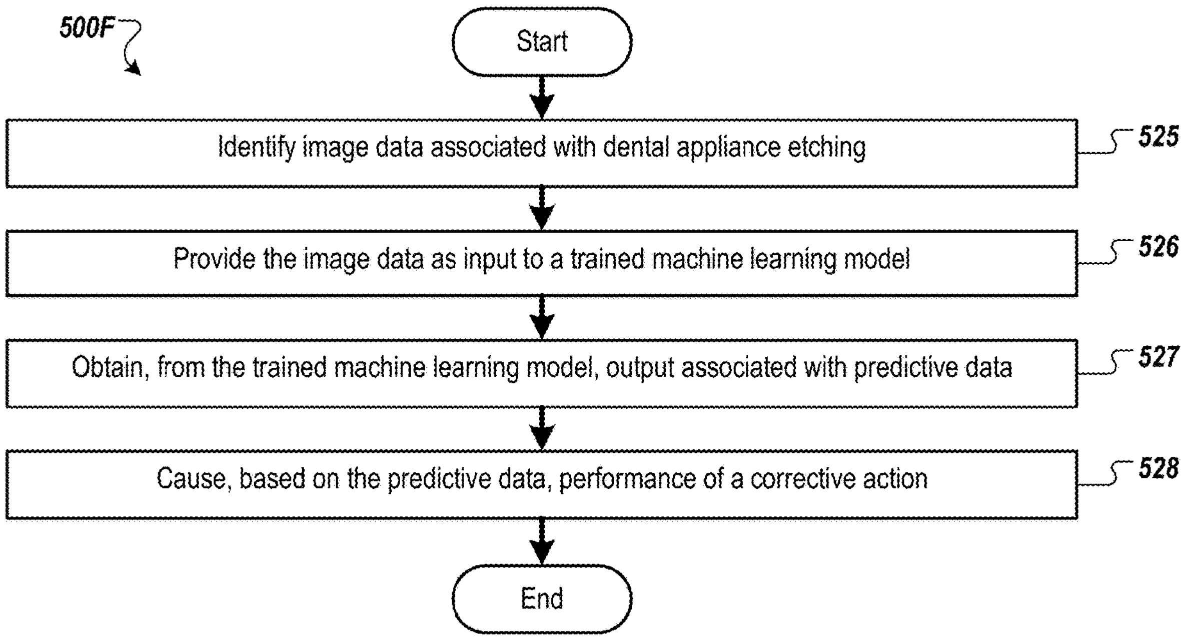

Referring to FIG. 5F, method 500F is associated with laser marking dental appliances, according to certain embodiments.

At block 525, processing logic identifies image data associated with dental appliance etching. Image data may be captured during or after etching a segment in a dental appliance.

At block 526, processing logic provides the image data as input to a trained machine learning model (e.g., trained via method 500E).

At block 527, processing logic obtains, from the trained machine learning model, output associated with predictive data. The predictive data may be predictive performance data. The predictive data may be a prediction of whether the etching meets threshold values.

At block 528, processing logic causes, based on the predictive data, performance of a corrective action. The corrective action may include one or more of providing an alert, causing updated marking parameters to be generated, interrupting etching operations, causing one or more segments of the dental appliance to be re-etched, etc.

Figure 5G:
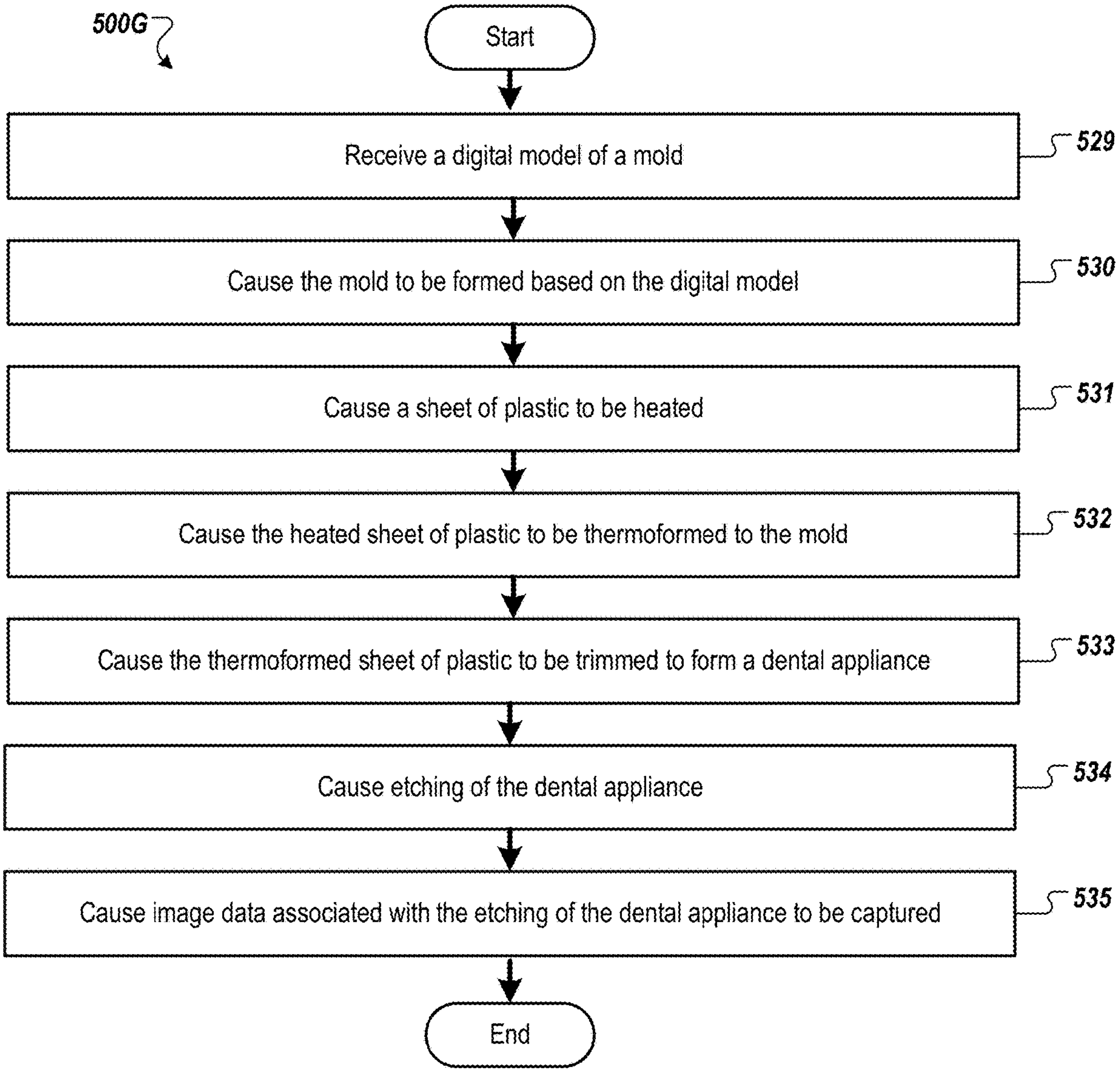

Referring to FIG. 5G, method 500G is associated with laser marking dental appliances, according to certain embodiments.

At block 529, processing logic identifies a digital model of a mold (e.g., dental mold). In some embodiments, the mold associated with a dental arch of a user, such as a mold usable to form a dental appliance. In some embodiments, the mold is to be used to form a dental appliance (e.g., to be used in relation to a dental arch of a user), such as incremental palatal expanders, aligners (e.g., aligners with or without mandibular advancement structures and/or other structures), dental attachment templates, and/or other dental appliances.

A shape of a dental arch for a patient at a treatment stage may be determined based on a treatment plan to generate the digital model of the mold. In the example of orthodontics, the treatment plan may be generated based on an intraoral scan of a dental arch (e.g., dental arch to receive a dental appliance, dental arch to be modeled). The intraoral scan of a patient's dental arch may be performed to generate a 3D virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

The processing logic may determine an initial shape for a mold of the patient's dental arch at a treatment stage based on the digital model of the dental arch at that treatment stage. Processing logic may additionally determine one or more features to add to the object.

The processing logic may determine a final shape for the mold and may generate a digital model of the mold. Alternatively, the digital model may have already been generated. In such an instance, processing logic may update the already generated digital model to include one or more determined features for the mold. The digital model may be represented in a file such as a computer aided drafting (CAD) file or a 3D printable file such as a stereolithography (STL) file. The digital model may include instructions that will control a fabrication system or device in order to produce the mold with specified geometries.

At block 530, processing logic causes the mold (e.g., dental mold) to be formed (e.g., based on the digital model). In embodiments, the mold is formed via three-dimensional printing, such as by using a rapid prototyping machine.

A mold may be generated based on the digital model of block 529. A virtual 3D model of a patient's dental arch may be used to generate a unique customized mold associated with the dental arch at a particular stage of treatment. The shape of the mold may be at least in part based on the shape of the virtual 3D model for that treatment stage. The mold may correspond to a dental arch of a patient and the mold may include a sloping portion that commences below a gum line of the dental arch and extends away from the dental arch to a lower portion of the mold. In some embodiments, the mold is generated with the sloping portion commencing below the gum line (e.g., to assist in the release of the thermoformed sheet of plastic from the mold). The mold may be formed using a rapid prototyping equipment (e.g., 3D printers) to manufacture the mold using additive manufacturing techniques (e.g., stereolithography) or subtractive manufacturing techniques (e.g., milling). The digital model may be input into a rapid prototyping machine. The rapid prototyping machine then manufactures the mold using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured. In one embodiment, a system such as described earlier herein (e.g., system 100, dental appliance production equipment 106) is used to print the mold.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of a mold including multiple materials, referred to herein as "multi-material direct fabrication." In some embodiments, a multi-material direct fabrication method involves concurrently forming a mold from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate a mold from a plurality of different materials. Alternatively or in combination, a multi-material direct fabrication method can involve forming a mold from multiple materials in a plurality of sequential manufacturing steps. For instance, a first portion of the mold (e.g., a main portion of the mold) can be formed from a first material in accordance with any of the direct fabrication methods herein, then a second portion of the mold (e.g., complex features added to the mold) can be formed from a second material in accordance with methods herein, and so on, until the entirety of the mold has been formed. The relative arrangement of the first and second portions can be varied as desired. In one embodiment, multi-material direct fabrication is used to cause a first material to be used for the markings of the cut line on the mold, and to cause one or more additional materials to be used for the remainder of the mold.

In some embodiments, a dental appliance may be formed from the mold (e.g., by thermoforming the dental appliance over the mold). The dental appliance may be configured to provide forces to move the patient's teeth, or may be configured to perform other actions such as to protect a patient's teeth from bruxism. The shape of each dental appliance is unique and customized for a particular patient and a particular treatment stage. In an example, dental appliances can be pressure formed or thermoformed over printed molds. Each mold may be used to fabricate a dental appliance that will apply forces to the patient's teeth at a particular stage of the orthodontic treatment. The dental appliances each have teeth-receiving cavities that receive and resiliently reposition the teeth in accordance with a particular treatment stage.

Responsive to forming the mold, the mold is removed from the build platform. The mold may then be secured to a plate. The mold may be secured to the plate via fasteners such as a pin, a keyway, and/or a locking mechanism. The mold may be secured to the plate to avoid movement of the mold in the x-, y-, and/or z-direction and to avoid rotation (e.g., change in angle) of the mold during further processing.

The processing logic may identify the mold via an imaging system (e.g., part of an imaging station, part of thermoforming station, part of trimming station, part of robot used to move the mold, etc.). The processing logic may cause the mold to be moved to a thermoforming station via a robot arm, conveyor belt, or other transport mechanism. The mold may be secured at the thermoforming station via a locking mechanism of a plate that secures the flat portion of the mold.

At block 531, processing logic causes a sheet of plastic to be heated. The sheet of plastic may be secured to a pallet and the sheet of plastic secured to the pallet may be surrounded with a mask prior to heating the sheet of plastic. The sheet of plastic may be an elastic thermoplastic, a sheet of polymeric material, etc. The sheet of plastic may be lowered onto the pallet so that holding pins of the pallet pierce the sheet of plastic to secure the sheet of plastic to the pallet. A pressurized cylinder may lower the mask onto the sheet of plastic secured to the pallet. The sheet of plastic may be heated to a temperature at which the sheet of plastic becomes pliable. The sheet of plastic may be heated using a ceramic heater, convection oven, or infrared heater. The mask may allow the sheet of plastic to be heated to 336° F. without hanging to avoid air leaks.

At block 532, processing logic causes the heat sheet of plastic to be thermoformed to the mold. To thermoform the heated sheet of plastic over the mold, pressure may concurrently be applied to the sheet of plastic to form the now pliable sheet of plastic around the mold (e.g., with features that will imprint markings and/or elements in the dental appliance formed on the mold). Once the sheet cools, it will have a shape that conforms to the mold. In one embodiment, a release agent (e.g., a non-stick material) is applied to the mold before forming the dental appliances (e.g., shells). This may facilitate later removal of the molds from the shells.

At block 533, processing logic causes the thermoformed sheet of plastic to be trimmed to form a dental appliance. The mold with the thermoformed sheet of plastic may be moved to a trimming station. The thermoformed sheet of plastic may be removed from the mold (e.g., using a shell removal device) prior to being trimmed or after being trimmed. The thermoformed sheet of plastic may be trimmed to generate the dental appliance. In some embodiments, the portion of thermoformed sheet of plastic that is disposed on a portion of the mold that slopes outward below the gum line is removed during the trimming of the thermoformed sheet of plastic to generate the dental appliance. Before or after the thermoformed sheet of plastic is removed from the mold for a treatment stage, the thermoformed sheet of plastic is trimmed along one or more cut lines (also referred to as a trim line). The cut line may be a gingival cut line that represents an interface between a dental appliance and a patient's gingiva. In one embodiment, the dental appliance is manually cut by a technician using scissors, a bur, a cutting wheel, a scalpel, or any other cutting implement. In another embodiment, the dental appliance is cut by a computer controlled trimming machine such as a CNC machine or a laser trimming machine. The computer controlled trimming machine may control an angle and position of a cutting tool of the trimming machine to trim the thermoformed sheet of plastic.

At block 534, processing logic causes etching of the dental appliance. The processing logic may cause dental appliance marking equipment to perform the etching based on marking parameters.

At block 535, processing logic causes image data associated with the etching of the dental appliance to be captured. The processing logic may update the marking parameters used in block 534 based on the image data captured in block 535. In some embodiments, block 535 is performed for other laser operations, such as trimming of block 533.

In some embodiments, the transferring of the plate securing the mold and/or the sheet of plastic is via a conveyor system (e.g., via lateral movement). In some embodiments, the transferring of the plate securing the mold and/or the sheet of plastic is via a dial system (e.g., via rotational movement).

In some embodiments, the mold is transferred to be located below the thermoforming station and is lifted to have the heated sheet thermoformed over the first mold and the second mold. In some embodiments, the transferring of the first mold to be located below the thermoforming station is via lateral movement (e.g., conveyor system). In some embodiments, the transferring of the mold to be located below the thermoforming station is via rotational movement (e.g., dial system).

In some embodiments, the techniques herein can be used to form molds, such as thermoforming molds. Examples of these can be found in: U.S. Pat. No. 9,943,991, by inventors Tanugula et al., entitled "Mold with separable features;" U.S. Pat. No. 9,943,386, to inventors Webber et al., entitled "Mold with weakened areas;" and U.S. Pat. No. 8,776,391 to inventors Kaza et al., entitled "System for post-processing orthodontic appliance molds;" as well as any continuation or divisional application claiming priority and any utility or provisional application to which these claim priority therefrom. These patents/applications are hereby incorporated by reference as if set forth fully herein.

In some embodiments, the techniques herein can be used to form appliances with mandibular repositioning features. Examples of these can be found in: U.S. Pat. No. 9,844,424 by inventors Wu et al., entitled, "Dental appliance with repositioning jaw elements;" U.S. Pat. Pub. No. 2015/0238280 by inventors Wu et al., entitled "Dental appliance with repositioning jaw elements;" U.S. Pat. No. 10,213,277 by inventors Webber et al., entitled "Dental appliance binding structure;" as well as any continuation or divisional application claiming priority and any utility or provisional application to which these claim priority therefrom. These patents/applications are hereby incorporated by reference as if set forth fully herein.

In some embodiments, the techniques herein can be used to form palatal expanders. Examples can be found in: U.S. Pat. No. 9,610,141 by inventors Kopelman et al., entitled, "Arch expanding appliance;" U.S. Pat. No. 7,192,273 by inventor McSurdy entitled "System and method for palatal expansion;" U.S. Pat. No. 7,874,836 by inventor McSurdy entitled "System and method for palatal expansion;" as well as any continuation or divisional application claiming priority and any utility or provisional application to which these claim priority therefrom. These patents/applications are hereby incorporated by reference as if set forth fully herein.

In some embodiments, the techniques herein can be used to form attachment formation templates. Examples can be found in: U.S. Pat. Pub. No. 2017/0007368 by inventor Boronkay entitled "Direct fabrication of attachment templates with adhesive;" U.S. Pat. Pub. No. 2017/0165032 by inventors Webber et al., entitled "Dental attachment placement structure;" U.S. Pat. Pub. No. 2017/0319296 by inventors Webber et al., entitled "Dental attachment placement structure;" the contents of U.S. patent application Ser. No. 16/366,686 by inventors Webber et al., entitled "Dental attachment placement structure;" as well as any continuation or divisional application claiming priority and any utility or provisional application to which these claim priority therefrom. These patents/applications are hereby incorporated by reference as if set forth fully herein.

In some embodiments, the techniques herein can be used to form directly fabricated aligners. Examples can be found in: U.S. Pat. App. Pub. No. 2016/0310236 by inventors Kopelman et al., entitled "Direct fabrication of orthodontic appliances with elastics;" U.S. Pat. App. Pub. No. 2017/0007365 to Kopelman et al., entitled "Direct fabrication of aligners with interproximal force coupling;" U.S. Pat. App. Pub. No. 2017/0007359 to Kopelman et al., entitled "Direct fabrication of orthodontic appliances with variable properties;" U.S. Pat. App. Pub. No. 2017/0007360 to Kopelman et al., entitled "Systems, apparatuses and methods for dental appliances with integrally formed features;" U.S. Pat. No. 10,363,116 to Boronkay entitled "Direct fabrication of power arms;" U.S. Pat. App. Pub. No. 2017/0007366 to Kopeleman et al., entitled "Direct fabrication of aligners for arch expansion;" U.S. Pat. App. Pub. No. 2017/0007367 to Li et al., entitled "Direct fabrication of palate expansion and other application;" as well as any continuation or divisional application claiming priority and any utility or provisional application to which these claim priority therefrom. These patents/applications are hereby incorporated by reference as if set forth fully herein.

Examples of materials that can be used with the embodiments discussed herein include the subject matter of U.S. Pat. Pub. No. 2017/0007362, by inventors Yan CHEN et al., entitled, "Dental Materials Using Thermoset Polymers;" International Patent Application Number PCT/US2019/030683 to ALIGN TECHNOLOGY, INC., entitled "Curable Composition for Use in a High Temperature Lithography-Based Photopolymerization Process and Method of Producing Crosslinked Polymers Therefrom; and International Patent Application Number PCT/US2019/030687 to ALIGN TECHNOLOGY, INC., entitled, "Polymerizable Monomers and Method of Polymerizing the Same." These patents/applications are hereby incorporated by reference as if set forth fully herein. As noted herein, the hybrid 3D printing techniques may combine advantages of SLA, DLP and FDM into a single technology that can be used as the basis of 3D printing objects (dental appliances, hearing aids, medical implants, etc.) for mass production.

Figure 5H:
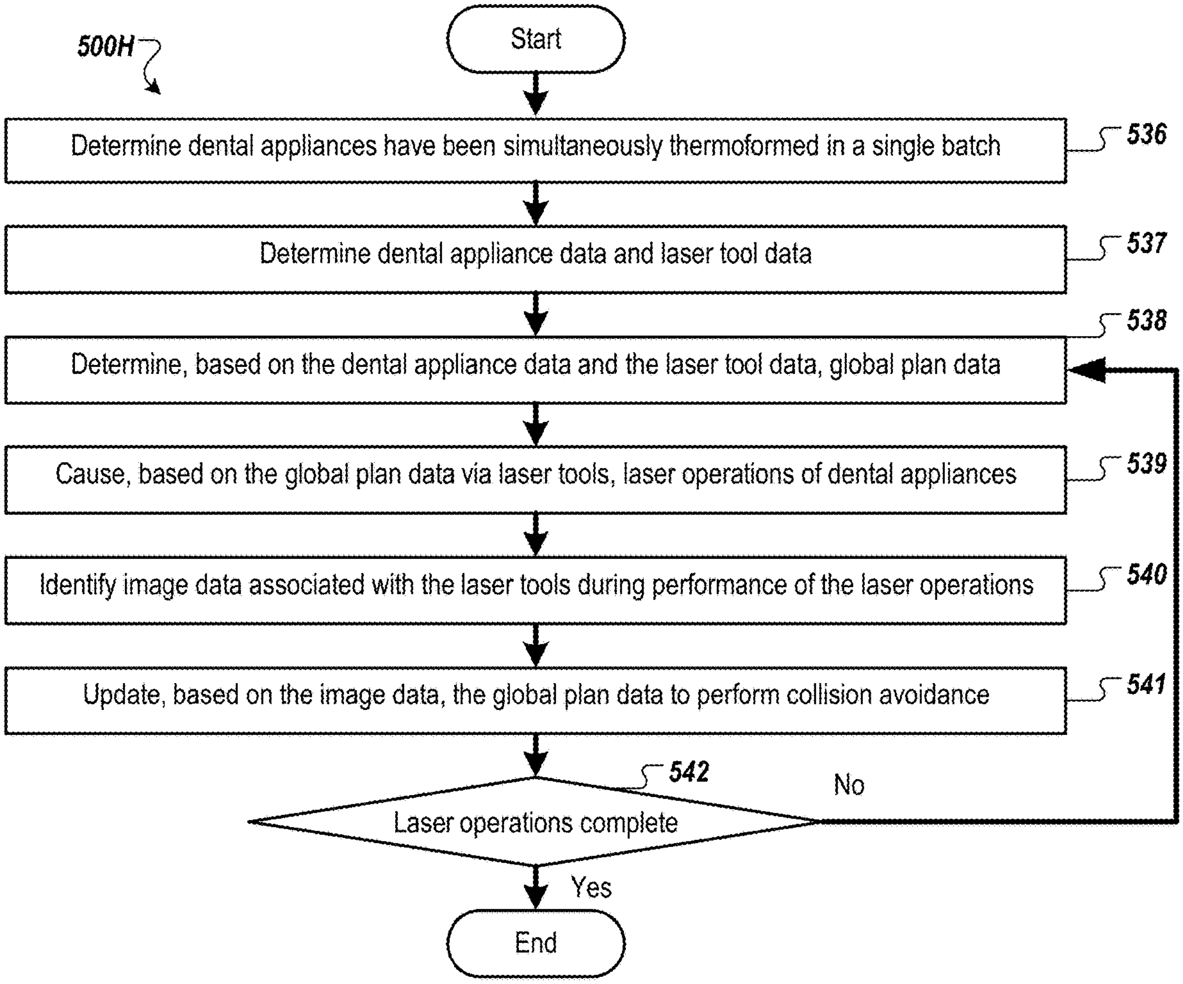

Referring to FIG. 5H, method 500H is associated with dental appliance production, according to certain embodiments.

At block 536, processing logic determines dental appliances have been simultaneously thermoformed via a thermoforming system in a single batch (e.g., batch thermoforming). In some embodiments, processing logic causes batch thermoforming to be performed.

At block 537, processing logic determines dental appliance data and laser tool data (e.g., via localization and identification system). In some embodiments, to determine the dental appliance data, the processing logic identifies 3D model data associated with the dental appliances and identifies image data of the dental appliances subsequent to being thermoformed. In some embodiments, the dental appliance data is based on the 3D model data and the image data.

In some embodiments, processing logic determines that the dental appliances meet threshold values based on the dental appliance data.

In some embodiments, the dental appliance data includes corresponding geometry of each dental appliance, corresponding location of each dental appliance, and corresponding clearance between corresponding dental appliances of the dental appliances.

In some embodiments, the laser tool data includes potential trajectories, range of reach, and degrees of freedom of each of the laser tools. In some embodiments, each of the laser tools includes: a laser head configured to perform at least one of laser trimming or laser marking; and/or a positioning system configured to move the laser head in potential trajectories.

At block 538, processing logic determines, based on the dental appliance data and the laser tool data, global plan data (e.g., distribution and classification, global plan data for performing laser operations of the dental appliances via laser tools). In some embodiments, the global plan data includes one or more of laser marking process and parameters, positioner assignments, laser trimming process and parameters, etc.

In some embodiments, to determine the global plan data includes subdividing the single batch into groups (e.g., sub-trays) based on the dental appliance data, where a corresponding laser tool of the laser tools is configured to perform a corresponding laser operation of a corresponding group (e.g., sub-tray) of the groups prior to performing a subsequent laser operation of a subsequent group.

At block 539, processing logic causes, based on the global plan data via laser tools, laser operations (e.g., laser trimming, laser marking, etc.) of the dental appliances.

At block 540, processing logic identifies image data associated with the laser tools during performance of the laser operations of the dental appliances.

At block 541, processing logic updates, based on the image data, the global plan data to perform collision avoidance (e.g., collision avoidance and monitoring). In some embodiments, the processing logic causes kinematic loops using the positioner systems (e.g., positioner system 1, positioner system n−1, positioner system n, etc.).

At block 542, processing logic determines whether the laser operations are complete (e.g., process complete, dental appliance production complete). Responsive to the laser operations being complete, the method ends. Responsive to the laser operations not being complete, flow returns to block 538.

Figure 5I:
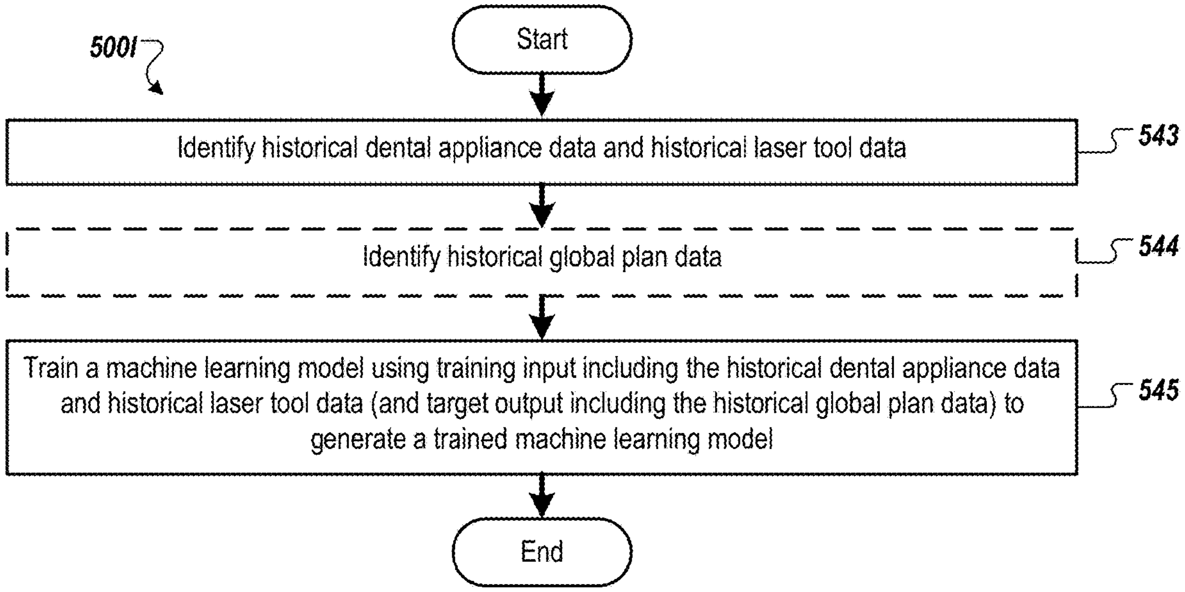
Figure 5J:
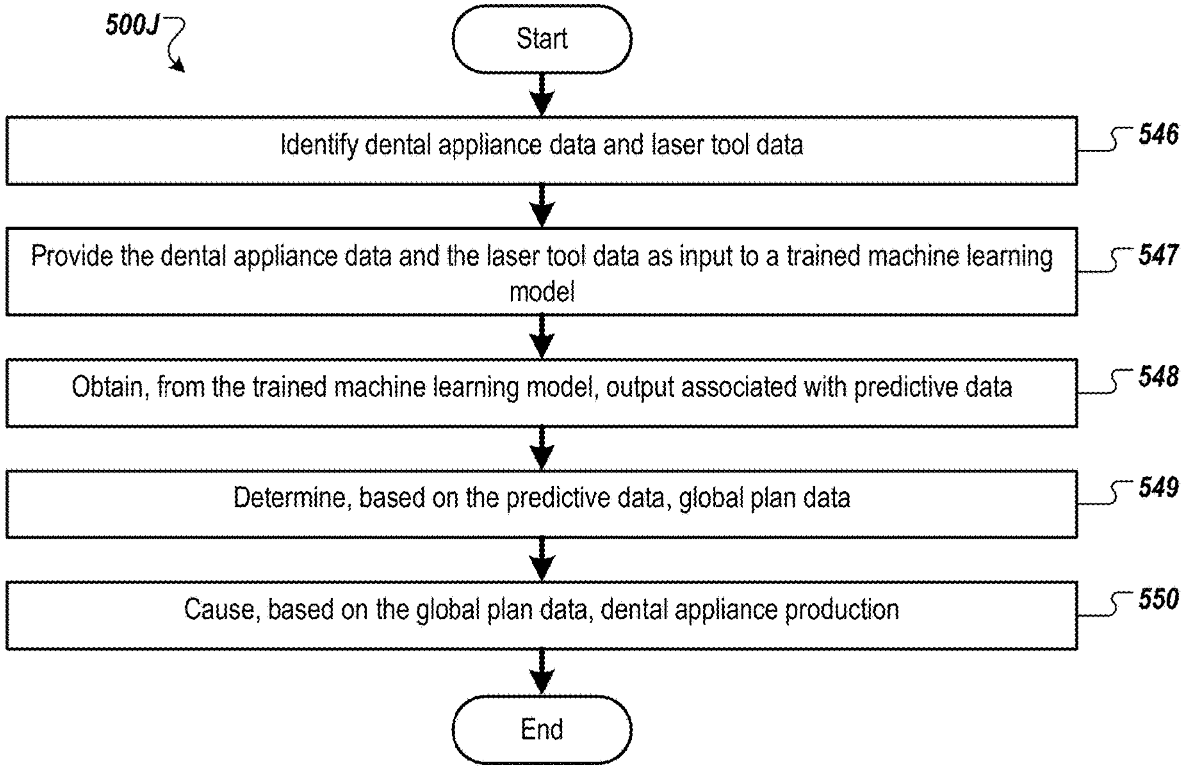

FIG. 5H may use a trained machine learning model of one or more of FIGS. 5I-J to perform one or more operations.

Referring to FIG. 5I, method 500I is associated with dental appliance production, according to certain embodiments.

At block 543, processing logic identifies historical dental appliance data and historical laser tool data. The historical dental appliance data may be associated with historical dental appliances that were simultaneously thermoformed via a thermoforming system in a single batch. The historical laser tool data may be associated with historical laser tools used to perform historical laser operations of the historical dental appliances.

In some embodiments, at block 544, processing logic identifies historical global plan data associated with historical performance of the historical laser operations.

At block 545, processing logic trains a machine learning model using training input including the historical dental appliance data and historical laser tool data to generate a trained machine learning model (e.g., unsupervised machine learning model). In some embodiments, the processing logic trains the machine learning model using training input including the historical dental appliance data and historical laser tool data and target output including global plan data to generate a trained machine learning model (e.g., supervised machine learning model). The trained machine learning model may be configured to provide output associated with predicted global plan data for performance of laser operations via laser tools of dental appliances.

Referring to FIG. 5J, method 500J is associated with dental appliance production, according to certain embodiments.

At block 546, processing logic identifies dental appliance data and laser tool data. Block 546 may be similar to block 537 of FIG. 5H.

At block 547, processing logic provides the dental appliance data and laser tool data as input to a trained machine learning model (e.g., trained via method 500I).

At block 548, processing logic obtains, from the trained machine learning model, output associated with predictive data.

At block 549, processing logic determines, based on the predictive data, global plan data.

At block 550, processing logic causes, based on the global plan data, dental appliance production. Block 550 may be similar to block 539 of FIG. 5H.

Figure 5K:
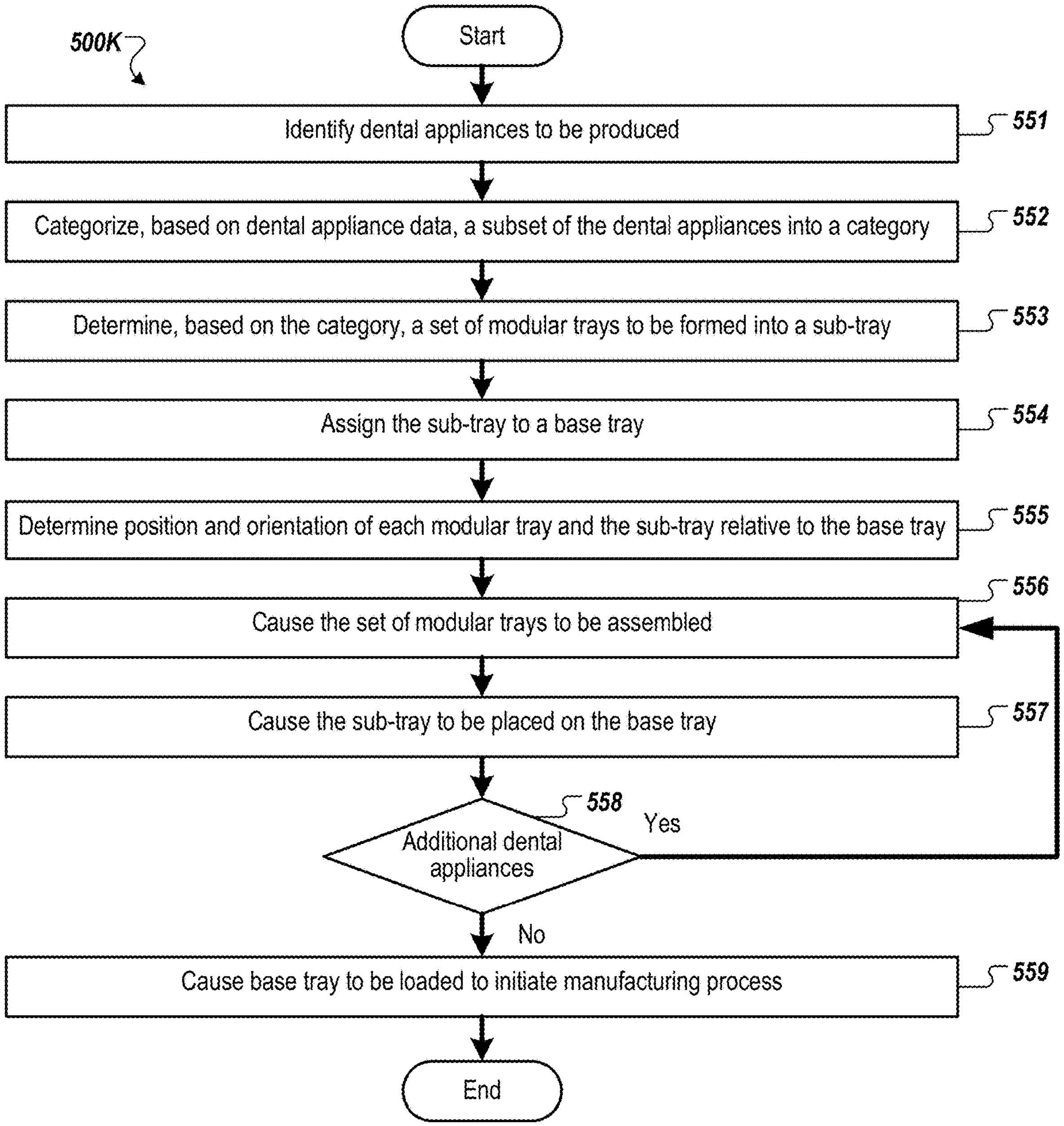

Referring to FIG. 5K, method 500K is associated with dental appliance production, according to certain embodiments.

At block 551, processing logic identifies dental appliances to be produced. For example, the processing logic may receive incoming cases, where each case may be for a particular patient (e.g., stages of dental appliances for the same patient).

At block 552, processing logic categorizes, based on dental appliance data, a subset of the dental appliances into a category. For example, the processing logic may decompose and categorize cases based on size and geometrical features (e.g., geometry, height, arc aperture, complexity, etc.).

At block 553, processing logic determines, based on the category, a set of modular trays to be formed into a sub-tray. For example, the processing logic may calculate a number of modular trays per case (e.g., sub-tray).

Conventionally, a tray of pre-determined dimensions to accommodate 3D printing of molds is used to manufacture dental appliances using 3D printers and thermoforming processes. Conventionally, after the 3D printing process, the molds are removed from the tray and placed in other trays to continue with the manufacturing process. The present disclosure includes an automatic tray distribution configuration system to generate arrangement (e.g., optimal arrangement) of different sub-tray assemblies (e.g., groups of modular trays attached to each other) for printing and thermoforming dental appliances. The present disclosure may not have pre-determined tool sizes for manufacturing of dental appliances.

An incoming order case for dental appliances may include a wide range (e.g., one to 300) of individual dental appliance stages. Grouping the dental appliances of the cases (e.g., dental appliances for a single patient) as they move across the manufacturing process can effect cost and time efficiency. Based on an incoming order, a robotic system may automatically assemble a quantity of sub-trays (e.g., groups of modular trays) to accommodate the number of dental appliances for upcoming cases. The same sub-trays (e.g., modular trays that are attached to each other) may follow the different manufacturing processes which allows for case tracking (e.g., tracking dental appliances for the same patient). The present disclosure provides space optimization to allocate a number of trays for a manufacturing process. The present disclosure may eliminate or reduce one or more of the punched out, support removal, sanding, sorting, etc. processes.

The present disclosure may allocate a number of modular trays and sub-trays for the manufacturing process of dental appliances.

A set of incoming cases (e.g., sets of dental appliances for the same patient) may go through two different classification methods. The first classification may use an ensemble learning algorithm to classify the case based on one or more of the number of dental appliances, geometrical characteristics, complexity, etc. The output of the first classification may be a set of candidate cases for the next available master tray (e.g., base tray). Cases not selected as candidates may have priority for the next available master tray for processing. The second classificatory system may evaluate and select cases from the first classification and assign cases to a virtual master tray (e.g., assign to sub-trays).

The classification system may keep all modular trays belonging to the case (e.g., to the same patient) assembled continuously (e.g., sub-tray), assigning an identification number to each sub-tray for tracking across the different manufacturing processes. The modular trays may be held together via attachment components (e.g., clamping mechanisms).

The process may use the geometrical availability of a virtual master tray to allocate cases and configure the sub-trays.

At block 554, processing logic assigns the sub-tray to a base tray. For example, the processing logic assigns cases (e.g., sub-trays) to a base tray.

At block 555, processing logic determines position and orientation of each modular tray and the sub-tray relative to the base tray. For example, the processing logic assigns position and/or orientation of modular trays and/or sub-trays in relation to the base tray.

At block 556, processing logic causes the set of modular trays to be assembled (e.g., robotic system sub-tray assembly). In some embodiments, the processing logic cases a first modular tray and a second modular tray of the set of modular trays to be inverted (e.g., pick necessary number of modular trays inverted) and causes an attachment component to be attached to a lower surface of the first modular tray and the second modular tray to form the sub-tray (e.g., attaching clamping device based on orientation).

Once all available positions in the virtual master tray are exhausted, a robotic system may assemble the geometrical configurations for each case. The system may use the number of modular trays and attachment components (e.g., clamps) to achieve the configurations.

The robotic system may pick and place a set of inverted trays and based on the geometrical analysis and results from the second classificatory system, assemble the desired configurations.

At block 557, processing logic causes the sub-tray to be placed on the base tray (e.g., robotic system move sub-tray to base tray). In some embodiments, the processing logic picks the sub-tray (e.g., inverted) and places the sub-tray on the master tray location. After completion of the sub-tray assembly, the robotic system may move the sub-tray to the master tray. The system may repeat the process until all available space has been exhausted.

At block 558, processing logic determines whether there are additional dental appliances (e.g., determines whether there are cases remaining). Responsive to there being additional dental appliances, flow returns to block 556. Responsive to there not being additional dental appliances, flow continues to block 559.

At block 559, processing logic causes the base tray to be loaded to initiate the manufacturing process (e.g., load base tray to initiate the manufacturing process).

Figure 5L:
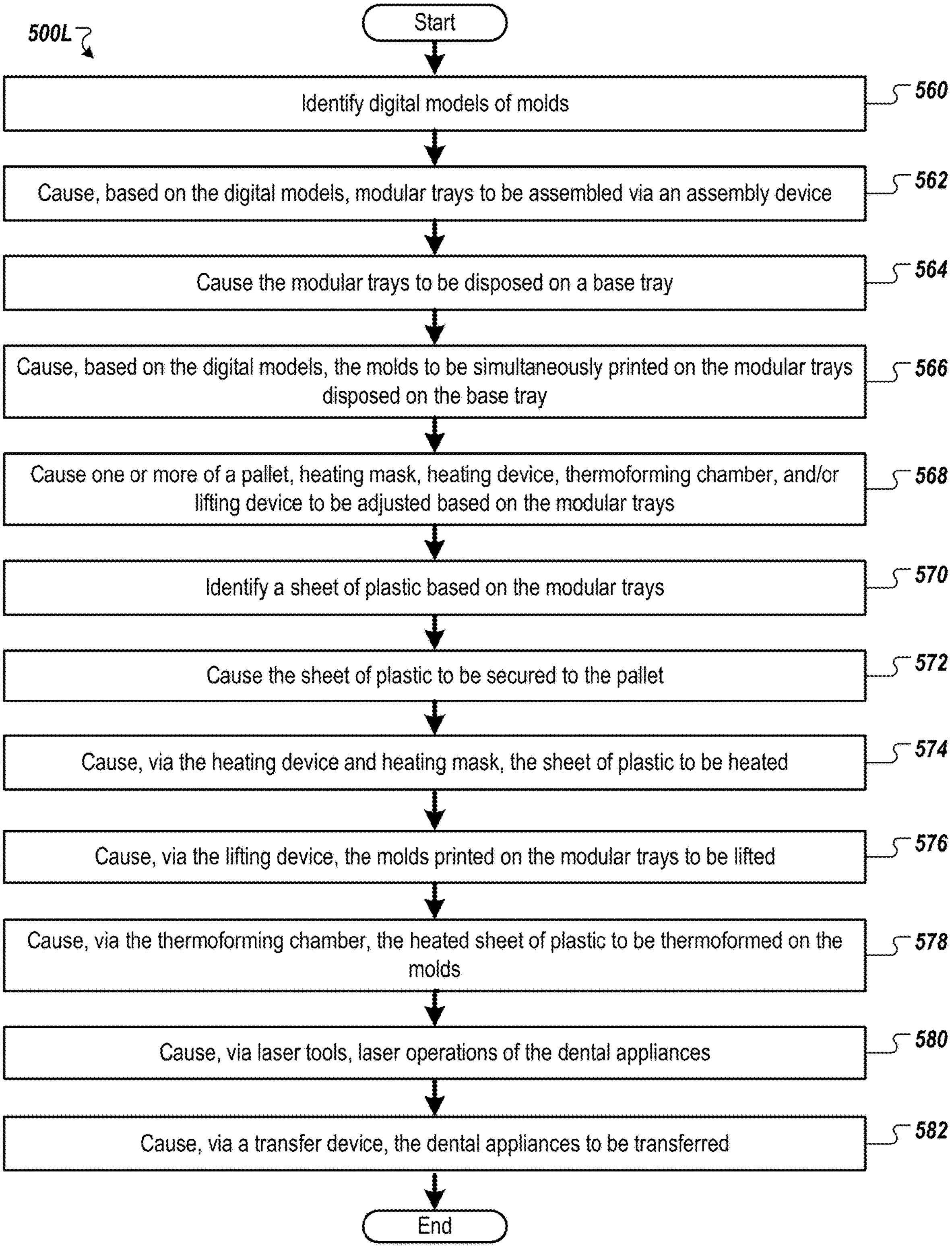

Referring to FIG. 5L, method 500L is associated with dental appliance production, according to certain embodiments.

At block 560, processing logic identifies digital models of molds (e.g., dental mold). In some embodiments, the mold associated with a dental arch of a user, such as a mold usable to form a dental appliance. In some embodiments, the mold is to be used to form a dental appliance (e.g., to be used in relation to a dental arch of a user), such as incremental palatal expanders, aligners (e.g., aligners with or without mandibular advancement structures and/or other structures), dental attachment templates, and/or other dental appliances.

A shape of a dental arch for a patient at a treatment stage may be determined based on a treatment plan to generate the digital model of the mold. In the example of orthodontics, the treatment plan may be generated based on an intraoral scan of a dental arch (e.g., dental arch to receive a dental appliance, dental arch to be modeled). The intraoral scan of a patient's dental arch may be performed to generate a 3D virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

The processing logic may determine an initial shape for a mold of the patient's dental arch at a treatment stage based on the digital model of the dental arch at that treatment stage. Processing logic may additionally determine one or more features to add to the object.

The processing logic may determine a final shape for the mold and may generate a digital model of the mold. Alternatively, the digital model may have already been generated. In such an instance, processing logic may update the already generated digital model to include one or more determined features for the mold. The digital model may be represented in a file such as a computer aided drafting (CAD) file or a 3D printable file such as a stereolithography (STL) file. The digital model may include instructions that will control a fabrication system or device in order to produce the mold with specified geometries.

At block 562, processing logic causes, based on the digital models, modular trays to be assembled via an assembly device.

At block 564, processing logic causes the modular trays to be disposed on a base tray.

At block 566, processing logic causes, based on the digital models, the molds (e.g., dental molds) to be simultaneously printed (e.g., via 3D printing, via rapid prototyping machine) on the modular trays disposed on the base tray.

A mold may be generated based on the digital model of block 560. A virtual 3D model of a patient's dental arch may be used to generate a unique customized mold associated with the dental arch at a particular stage of treatment. The shape of the mold may be at least in part based on the shape of the virtual 3D model for that treatment stage. The mold may correspond to a dental arch of a patient and the mold may include a sloping portion that commences below a gum line of the dental arch and extends away from the dental arch to a lower portion of the mold. In some embodiments, the mold is generated with the sloping portion commencing below the gum line (e.g., to assist in the release of the thermoformed sheet of plastic from the mold). The mold may be formed using a rapid prototyping equipment (e.g., 3D printers) to manufacture the mold using additive manufacturing techniques (e.g., stereolithography) or subtractive manufacturing techniques (e.g., milling). The digital model may be input into a rapid prototyping machine. The rapid prototyping machine then manufactures the mold using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured. In one embodiment, a system such as described earlier herein (e.g., system 100, dental appliance production equipment 106) is used to print the mold.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of a mold including multiple materials, referred to herein as "multi-material direct fabrication." In some embodiments, a multi-material direct fabrication method involves concurrently forming a mold from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate a mold from a plurality of different materials. Alternatively or in combination, a multi-material direct fabrication method can involve forming a mold from multiple materials in a plurality of sequential manufacturing steps. For instance, a first portion of the mold (e.g., a main portion of the mold) can be formed from a first material in accordance with any of the direct fabrication methods herein, then a second portion of the mold (e.g., complex features added to the mold) can be formed from a second material in accordance with methods herein, and so on, until the entirety of the mold has been formed. The relative arrangement of the first and second portions can be varied as desired. In one embodiment, multi-material direct fabrication is used to cause a first material to be used for the markings of the cut line on the mold, and to cause one or more additional materials to be used for the remainder of the mold.

In some embodiments, a dental appliance is to be formed on the mold (e.g., by thermoforming the dental appliance over the mold). The dental appliance may be configured to provide forces to move the patient's teeth, or may be configured to perform other actions such as to protect a patient's teeth from bruxism. The shape of each dental appliance is unique and customized for a particular patient and a particular treatment stage. In an example, dental appliances can be pressure formed or thermoformed over printed molds. Each mold may be used to fabricate a dental appliance that will apply forces to the patient's teeth at a particular stage of the orthodontic treatment. The dental appliances each have teeth-receiving cavities that receive and resiliently reposition the teeth in accordance with a particular treatment stage.

Responsive to forming the molds, the molds remain on the modular trays. The processing logic may identify the molds via an imaging system (e.g., part of an imaging station, part of thermoforming station, part of trimming station, part of robot used to move the mold, etc.). The processing logic may cause the molds to be moved to a thermoforming station via a robot arm, conveyor belt, or other transport mechanism.

At block 568, processing logic causes one or more of a pallet, heating mask, heating device, thermoforming chamber, and/or lifting device to be adjusted based on the modular trays.

At block 570, processing logic identifies a sheet of plastic based on the modular trays. The sheet of plastic may be sized (e.g., cut) based on the size of the sub-tray of assembled modular trays. The sheet of plastic may be an elastic thermoplastic, a sheet of polymeric material, etc.

At block 572, processing logic causes the sheet of plastic to be secured to the pallet. The sheet of plastic may be lowered onto the pallet so that holding pins of the pallet pierce the sheet of plastic to secure the sheet of plastic to the pallet.

At block 574, processing logic causes, via the heating device and the heating mask, the sheet of plastic to be heated. The sheet of plastic may be secured to a pallet and the sheet of plastic secured to the pallet may be surrounded with a mask prior to heating the sheet of plastic. A pressurized cylinder may lower the mask onto the sheet of plastic secured to the pallet. The sheet of plastic may be heated to a temperature at which the sheet of plastic becomes pliable. The sheet of plastic may be heated using a ceramic heater, convection oven, or infrared heater. The mask may allow the sheet of plastic to be heated to 336° F. without hanging to avoid air leaks.

At block 576, processing logic causes, via the lifting device, the molds printed on the modular trays to be lifted.

At block 578, processing logic causes, via the thermoforming chamber, the heat sheet of plastic to be thermoformed on the molds. To thermoform the heated sheet of plastic over the mold, pressure may concurrently be applied to the sheet of plastic to form the now pliable sheet of plastic around the mold (e.g., with features that will imprint markings and/or elements in the dental appliance formed on the mold). Once the sheet cools, it will have a shape that conforms to the mold. In one embodiment, a release agent (e.g., a non-stick material) is applied to the mold before forming the dental appliances (e.g., shells). This may facilitate later removal of the molds from the shells.

At block 580, processing logic causes, via laser tools, performance of laser operations (e.g., laser marking and/or laser trimming) on the dental appliances (e.g., thermoformed sheet of plastic). The laser operations may be performed based on parameters (e.g., power data, frequency data, pitch data, resolution data, focal data, velocity data, etc.).

The thermoformed sheet of plastic may be removed from the mold (e.g., using a shell removal device) after being trimmed. The thermoformed sheet of plastic may be trimmed to generate the dental appliance. In some embodiments, the portion of thermoformed sheet of plastic that is disposed on a portion of the mold that slopes outward below the gum line is removed during the trimming of the thermoformed sheet of plastic to generate the dental appliance. Before or after the thermoformed sheet of plastic is removed from the mold for a treatment stage, the thermoformed sheet of plastic is trimmed along one or more cut lines (also referred to as a trim line). The cut line may be a gingival cut line that represents an interface between a dental appliance and a patient's gingiva. In some embodiments, the dental appliance is cut by a computer controlled trimming machine such as a CNC machine or a laser trimming machine. The computer controlled trimming machine may control an angle and position of a cutting tool of the trimming machine to trim the thermoformed sheet of plastic.

In some embodiments, processing logic causes image data associated with performance of laser operations on the dental appliance to be captured. The processing logic may update performance of the laser operations (e.g., update the parameters) based on the image data.

At block 582, processing logic causes, via a transfer device, the dental appliances to be transferred.

In some embodiments, the transferring of the dental appliances (e.g., on a mold secured to a modular tray) is via a conveyor system (e.g., via lateral movement). In some embodiments, the transferring of the dental appliances is via a dial system (e.g., via rotational movement). In some embodiments, the transferring of the dental appliances is via robots.

In some embodiments, the mold is transferred to be located below the thermoforming station and is lifted to have the heated sheet thermoformed over the first mold and the second mold. In some embodiments, the transferring of the first mold to be located below the thermoforming station is via lateral movement (e.g., conveyor system). In some embodiments, the transferring of the mold to be located below the thermoforming station is via rotational movement (e.g., dial system).

In some embodiments, the techniques herein can be used to form molds, such as thermoforming molds. Examples of these can be found in: U.S. Pat. No. 9,943,991, by inventors Tanugula et al., entitled "Mold with separable features;" U.S. Pat. No. 9,943,386, to inventors Webber et al., entitled "Mold with weakened areas;" and U.S. Pat. No. 8,776,391 to inventors Kaza et al., entitled "System for post-processing orthodontic appliance molds;" as well as any continuation or divisional application claiming priority and any utility or provisional application to which these claim priority therefrom. These patents/applications are hereby incorporated by reference as if set forth fully herein.

In some embodiments, the techniques herein can be used to form appliances with mandibular repositioning features. Examples of these can be found in: U.S. Pat. No. 9,844,424 by inventors Wu et al., entitled, "Dental appliance with repositioning jaw elements;" U.S. Pat. Pub. No. 2015/0238280 by inventors Wu et al., entitled "Dental appliance with repositioning jaw elements;" U.S. Pat. No. 10,213,277 by inventors Webber et al., entitled "Dental appliance binding structure;" as well as any continuation or divisional application claiming priority and any utility or provisional application to which these claim priority therefrom. These patents/applications are hereby incorporated by reference as if set forth fully herein.

In some embodiments, the techniques herein can be used to form palatal expanders. Examples can be found in: U.S. Pat. No. 9,610,141 by inventors Kopelman et al., entitled, "Arch expanding appliance;" U.S. Pat. No. 7,192,273 by inventor McSurdy entitled "System and method for palatal expansion;" U.S. Pat. No. 7,874,836 by inventor McSurdy entitled "System and method for palatal expansion;" as well as any continuation or divisional application claiming priority and any utility or provisional application to which these claim priority therefrom. These patents/applications are hereby incorporated by reference as if set forth fully herein.

In some embodiments, the techniques herein can be used to form attachment formation templates. Examples can be found in: U.S. Pat. Pub. No. 2017/0007368 by inventor Boronkay entitled "Direct fabrication of attachment templates with adhesive;" U.S. Pat. Pub. No. 2017/0165032 by inventors Webber et al., entitled "Dental attachment placement structure;" U.S. Pat. Pub. No. 2017/0319296 by inventors Webber et al., entitled "Dental attachment placement structure;" the contents of U.S. patent application Ser. No. 16/366,686 by inventors Webber et al., entitled "Dental attachment placement structure;" as well as any continuation or divisional application claiming priority and any utility or provisional application to which these claim priority therefrom. These patents/applications are hereby incorporated by reference as if set forth fully herein.

In some embodiments, the techniques herein can be used to form directly fabricated aligners.

Examples can be found in: U.S. Pat. App. Pub. No. 2016/0310236 by inventors Kopelman et al., entitled "Direct fabrication of orthodontic appliances with elastics;" U.S. Pat. App. Pub. No. 2017/0007365 to Kopelman et al., entitled "Direct fabrication of aligners with interproximal force coupling;" U.S. Pat. App. Pub. No. 2017/0007359 to Kopelman et al., entitled "Direct fabrication of orthodontic appliances with variable properties;" U.S. Pat. App. Pub. No. 2017/0007360 to Kopelman et al., entitled "Systems, apparatuses and methods for dental appliances with integrally formed features;" U.S. Pat. No. 10,363,116 to Boronkay entitled "Direct fabrication of power arms;" U.S. Pat. App. Pub. No. 2017/0007366 to Kopeleman et al., entitled "Direct fabrication of aligners for arch expansion;" U.S. Pat. App. Pub. No. 2017/0007367 to Li et al., entitled "Direct fabrication of palate expansion and other application;" as well as any continuation or divisional application claiming priority and any utility or provisional application to which these claim priority therefrom. These patents/applications are hereby incorporated by reference as if set forth fully herein.

Examples of materials that can be used with the embodiments discussed herein include the subject matter of U.S. Pat. Pub. No. 2017/0007362, by inventors Yan CHEN et al., entitled, "Dental Materials Using Thermoset Polymers;" International Patent Application Number PCT/US2019/030683 to ALIGN TECHNOLOGY, INC., entitled "Curable Composition for Use in a High Temperature Lithography-Based Photopolymerization Process and Method of Producing Crosslinked Polymers Therefrom; and International Patent Application Number PCT/US2019/030687 to ALIGN TECHNOLOGY, INC., entitled, "Polymerizable Monomers and Method of Polymerizing the Same." These patents/applications are hereby incorporated by reference as if set forth fully herein. As noted herein, the hybrid 3D printing techniques may combine advantages of SLA, DLP and FDM into a single technology that can be used as the basis of 3D printing objects (dental appliances, hearing aids, medical implants, etc.) for mass production.

Figure 6:
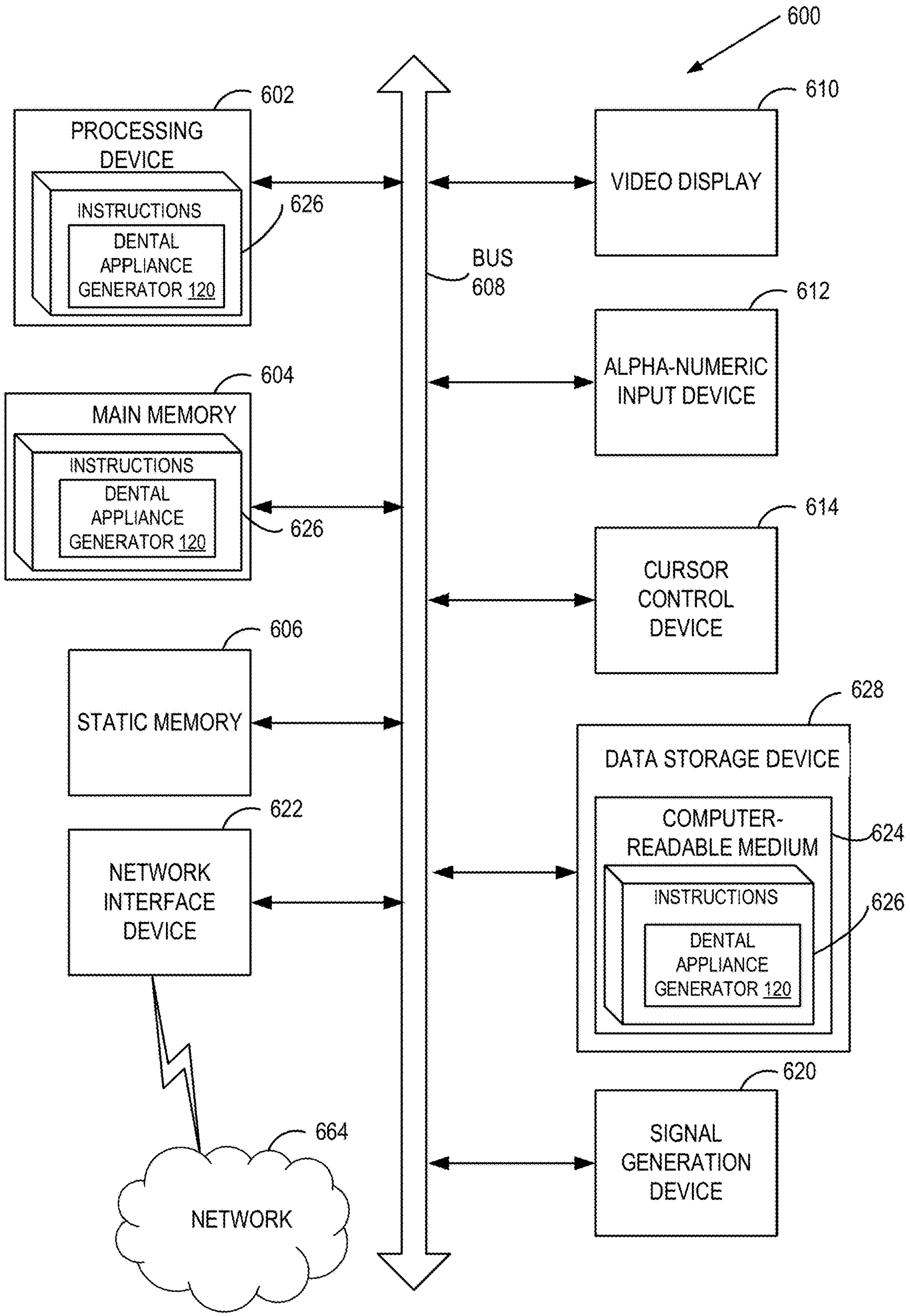
FIG. 6 illustrates a block diagram of an example computing device, according to certain embodiments.

FIG. 6 illustrates a diagrammatic representation of a machine in the example form of a computing device 600 within which a set of instructions, for causing the machine to perform any one or more of the methodologies discussed with reference to the methods of FIGS. 5A-L. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

In some embodiments, computing device 600 is one or more of controller 102, client device 104, dental appliance production equipment 106, imaging device 108, predictive server 112, server machine 170, or server machine 180. In some embodiments, computing device 600 includes one or more of the components illustrated in FIG. 6.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory machine-readable storage medium) 624 on which is stored one or more sets of instructions 626 embodying any one or more of the methodologies or functions described herein. A non-transitory machine-readable storage medium refers to a storage medium other than a carrier wave. The instructions 626 may also reside, completely or at least partially, within the main memory 604 and/or within the processing device 602 during execution thereof by the computing device 600, the main memory 604 and the processing device 602 also constituting computer-readable storage media.

The computer-readable storage medium 624 may also be used to store one or more instructions for dental appliance production and/or a dental appliance generator 120, which may perform one or more of the operations of methods 500A-L described with reference to FIGS. 5A-L. The computer-readable storage medium 624 may also store a software library containing methods that call a dental appliance generator 120. While the computer-readable storage medium 624 is shown in an example embodiment to be a single medium, the term "non-transitory machine-readable storage medium" should be taken to include a single medium or multiple media (e.g., a centralized or distributed database, and/or associated caches and servers) that store the one or more sets of instructions. The term "non-transitory machine-readable storage medium" shall also be taken to include any medium that is capable of storing or encoding a set of instructions for execution by the machine and that cause the machine to perform any one or more of the methodologies of the present disclosure. The term "non-transitory machine-readable storage medium" shall accordingly be taken to include, but not be limited to, solid-state memories, and optical and magnetic media.

Figure 7A:
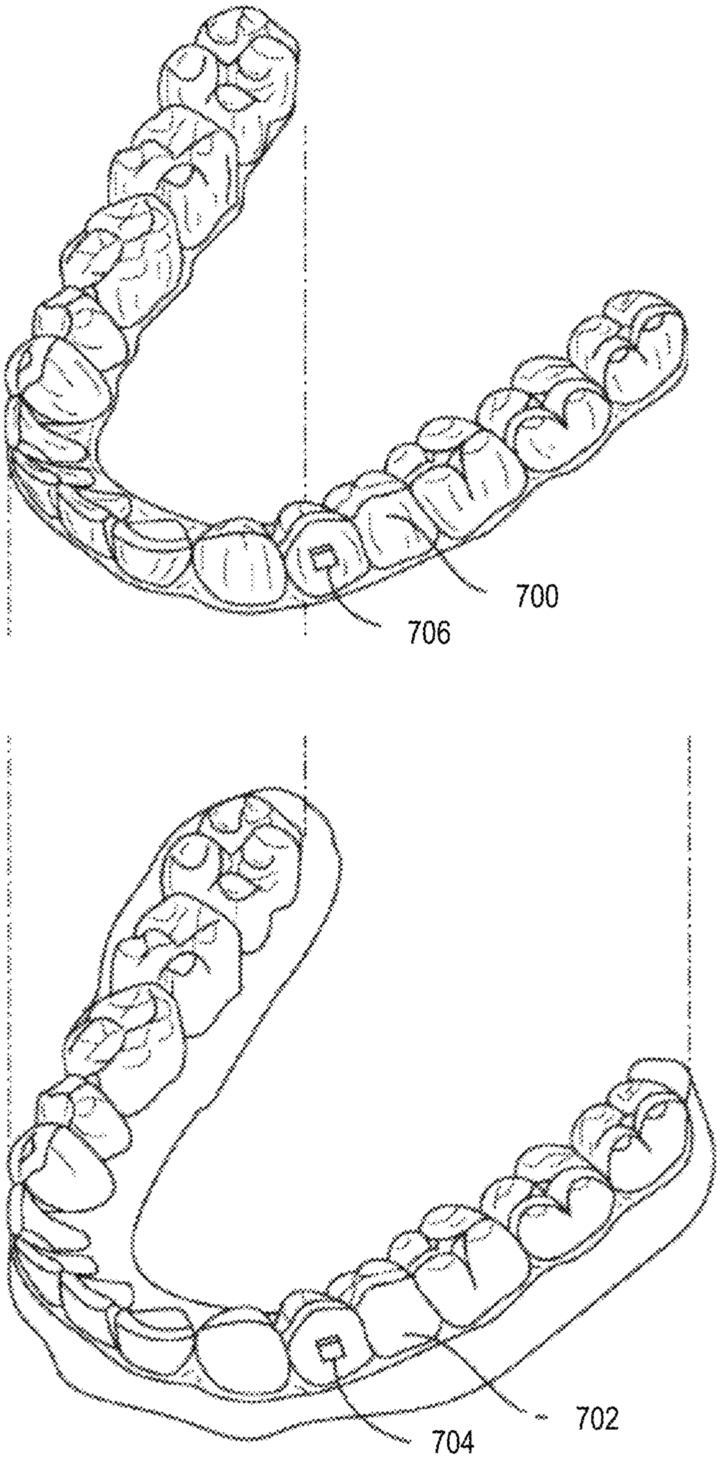
FIG. 7A illustrates a tooth repositioning appliance, according to certain embodiments.

FIG. 7A illustrates an exemplary tooth repositioning dental appliance or aligner 700 that can be worn by a patient in order to achieve an incremental repositioning of individual teeth 702 in the jaw. The aligner 700 may be formed using laser operations (e.g., laser marking, laser trimming), modular trays, and/or global plan data, as disclosed herein. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, Polypropylenes, polyethylenes, Polyethylene terephthalates, poly lactic acid, polyurethanes, epoxide polymers, polyethers, poly(vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not all inclusive, but rather is exemplary. The plastics can be thermosets or thermoplastics. The plastic may be a thermoplastic.

Examples of materials applicable to the embodiments disclosed herein include, but are not limited to, those materials described in the following patent applications filed by Align Technology: "MULTILAYER DENTAL APPLIANCES AND RELATED METHODS AND SYSTEMS," U.S. Pat. No. 9,655,691 to Li, et al., filed May 14, 2012; "SYSTEMS AND METHODS FOR VARYING ELASTIC MODULUS APPLIANCES," U.S. Pat. No. 6,964,564 to Phan, et al., filed Jul. 26, 2002; "METHODS OF MAKING ORTHODONTIC APPLIANCES," U.S. Pat. No. 7,641,828 to DeSimone, et al., filed Oct. 12, 2004; "TREATMENT OF TEETH BY ALIGNERS," U.S. Pat. No. 8,740,614 to Wen et al., filed Jul. 29, 2009; and any applications claiming benefit therefrom or providing benefit thereto (including publications and issued patents), including any divisional, continuation, or continuation-in-part thereof, the content of which are incorporated by reference herein.

Examples of materials applicable to the embodiments disclosed herein include a hard polymer layer disposed between two soft polymer layers. In some embodiments, the hard inner polymer layer includes a co-polyester and has a polymer layer elastic modulus. In some embodiments, a first soft outer polymer layer and a second soft outer polymer layer each include a thermoplastic polyurethane elastomer and each have a soft polymer elastic modulus less than the hard polymer layer elastic modulus, a flexural modulus of greater than about 35,000 psi, a hardness of about 60A to about 85D, and a thickness in a range from 25 microns to 100 microns. In some embodiments, the hard inner polymer layer is disposed between the first soft outer polymer layer and the second soft outer polymer layer so as to reduce degradation of the resilient position force applied to the teeth when the appliance is worn. The hard polymer layer can include a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof (e.g., a blend of at least two of the listed hard polymeric materials). In some embodiments, the hard polymer layer includes two or more hard polymer layers. The soft outer polymer material may include a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or a combination thereof (e.g., a blend of at least two of the listed soft polymeric materials). The soft polymer layers can be the same material or a different material.

Examples of materials applicable to the embodiments disclosed herein include a middle layer disposed between two layers. The two layers individually include a thermoplastic polymer having a flexural modulus of from about 1,000 MPa to 2,500 MPa and a glass transition temperature and/or melting point of from about 80° C. to 180° C. The middle layer includes a polyurethane elastomer having a flexural modulus of from about 50 MPa to about 500 MPa and one or more of a glass transition temperature and/or melting point of from about 90° C. to about 220° C. The polymeric sheet composition has a combined thickness of the middle layer and the outer layers of from 250 microns to 2000 microns and a flexural modulus of from 500 MPa to 1,500 MPa. In some embodiments, the outer layers include one or more of a co-polyester, a polycarbonate, a polyester polycarbonate blend, a polyurethane, a polyamide, or a polyolefin. The middle layer may have a Shore hardness of from A90 to D55 and a compression set of less than 35% after 22 hours at 25° C. In some embodiments, the outer layers have a lateral restoring force of less than 100 Newtons (N) per square centimeter when displayed by 0.05 mm to 0.1 mm relative to each other. In some embodiments, the interplay peel strength between the outer layers and the middle layer is greater than 50 N per 2.5 cm. In some embodiments, the combined thickness of the outer layers is from 50 microns to 1,000 microns. In some embodiments one or more of the outer layers include a microcrystalline polyamide including from 50 to 100 mole % of C6 to C14 aliphatic diacid moieties and about 50 to 100 mole % of 4,4'-methylene-bis(cyclohexylamine), having a glass transition of between about 100° C. and 180° C., a heat of fusion of less than 20 J/g and a light transmission of greater than 80%. In some embodiments, one or more of the outer layers includes a co-polyester including: a dicarboxylic acid component including 70 mole % to 100 mole % of terephthalic acid residues; and a diol component including (i) 0 to 90 mole % ethylene glycol, (ii) 5 mole % to 50 mole % of 2,2,4,4-tetramethyl-1,3-cyclobutanediol residues, (iii) 50 mole % to 95 mole % 1,4-cyclohexanedimethanol residues, and (iv) 0 to 1 mole % of a polyol having three or more hydroxyl groups, where the sum of the mole % of diol residues (i), (ii), (iii), and (iv) amounts to 100 mole % and the co-polyester exhibits a glass transition temperature Tg from 80° C. to 150° C. In some embodiments, the middle layer includes an aromatic polyether polyurethane having a Shore hardness of from A90 to D55 and a compression set of less than 35%, where the interlayer peel strength between the outer layers and the middle layer is greater than 50 N per 2.5 cm. In some embodiments, one or more of the outer layers includes a polyurethane that includes: a di-isocyanate including 80 mole % to 100 mole % of methylene diphenyl diisocyanate residues and/or hydrogenated methylene diphenyl diisocyanate; and a diol component including: (i) 0 to 100 mole % hexamethylene diol; and (ii) 0 to 50 mole % 1,4-cyclohexanedimethanol, where the sum of (i) and (ii) amounts to greater than 90 mole % and the polyurethane has a glass transition temperature Tg from about 85° C. to about 150° C.

Although polymeric aligners are discussed herein, the techniques disclosed may also be applied to aligners having different materials. Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to perform simultaneous forming multiple shells which are any suitable type of shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

The aligner 700 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 704 on teeth 702 with corresponding receptacles or apertures 706 in the aligner 700 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 7B:
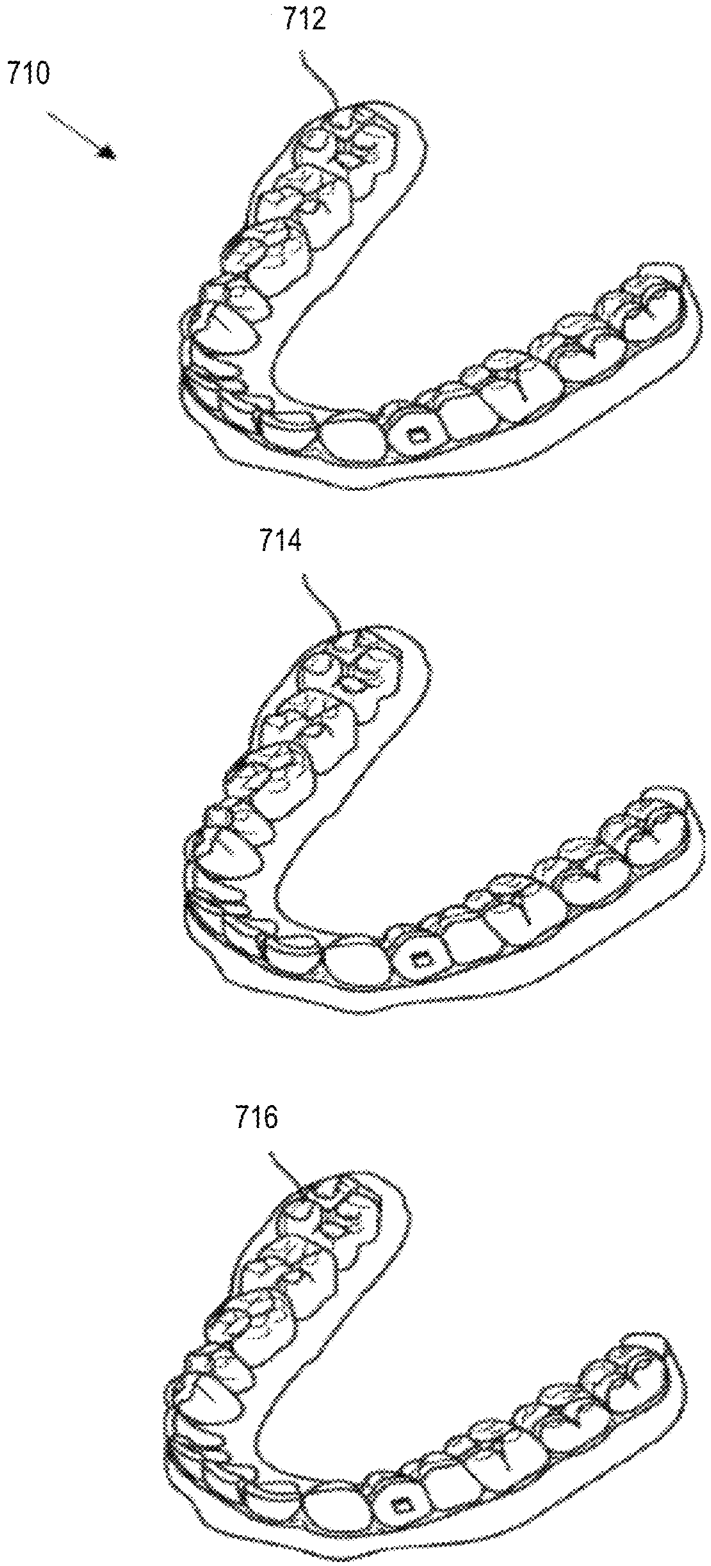
FIG. 7B illustrates a tooth repositioning system, according to certain embodiments.

FIG. 7B illustrates a tooth repositioning system 710 including a plurality of appliances 712, 714, 716. The appliances 712, 714, 716 may be formed using laser operations (e.g., laser marking, laser trimming), modular trays, and/or global plan data, as disclosed herein. Alternatively, the appliances 712, 714, 716 may be directly manufactured using a rapid prototyping machine such as that discussed herein above. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 710 can include a first appliance 712 corresponding to an initial tooth arrangement, one or more intermediate appliances 714 corresponding to one or more intermediate arrangements, and a final appliance 716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 712, 714, 716 (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be performed by a rapid prototyping machine (e.g., a stereolithography (SLA) 3D printer). The rapid prototyping machine may receive digital models of molds of dental arches and/or digital models of the appliances 712, 714, 716 after the digital models of the appliances 712, 714, 716 have been processed by processing logic of a computing device, such as the computing device in FIG. 6. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing a dental appliance generator 120.

To manufacture the molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a 3D virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 712, 714, 716 can be pressure formed or thermoformed over the molds. Each mold may be used to fabricate an appliance that will apply forces to the patient's teeth at a particular stage of the orthodontic treatment. The appliances 712, 714, 716 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell. Forces may be applied to lift the appliance from the mold. In some instances, a breakage, warpage, or deformation may result from the removal forces. Accordingly, embodiments disclosed herein may determine where the probable point or points of damage may occur in a digital design of the appliance prior to manufacturing and may perform a corrective action.

Additional information may be added to the appliance. The additional information may be any information that pertains to the appliance. Examples of such additional information includes a part number identifier, patient name, a patient identifier, a case number, a sequence identifier (e.g., indicating which appliance a particular liner is in a treatment sequence), a date of manufacture, a clinician name, a logo and so forth. For example, after determining there is a probable point of damage in a digital design of an appliance, an indicator may be inserted into the digital design of the appliance. The indicator may represent a recommended place to begin removing the polymeric appliance to prevent the point of damage from manifesting during removal in some embodiments.

In some embodiments, a library of removal methods/patterns may be established and this library may be referenced when simulating the removal of the aligner in the numerical simulation. Different patients or production technicians may tend to remove aligners differently, and there might be a few typical patterns. For example: 1) some patients lift from the lingual side of posteriors first (first left and then right, or vice versa), and then go around the arch from left/right posterior section to the right/left posterior section; 2) similar to #1, but some other patients lift only one side of the posterior and then go around the arch; 3) similar to #1, but some patients lift from the buccal side rather than the lingual side of the posterior; 4) some patients lift from the anterior incisors and pull hard to remove the aligner; 5) some other patients grab both lingual and buccal side of a posterior location and pull out both sides at the same time; 6) some other patients grab a random tooth in the middle. The library can also include a removal guideline provided by the manufacturer of the aligner. Removal approach may also depend on presence or absence of attachments on teeth as some pf the above method may result in more comfortable way of removal. Based on the attachment situation on each tooth, it can be determined how each patient would probably remove an aligner and adapt that removal procedure for that patient in that specific simulation.

After an appliance is formed over a mold for a treatment stage, the appliance is removed from the mold (e.g., automated removal of the appliance from the mold), and the appliance is subsequently trimmed along a cutline (also referred to as a trim line). The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

In some embodiments, the dental appliances (e.g., orthodontic appliances) herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances 712, 714, and 716. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances 712, 714, and 716 can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances 712, 714, and 716 can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances 712, 714, and 716. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances 712, 714, and 716 are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, and then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Once appliances (e.g., aligners) are directly fabricated, they may be inspected using the systems and/or methods described herein above.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 7C:
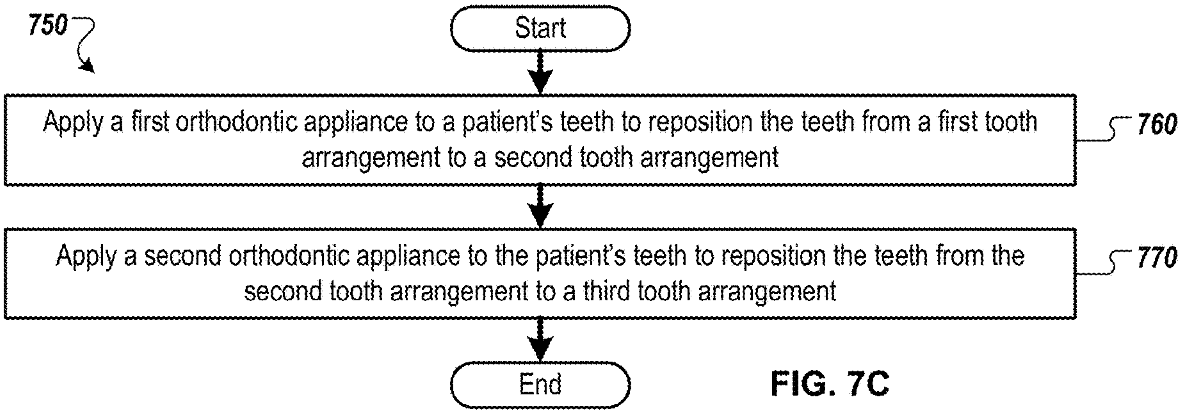
FIG. 7C illustrates a method of orthodontic treatment using a plurality of appliances, according to certain embodiments.

FIG. 7C illustrates a method 750 of orthodontic treatment using a plurality of appliances, in accordance with embodiments. One or more of the plurality of appliances may be formed using laser operations (e.g., laser marking, laser trimming), modular trays, and/or global plan data, as disclosed herein. The method 750 can be practiced using any of the appliances or appliance sets described herein. In block 760, a first orthodontic appliance is applied to a patient's teeth in order to reposition the teeth from a first tooth arrangement to a second tooth arrangement. In block 770, a second orthodontic appliance is applied to the patient's teeth in order to reposition the teeth from the second tooth arrangement to a third tooth arrangement. The method 750 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 8:
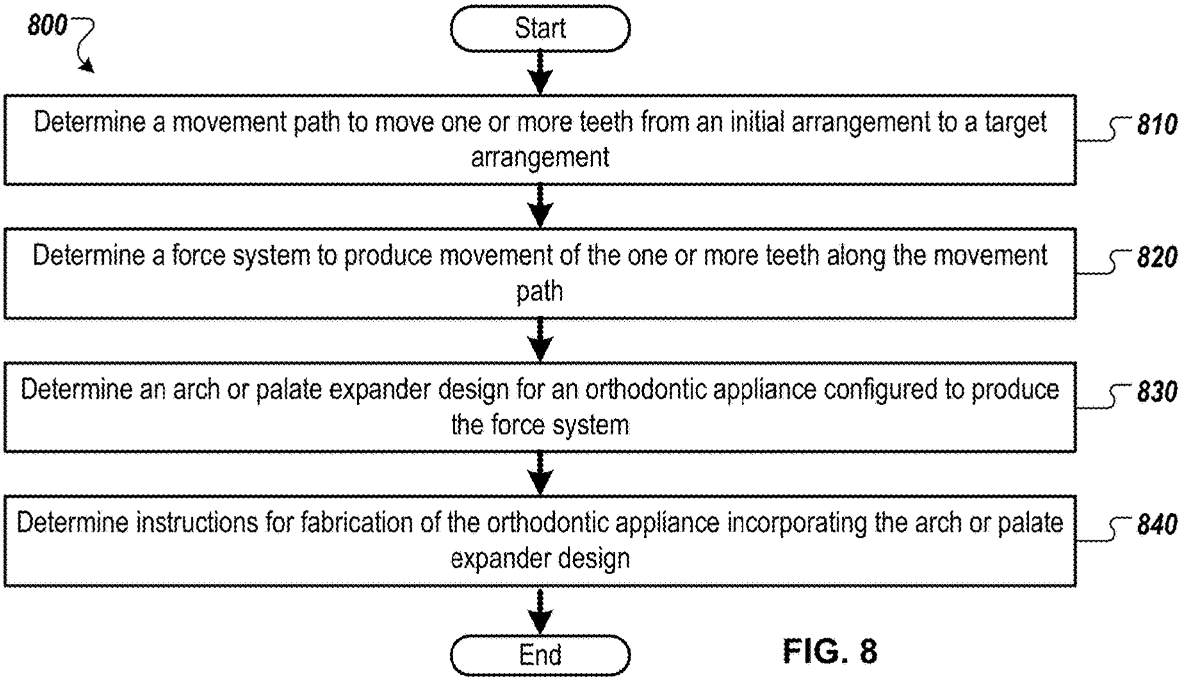
FIG. 8 illustrates a method for designing an orthodontic appliance, according to certain embodiments.

FIG. 8 illustrates a method 800 for designing an orthodontic appliance to be produced by direct fabrication, in accordance with embodiments. The method 800 can be applied to any embodiment of the orthodontic appliances that may be formed using laser operations (e.g., laser marking, laser trimming), modular trays, and/or global plan data, as disclosed herein. Some or all of the blocks of the method 800 can be performed by any suitable data processing system or device, e.g., one or more processors configured with suitable instructions.

In block 810, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 820, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 830, appliance design for an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 840, instructions for fabrication of the orthodontic appliance incorporating the appliance design are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming. In some embodiments, the instructions for fabrication of the orthodontic appliance include instructions for performing laser operations (e.g., laser marking, laser trimming), modular trays, and/or global plan data, as disclosed herein.

Method 800 may comprise additional blocks: 1) The upper arch and palate of the patient is scanned intraorally to generate three dimensional data of the palate and upper arch; and/or 2) The three dimensional shape profile of the appliance is determined to provide a gap and teeth engagement structures as described herein.

Although the above blocks show a method 800 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 800 may be performed with any suitable fabrication system or device, such as the embodiments described herein. Some of the blocks may be optional, and the order of the blocks can be varied as desired.

Figure 9:
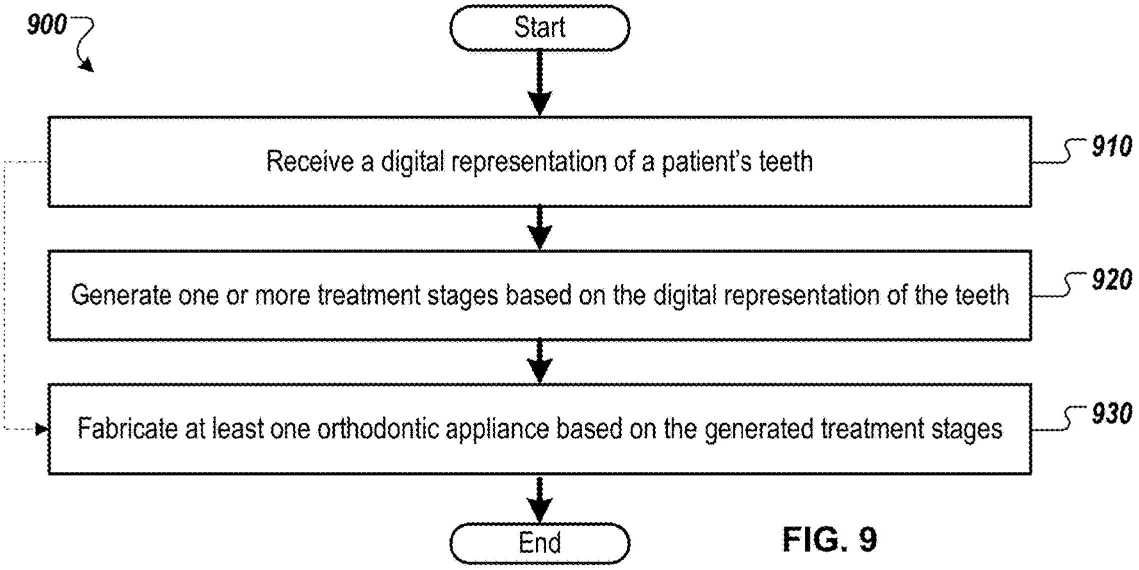
FIG. 9 illustrates a method for digitally planning an orthodontic treatment, according to certain embodiments.

FIG. 9 illustrates a method 900 for digitally planning an orthodontic treatment and/or design or fabrication of an appliance, in accordance with embodiments. The method 900 can be applied to any of the treatment procedures described herein and can be performed by any suitable data processing system.

In block 910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 930, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired. The fabrication of the appliance may include laser operations (e.g., laser marking, laser trimming), modular trays, and/or global plan data, as disclosed herein.

In some instances, staging of various arrangements or treatment stages may not be necessary for design and/or fabrication of an appliance. As illustrated by the dashed line in FIG. 9, design and/or fabrication of an orthodontic appliance, and perhaps a particular orthodontic treatment, may include use of a representation of the patient's teeth (e.g., receive a digital representation of the patient's teeth at block 910), followed by design and/or fabrication of an orthodontic appliance based on a representation of the patient's teeth in the arrangement represented by the received representation.

Other examples of aligners including features that may be formed to be more rigid than tooth-engagement regions may include apparatuses with an occlusal block, such as those described in US20210169617, incorporated herein by reference in its entirety.

In general, any of the aligners described herein may have variable properties, including a mix of regions of different stiffness/compliances (e.g., Young's modulus). For example, the methods and features described herein may be used with and/or may modify the apparatuses shown and described in US20170007359A1, herein incorporated by reference in its entirety. For example, the methods described herein may be used to make any of the dental appliances shown and described in the in US20170007359A1.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A non-transitory computer readable storage medium having instructions stored thereon, which, when executed by a processing device, cause the processing device to perform operations comprising:

identifying marking parameters and marking data, wherein the marking parameters are associated with performance of dental appliance etching, wherein the marking data comprises one or more segments to be etched onto a dental appliance, and wherein the marking parameters comprise one or more of power data, frequency data, pitch data, resolution data, or velocity data;

identifying a first segment of the one or more segments of the marking data to be etched onto the dental appliance;

causing, via dental appliance marking equipment based on the marking parameters, etching of the first segment on the dental appliance;

capturing image data associated with the etching of the first segment;

causing the marking parameters to be updated based on the image data to generate updated marking parameters; and causing subsequent etching based on updated marking parameters.

2. The non-transitory computer readable storage medium of claim 1, wherein the dental appliance is formed by heating a sheet of plastic and thermoforming the sheet of plastic on a dental mold, the dental mold being formed based on a digital model of at least a portion of a dental arch of a patient.

3. The non-transitory computer readable storage medium of claim 1, wherein the operations further comprise:

capturing appliance image data associated with the dental appliance;

determining that the appliance image data matches a digital model of the dental appliance; and identifying the marking data associated with the digital model.

4. The non-transitory computer readable storage medium of claim 1, wherein the operations further comprise:

determining dental appliance marking equipment position data associated with the etching of the dental appliance; and causing, based on the dental appliance marking equipment position data, positioning of the dental appliance marking equipment, wherein the dental appliance marking equipment position data comprises one or more of x-position, y-position, z-position, x-rotational position, y-rotational position, or z-rotational position.

5. The non-transitory computer readable storage medium of claim 1, wherein the marking data comprises one or more characters, wherein the first segment being a first line or a first curve of the one or more characters.

6. The non-transitory computer readable storage medium of claim 1, wherein the operations further comprise determining marking size and marking area, wherein the causing of the etching of the first segment on the dental appliance is further based on the marking size and the marking area.

7. The non-transitory computer readable storage medium of claim 1, wherein the marking parameters further comprise focal data.

8. A system comprising:

a memory;

a processing device coupled to the memory, the processing device to:

identify marking parameters and marking data, wherein the marking parameters are associated with performance of dental appliance etching, wherein the marking data comprises one or more segments to be etched onto a dental appliance, and wherein the marking parameters comprise one or more of power data, frequency data, pitch data, resolution data, or velocity data;

identify a first segment of the one or more segments of the marking data to be etched onto the dental appliance;

cause, via dental appliance marking equipment based on the marking parameters, etching of the first segment on the dental appliance;

capture image data associated with the etching of the first segment;

cause the marking parameters to be updated based on the image data to generate updated marking parameters; and cause subsequent etching based on updated marking parameters.

9. The system of claim 8, wherein the dental appliance is formed by heating a sheet of plastic and thermoforming the sheet of plastic on a dental mold, the dental mold being formed based on a digital model of at least a portion of a dental arch of a patient.

10. The system of claim 8, wherein the processing device is further to:

capture appliance image data associated with the dental appliance;

determine that the appliance image data matches a digital model of the dental appliance; and identify the marking data associated with the digital model.

11. The system of claim 8, wherein the processing device is further to:

determine dental appliance marking equipment position data associated with the etching of the dental appliance; and cause, based on the dental appliance marking equipment position data, positioning of the dental appliance marking equipment, wherein the dental appliance marking equipment position data comprises one or more of x-position, y-position, z-position, x-rotational position, y-rotational position, or z-rotational position.

12. The system of claim 8, wherein the marking data comprises one or more characters, wherein the first segment being a first line or a first curve of the one or more characters.

13. The system of claim 8, wherein the processing device is further to determine marking size and marking area, wherein the processing device is to cause the etching of the first segment on the dental appliance further based on the marking size and the marking area.

* * * * *